Inventors
Wallace M. Cutler
Edwin S. Kant
Henry B. Greenough, Dec'd.
Mary R. Greenough, Admx.
By their Attorney
Thomas J. Ryan

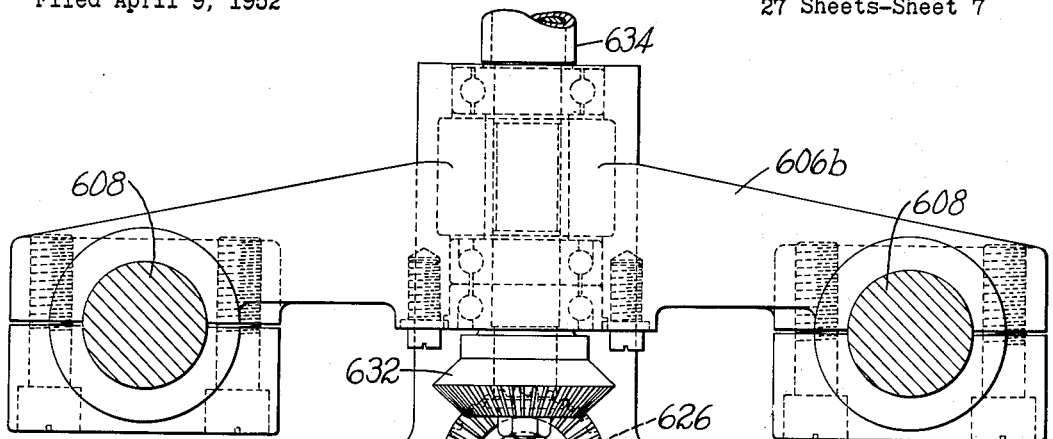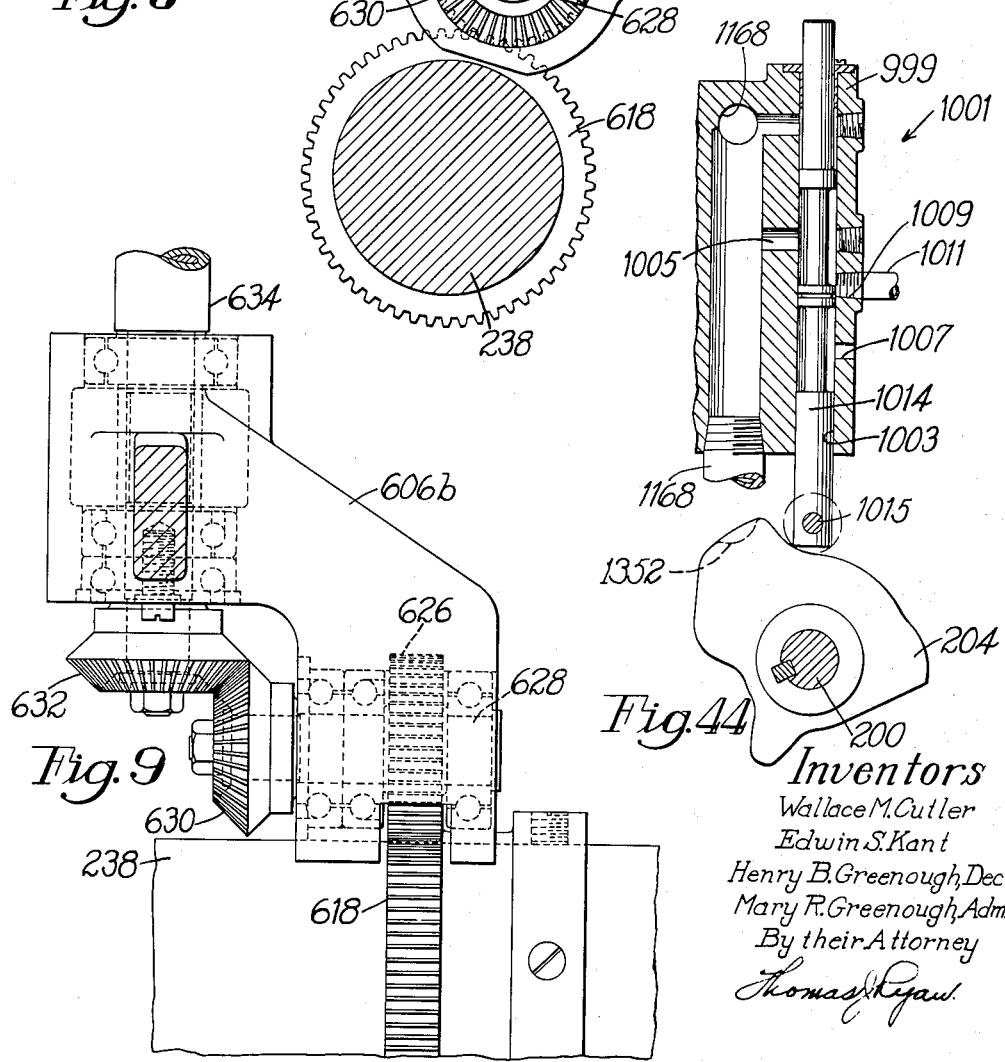

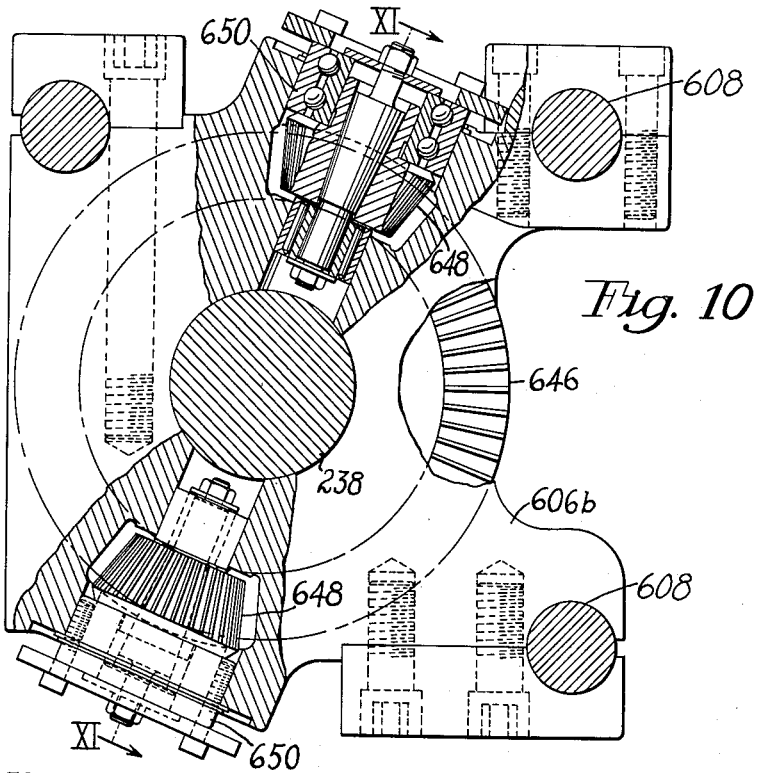
Fig. 10
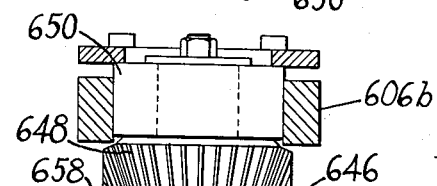
Fig. 11
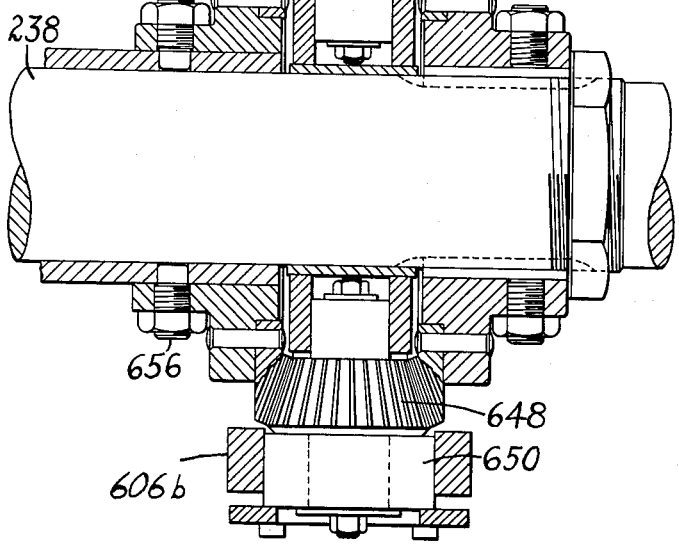
Inventors
Wallace M. Cutler
Edwin S. Kant
Henry B. Greenough, Dec'd.
Mary R. Greenough, Admx.
By their Attorney
Thomas J. Ryan.

May 22, 1956     W. M. CUTLER ET AL     2,746,047
HEEL ATTACHING MACHINES
Filed April 9, 1952     27 Sheets-Sheet 9
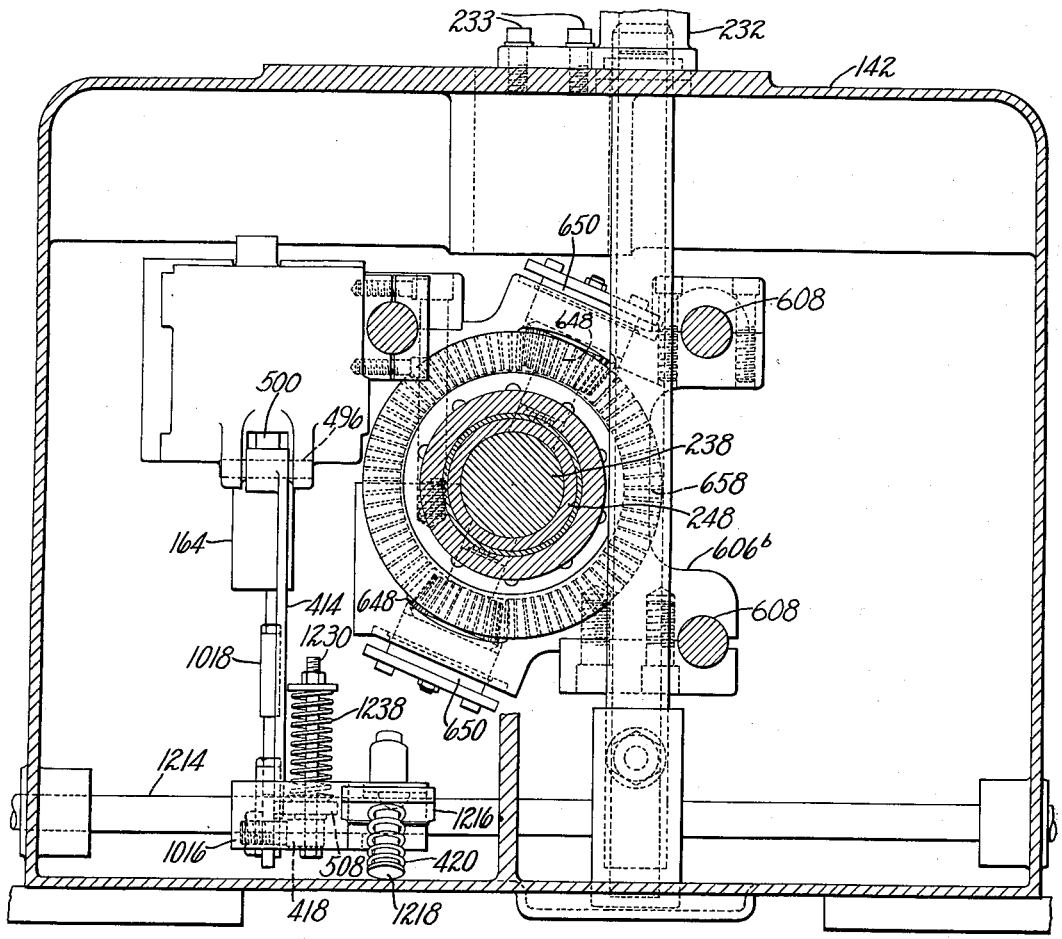
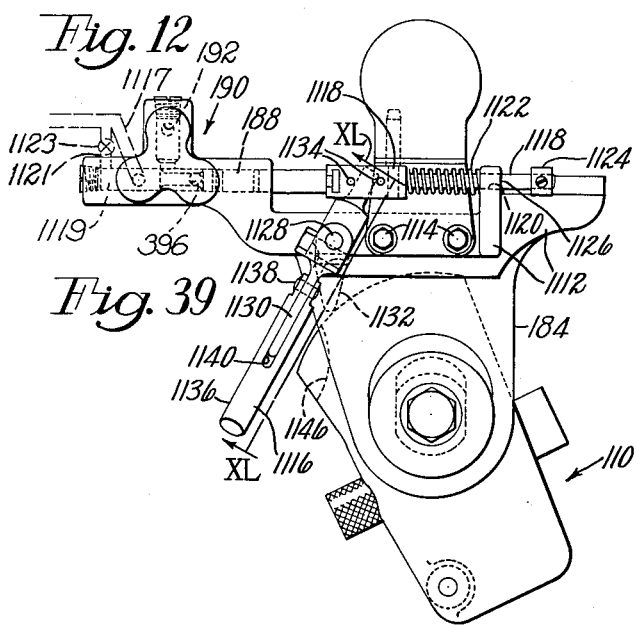
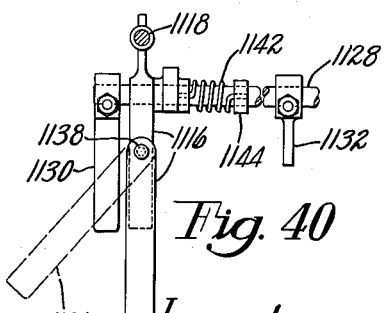
Inventors
Wallace M. Cutler
Edwin S. Kant
Henry B. Greenough, Dec'd.
Mary R. Greenough, Adm'x.
By their Attorney
Thomas J. Ryan

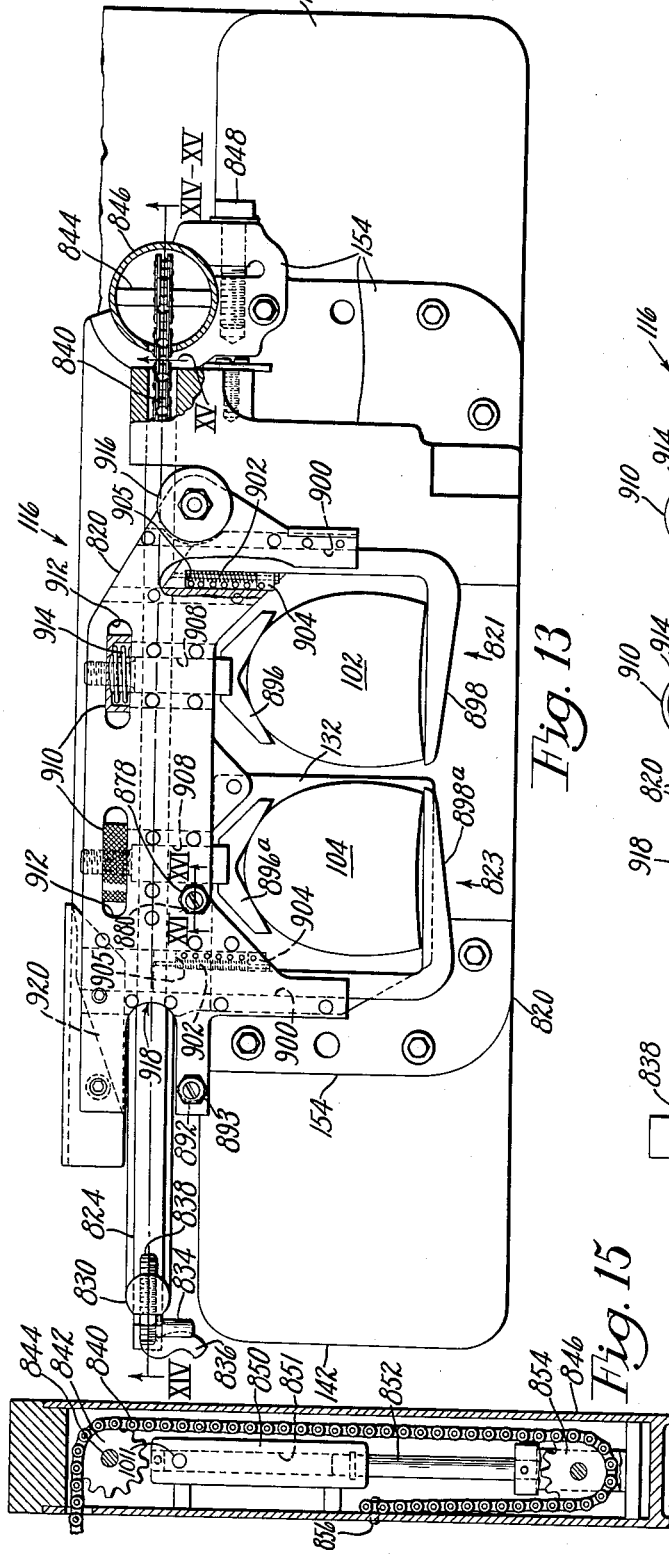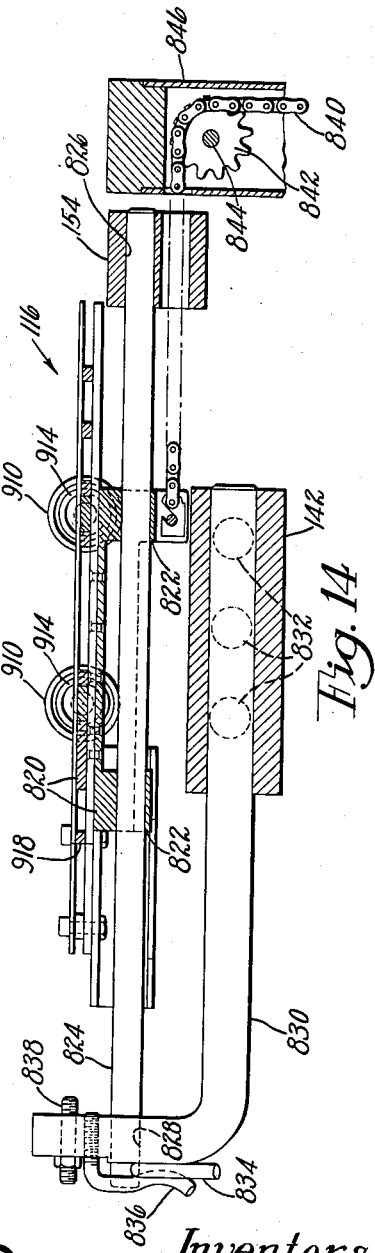

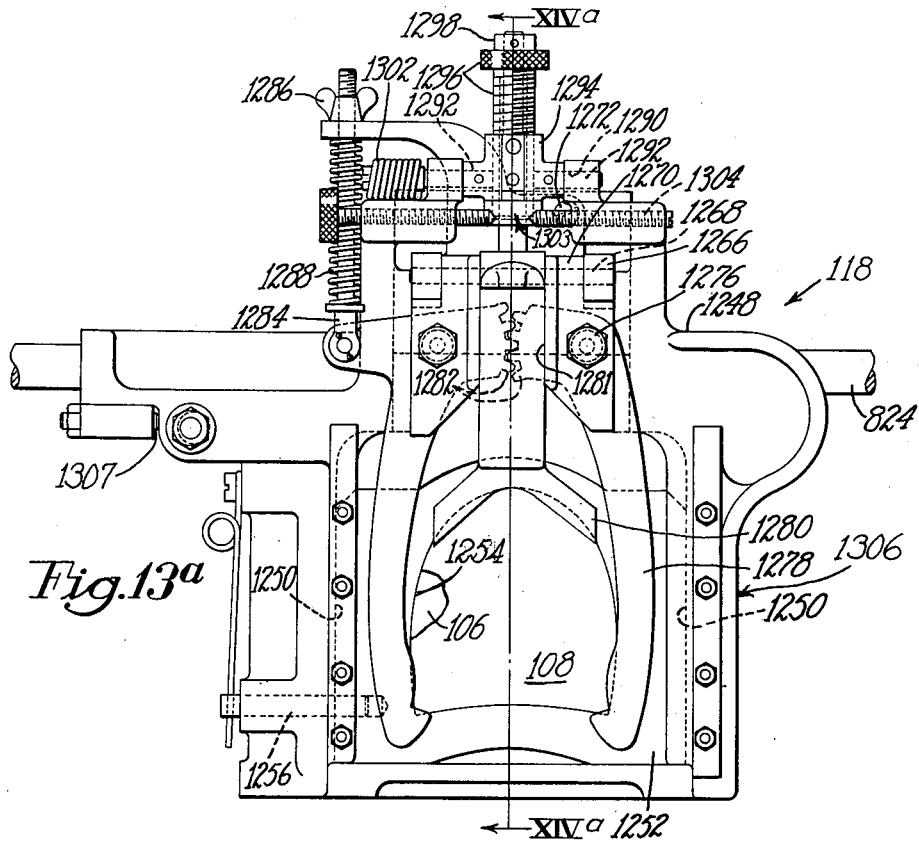
Fig.13ª
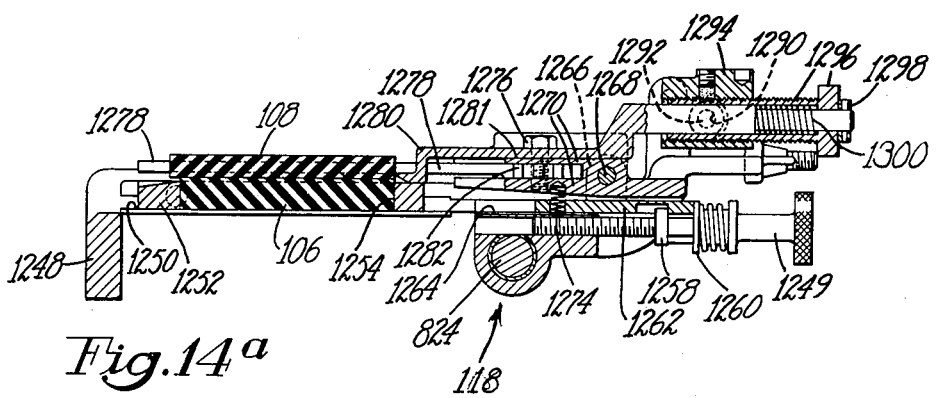
Fig.14ª
*Inventors*
Wallace M. Cutler
Edwin S. Kant
Henry B. Greenough, Dec'd.
Mary R. Greenough, Admix.
By their Attorney
Thomas J. Ryan May 22, 1956  W. M. CUTLER ET AL  2,746,047
HEEL ATTACHING MACHINES
Filed April 9, 1952  27 Sheets-Sheet 12

Inventors
Wallace M. Cutler
Edwin S. Kant
Henry B. Greenough, Dec'd.
Mary R. Greenough, Adm'x.
By their Attorney
Thomas J. Ryan

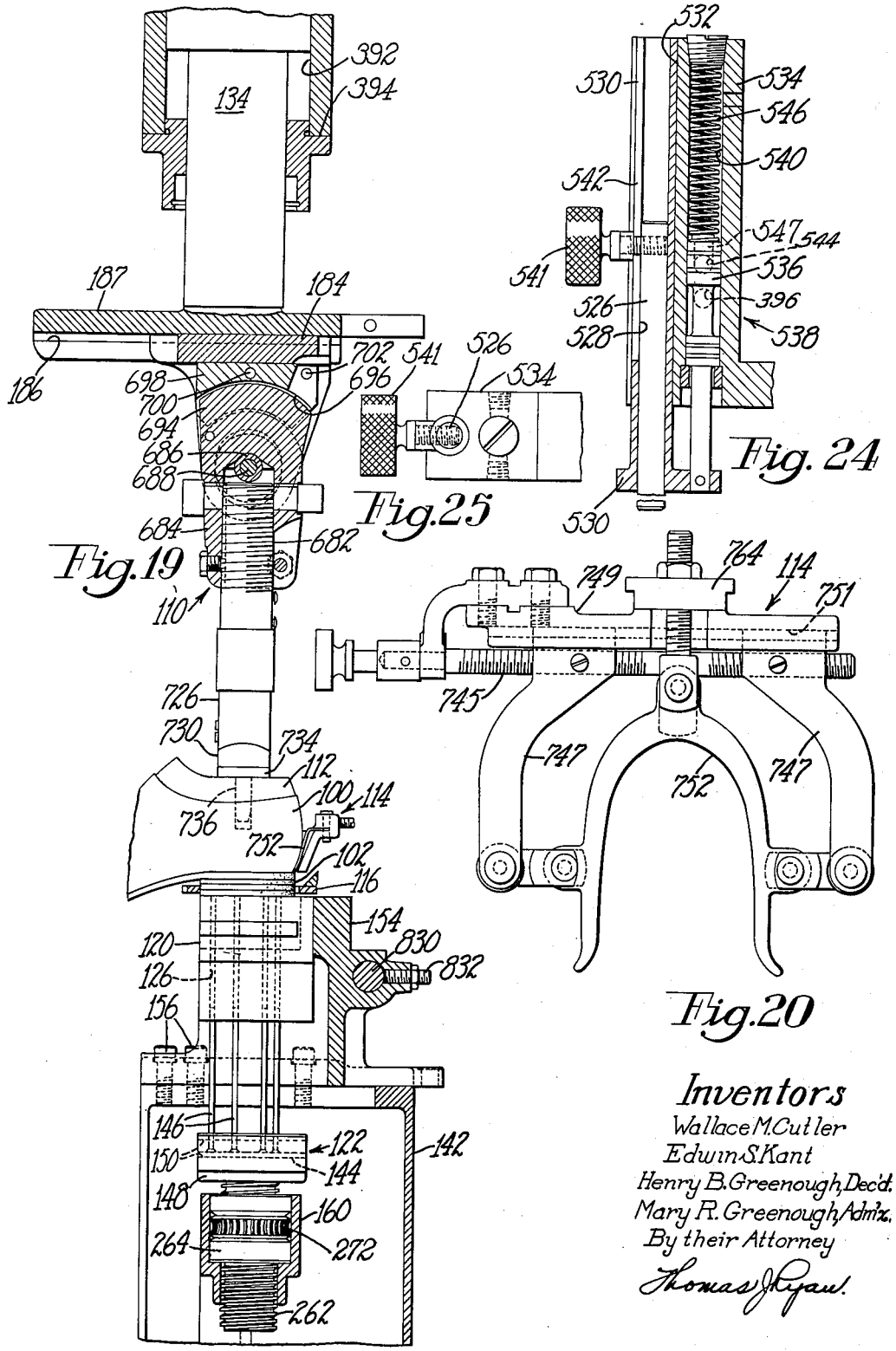

May 22, 1956  W. M. CUTLER ET AL  2,746,047
HEEL ATTACHING MACHINES
Filed April 9, 1952  27 Sheets-Sheet 14
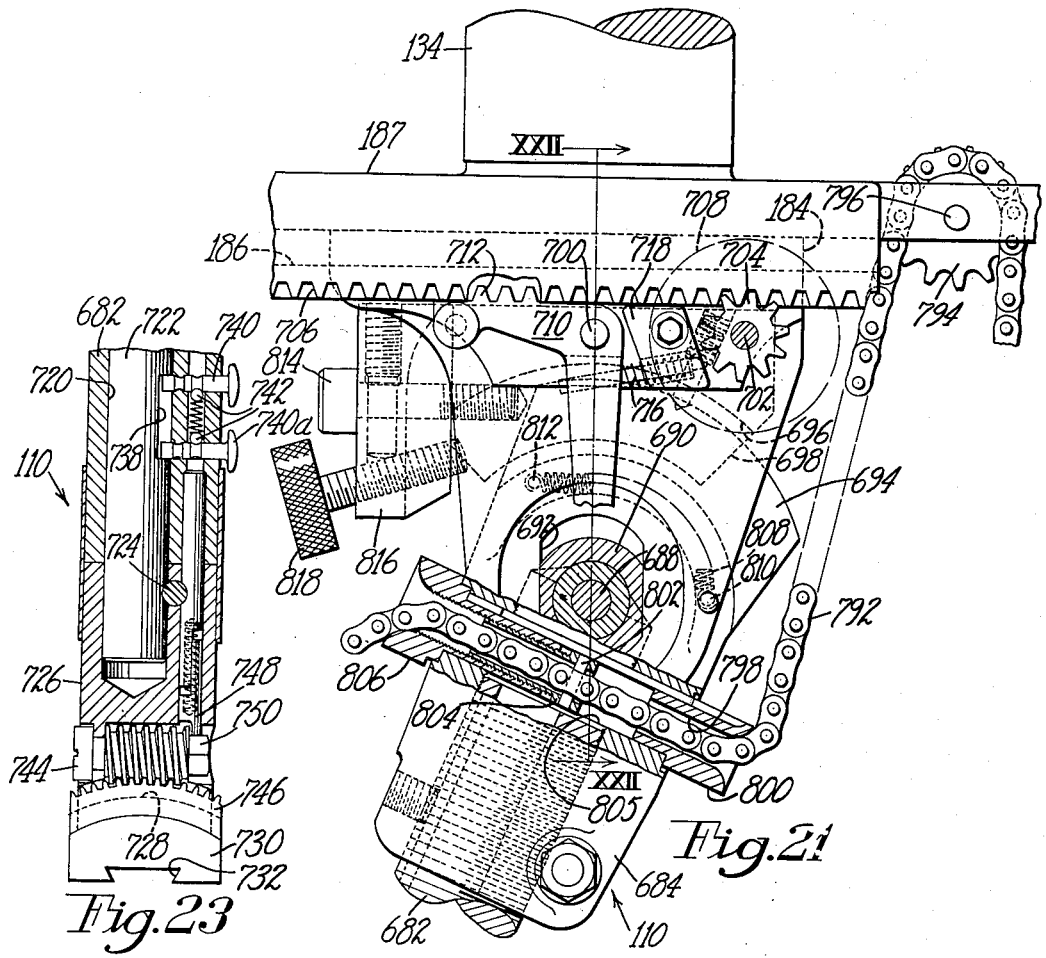
Fig.21
Fig.23
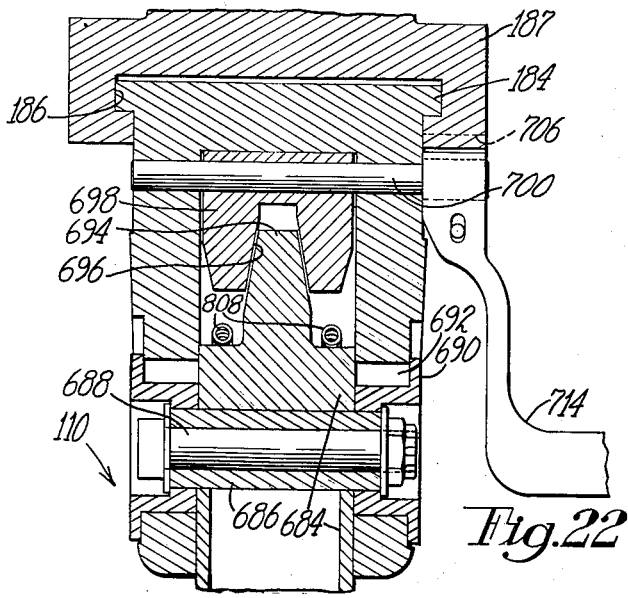
Fig.22
Inventors
Wallace M. Cutler
Edwin S. Kant
Henry B. Greenough, Dec'd.
Mary R. Greenough, Adm'x.
By their Attorney
Thomas J. Ryan

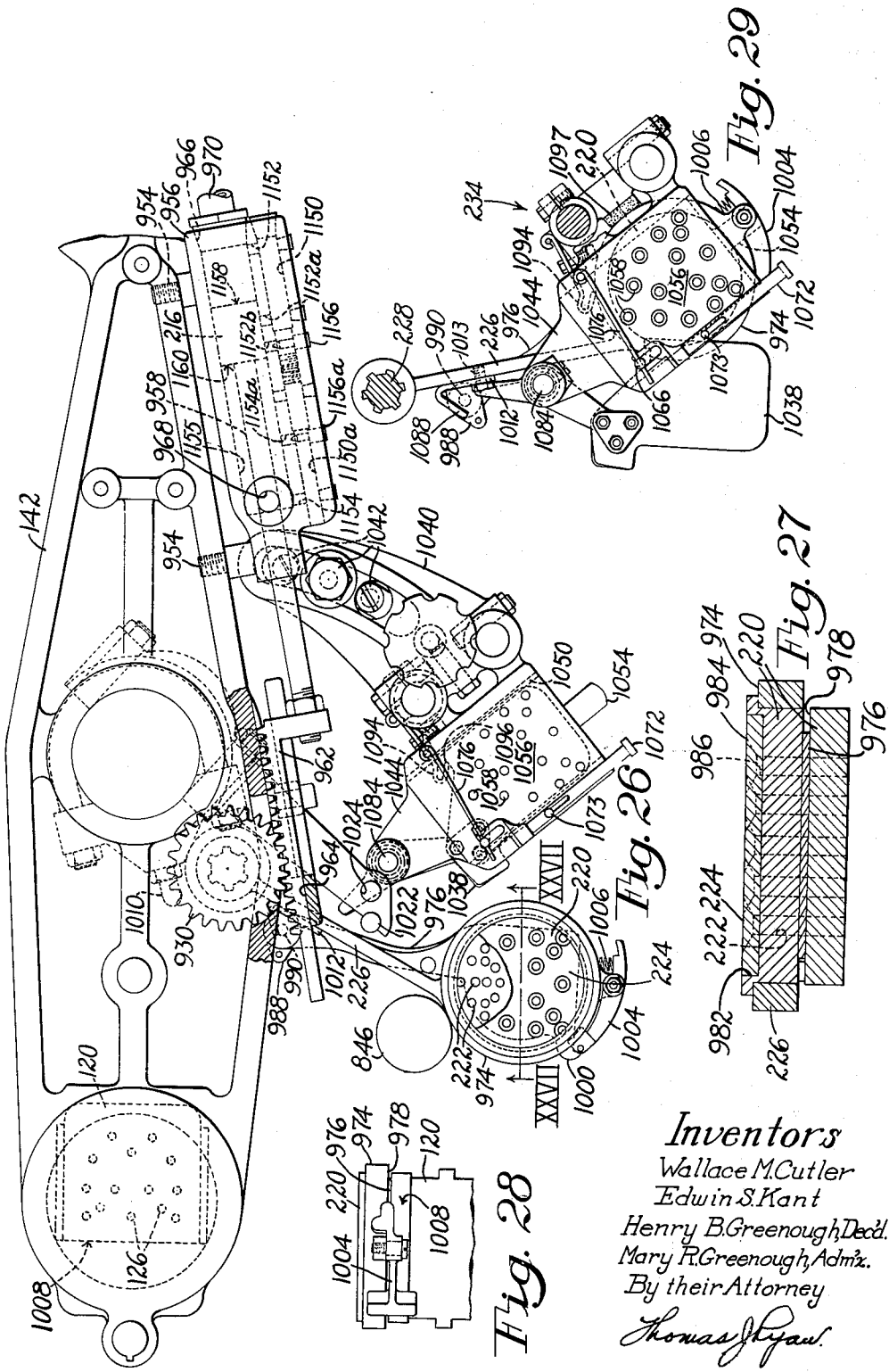

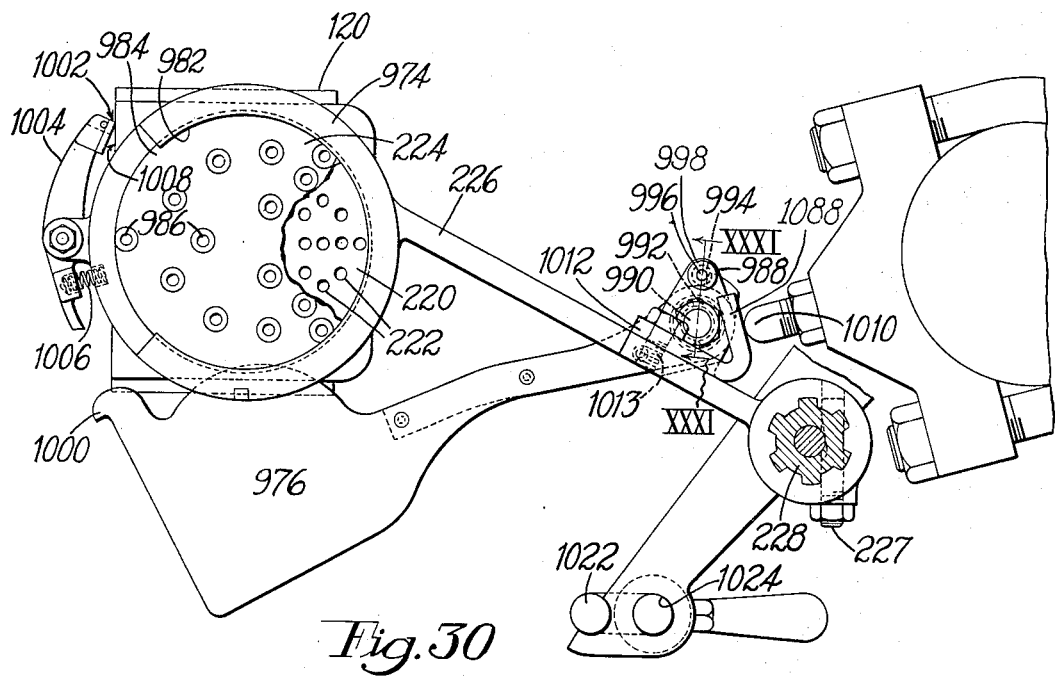
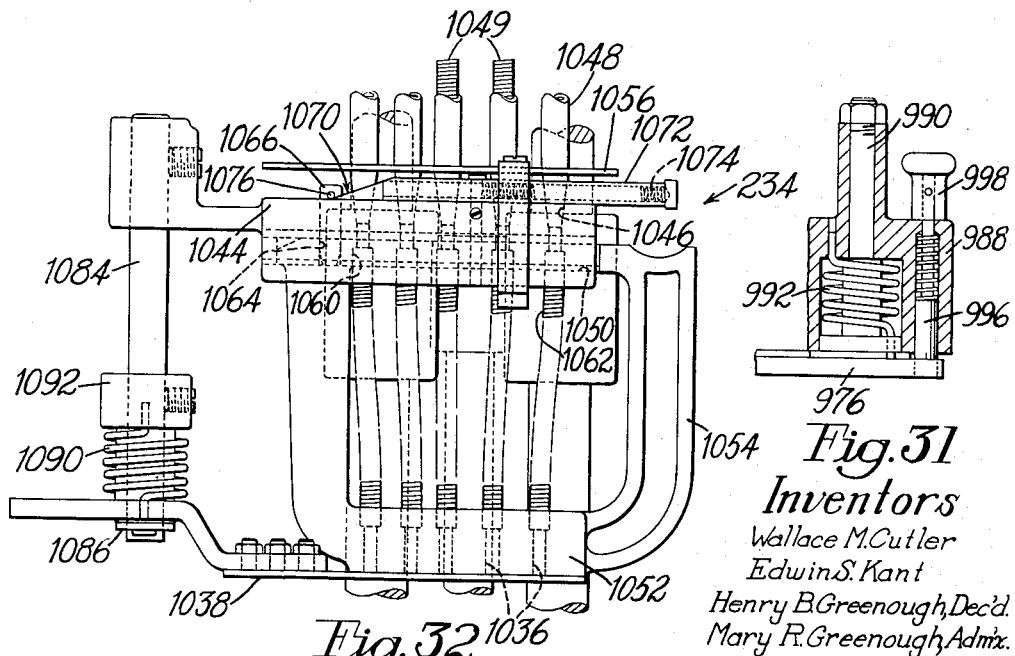

May 22, 1956   W. M. CUTLER ET AL   2,746,047
HEEL ATTACHING MACHINES
Filed April 9, 1952   27 Sheets-Sheet 17

Inventors
Wallace M. Cutler
Edwin S. Kant
Henry B. Greenough Dec'd.
Mary R. Greenough, Adm'x.
By their Attorney
Thomas J. Ryan May 22, 1956   W. M. CUTLER ET AL   2,746,047
HEEL ATTACHING MACHINES
Filed April 9, 1952   27 Sheets-Sheet 18
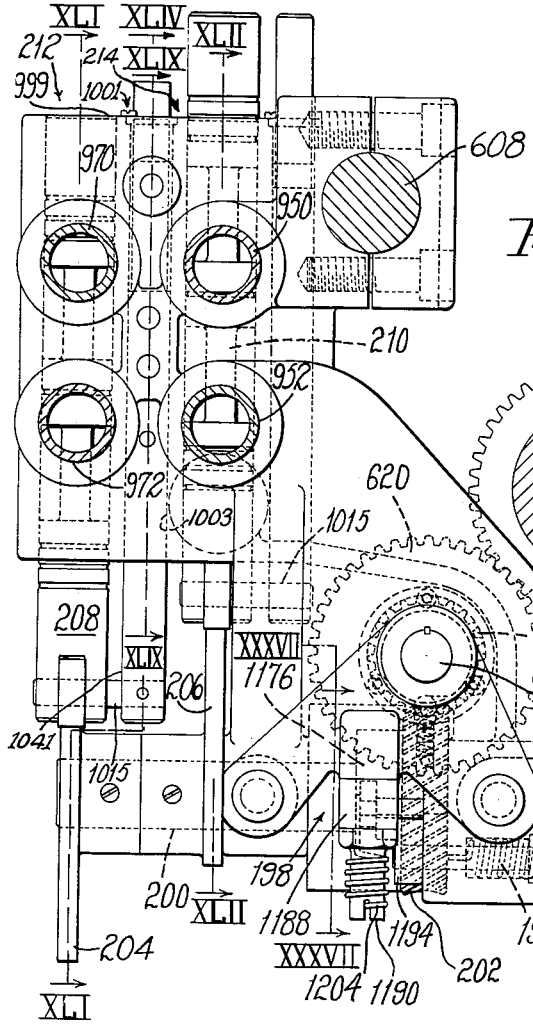
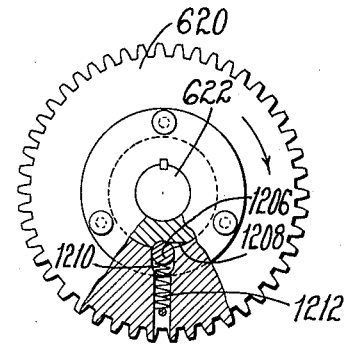
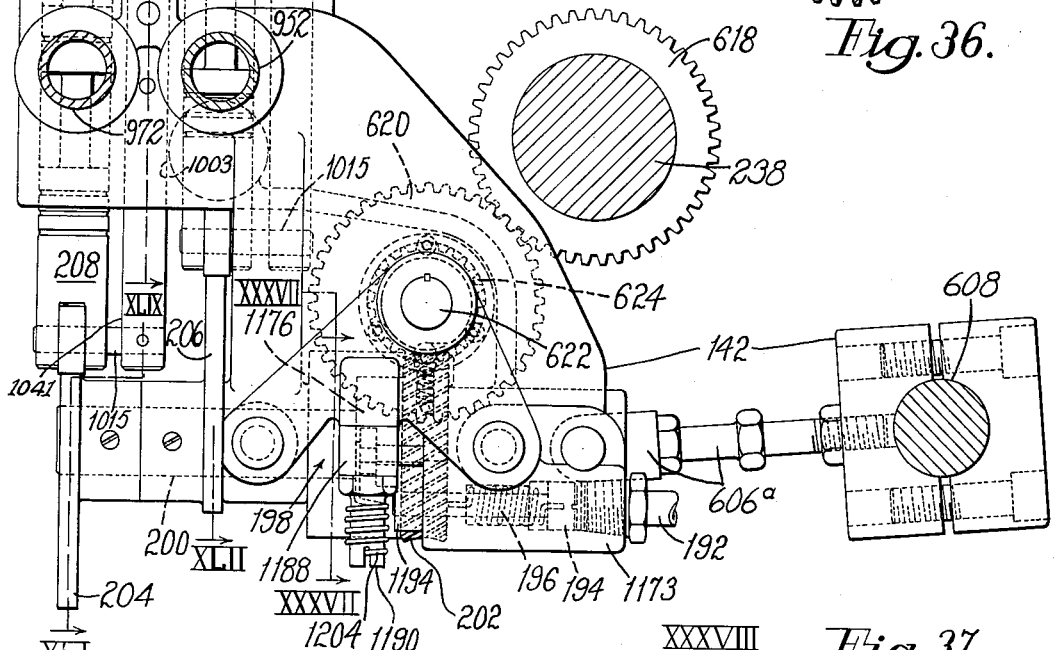
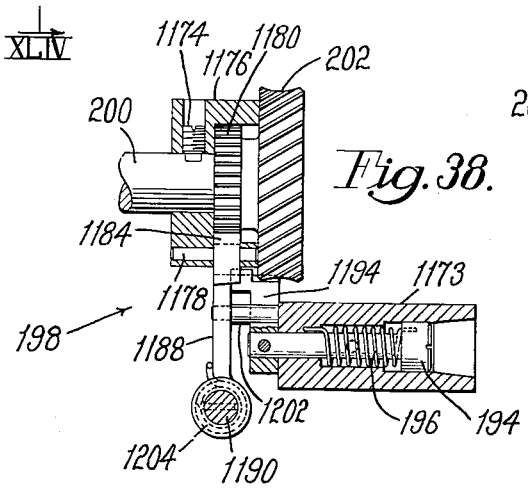
Inventors
Wallace M. Cutler
Edwin S. Kant
Henry B. Greenough, Dec'd.
Mary R. Greenough, Adm'x.
By their Attorney
Thomas J. Ryan

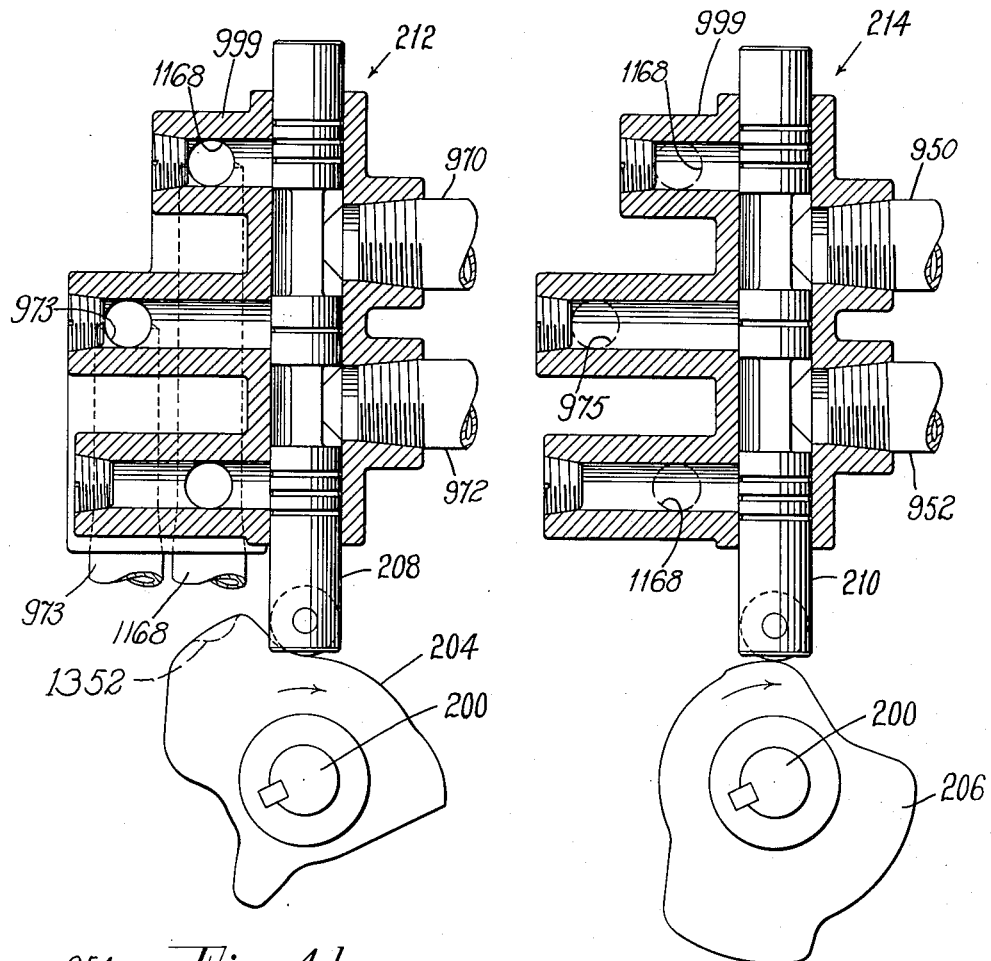
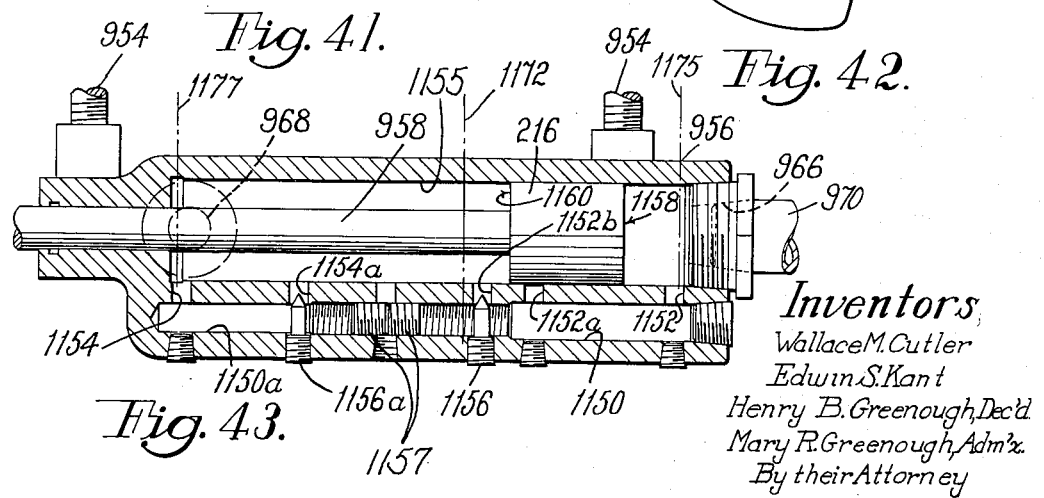

May 22, 1956 W. M. CUTLER ET AL 2,746,047
HEEL ATTACHING MACHINES
Filed April 9, 1952 27 Sheets-Sheet 20

Inventors
Wallace M. Cutler
Edwin S. Kant
Henry B. Greenough, Dec'd
Mary R. Greenough, Adm'x.
By their Attorney
Thomas J. Ryan May 22, 1956 W. M. CUTLER ET AL 2,746,047
HEEL ATTACHING MACHINES
Filed April 9, 1952 27 Sheets-Sheet 21

Inventors
Wallace M. Cutler
Edwin S. Kant
Henry B. Greenough, Dec'd.
Mary R. Greenough, Adm'x.
By their Attorney
Thomas J. Ryan Inventors
Wallace M. Cutler
Edwin S. Kant
Henry B. Greenough, Dec'd.
Mary R. Greenough, Admx.
By their Attorney
Thomas J. Ryan.

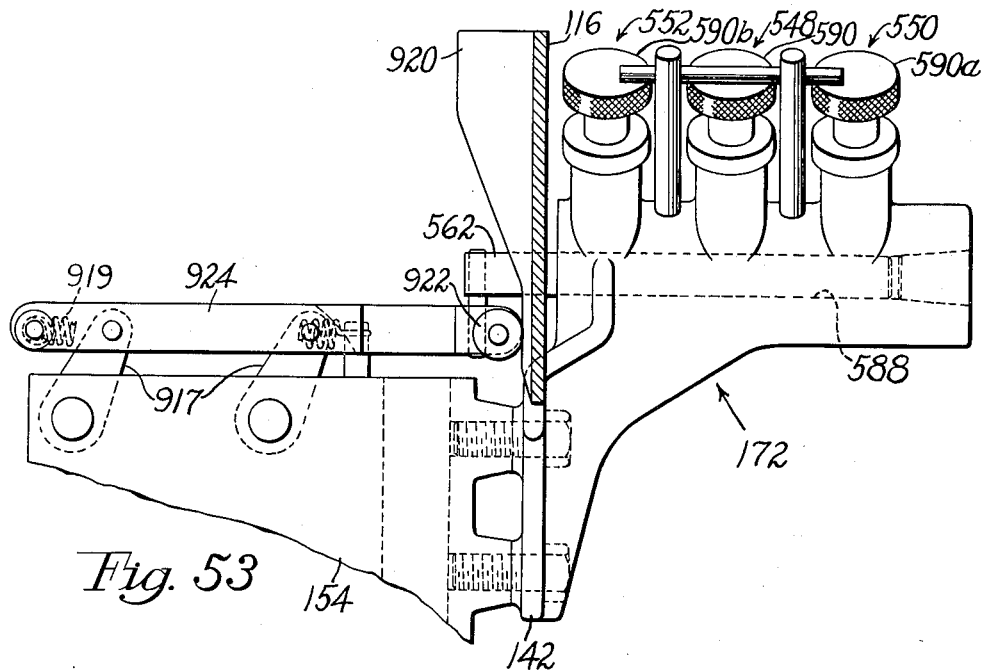
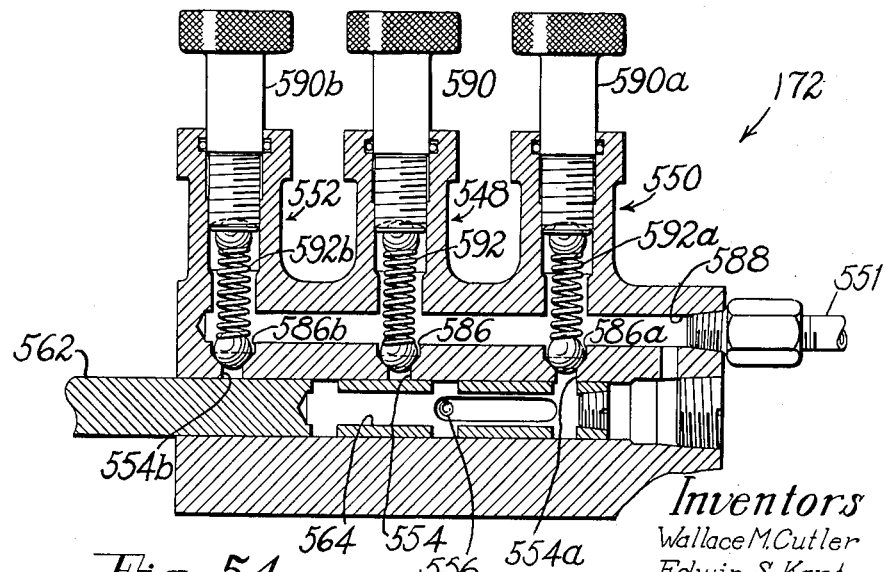

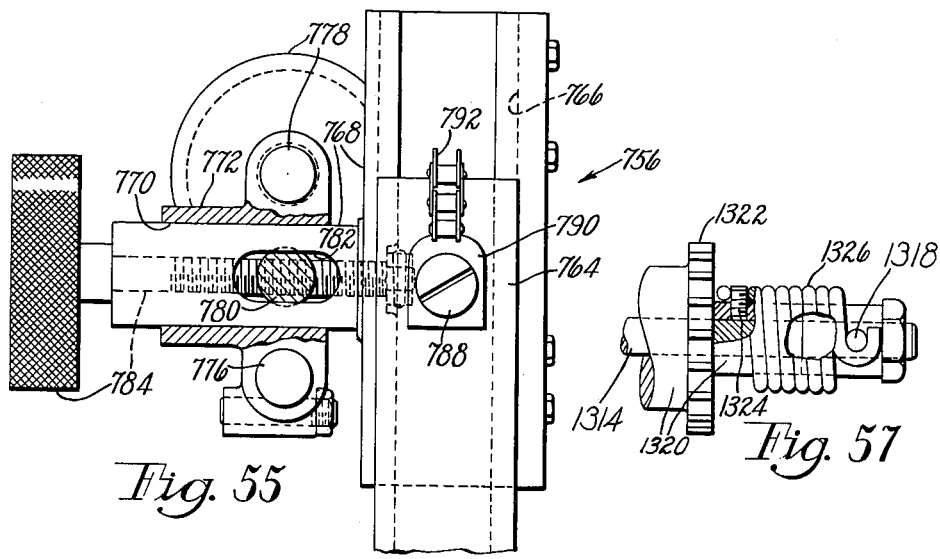
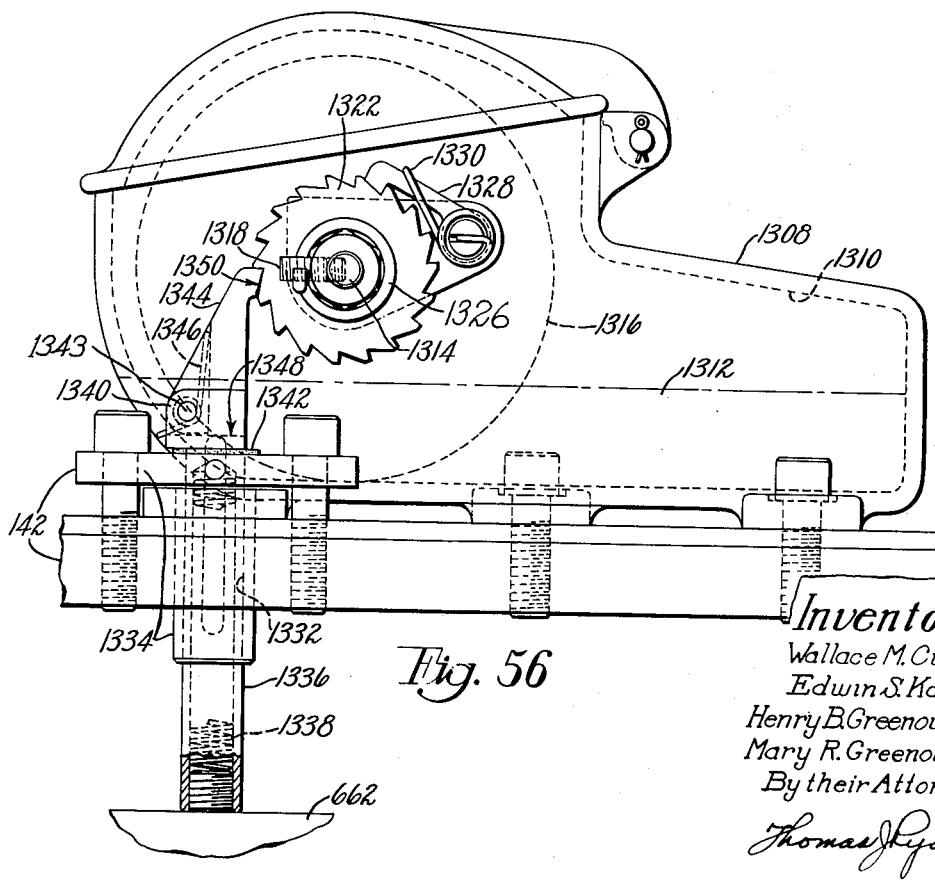

Inventors
Wallace M. Cutler
Edwin S. Kant
Henry B. Greenough, Dec'd.
Mary R. Greenough, Adm'x
By their Attorney
Thomas J. Ryan

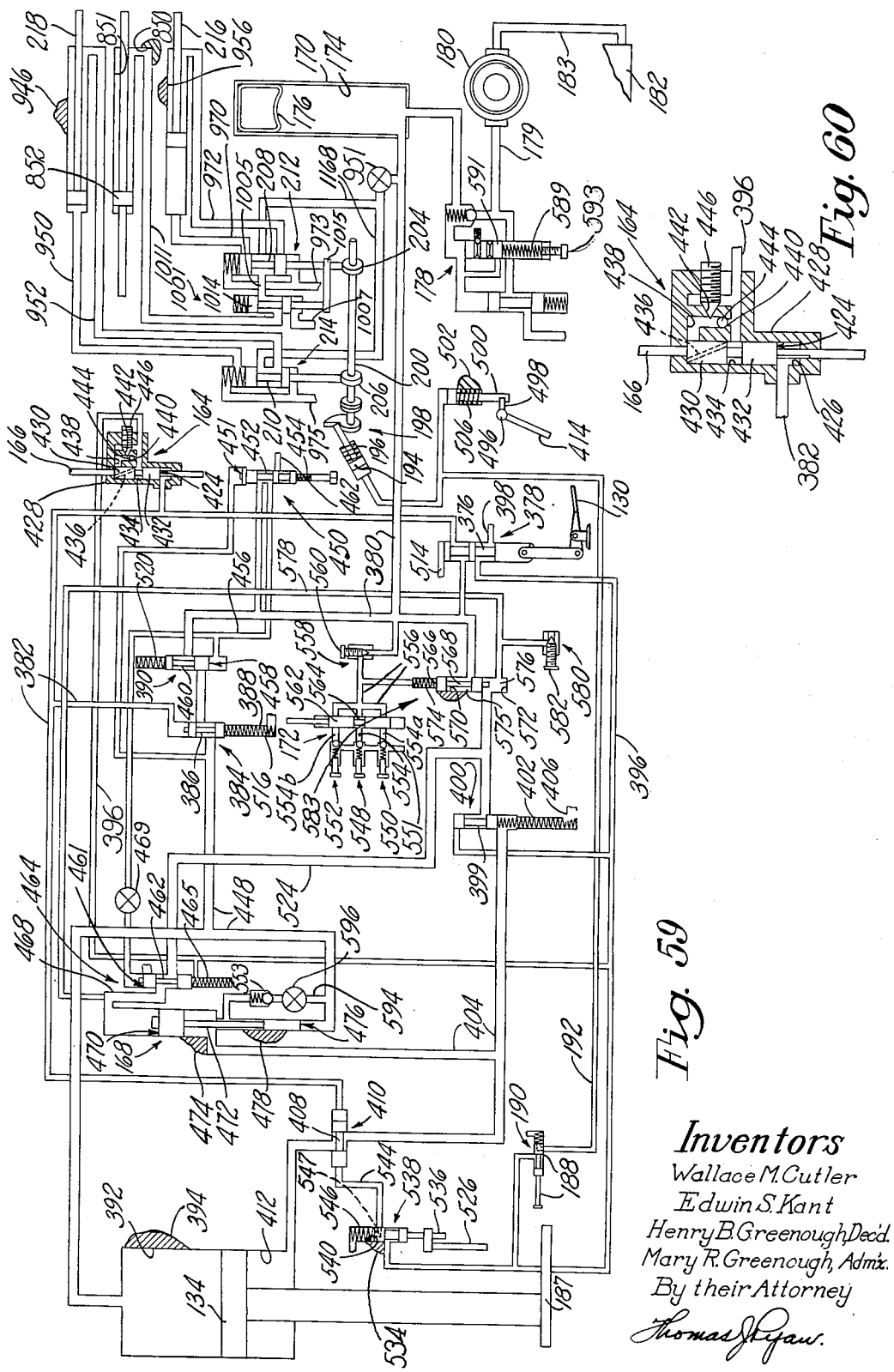

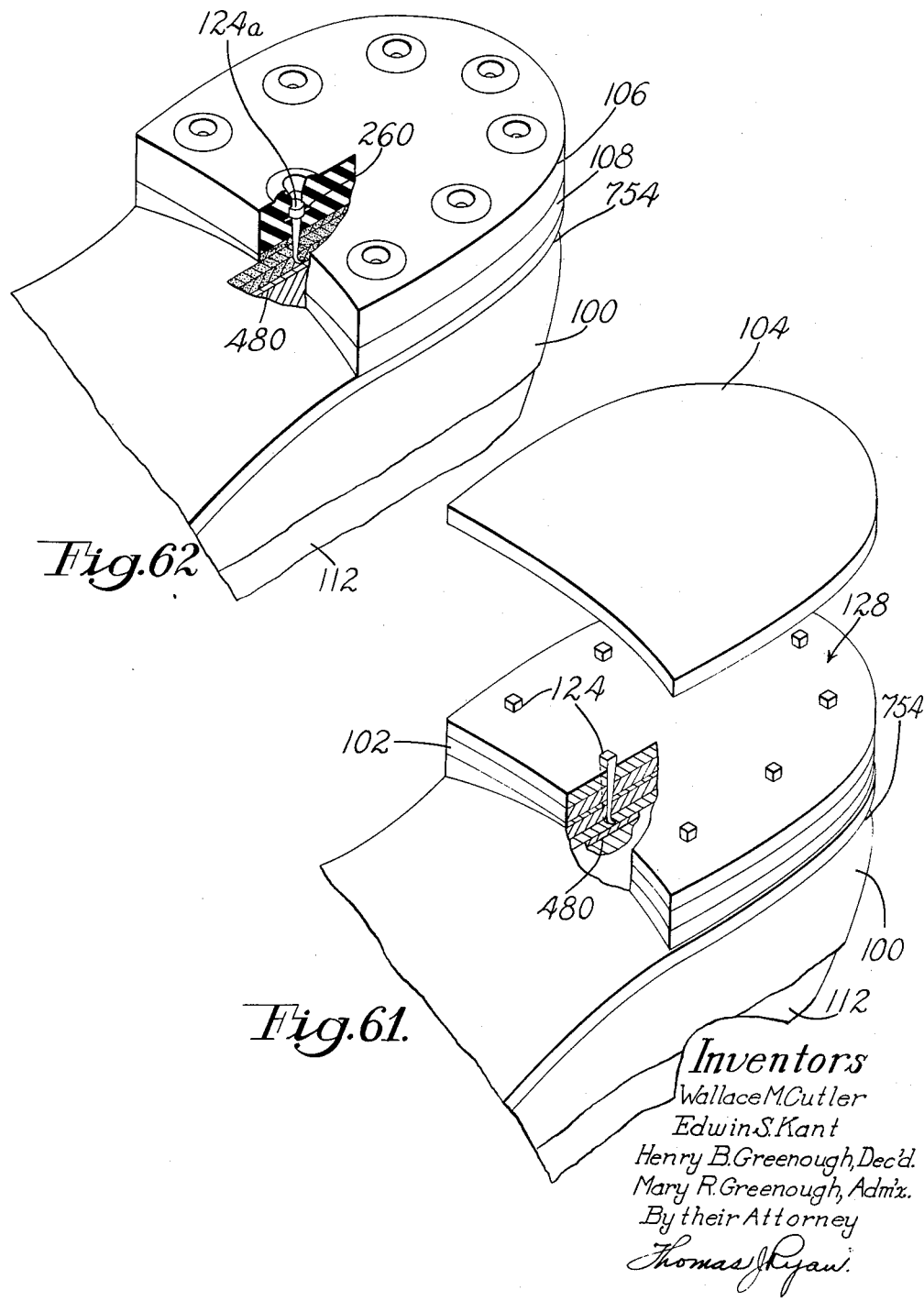

United States Patent Office 2,746,047
Patented May 22, 1956

2,746,047

HEEL ATTACHING MACHINES

Wallace M. Cutler, Gloucester, and Edwin S. Kant, Melrose, Mass., and Henry B. Greenough, deceased, late of Beverly, Mass., by Mary R. Greenough, administratrix, Beverly, Mass., assignors to United Shoe Machinery Corporation, Flemington, N. J., a corporation of New Jersey Application April 9, 1952, Serial No. 281,392

83 Claims. (Cl. 1—141)

This invention relates to machines for use in the attachment of heels to shoes and is illustrated as embodied in an improved machine of the general type disclosed in United States Letters Patent No. 1,157,688, granted October 26, 1915, on an application filed in the name of Lester L. Glidden.

Objects of the present invention are to provide an improved machine of the general type above referred to by the use of which heels can be attached to shoes quicker and more effectively than heretofore possible and which is quiet and smooth in its operation and can be operated with a minimum amount of effort on the part of the operator.

With the above objects in view applicants have provided a machine having a shoe receiving jack and a loader block which are operated by fluid pressure means responsive respectively to actuation of a treadle and a manually operated lever. Fluid, for example, oil, is supplied by an accumulator which is maintained at a predetermined pressure and has a capacity sufficient to operate a piston which forms part of said fluid pressure means and carries said jack and which has faces against which oil under pressure is applied alternately to move the piston in opposite directions. When the treadle is depressed oil under accumulator pressure is available for one face of the piston to force the jack under preliminary pressure against the shoe and accordingly to force the heel seat of the shoe against a heel mounted upon a carrier which is slidingly supported upon a nailing die and in accordance with a feature of this invention is normally biased in one direction by the fluid pressure means. High pressure oil acting against said one face of the piston is also effective to actuate in accordance with another feature of the invention a pressure booster unit operation of which augments the pressure exerted against said one face of the piston, thereby applying secondary pressure against the piston and accordingly forcing the jack under secondary pressure against the work which constitutes the shoe and the heel which is to be attached to the shoe.

Nails for securing the heel to the shoe are supplied by a nail distributor, which is disclosed in United States Letters Patent No. 2,604,624, granted July 29, 1952, on an application filed in the names of Cutler et al., to a nail delivering unit from which the loader block receives its loads of nails. The loader block in accordance with a further feature of the invention is operated, in response to manual actuation of a lever, by fluid pressure means, said block being moved automatically from a rest position to a dwell position over the nailing die to deliver a load of nails to the die and then to a dwell position under the nail delivering unit, where it receives another load of nails, and thereafter back to its rest position.

The nails are driven into the work by drivers of a driver head powered by mechanical means and actuated in response to engagement of a one revolution clutch which in accordance with another feature of the invention is controlled by a timer and clutch trip unit actuated in response to high pressure oil available for the piston which carries the jack, the construction and arrangement being such that after the jack has been forced against the work under secondary pressure the clutch is tripped thereby causing nails, then in driver passages of the nailing die, to be driven into the work.

In case the shoe and the heel to be attached to the shoe are not in correct alinement after being clamped under pressure in the machine but before the treadle has been depressed to a recognizable point, said treadle may be released and the jack is raised automatically, thus permitting the work to be repositioned in the machine. When the treadle has been fully depressed beyond said recognizable point, however, a plunger of the treadle valve is latched in its raised position the operator losing control of the machine and optionally releasing the treadle or retaining the treadle depressed. At approximately the same time a plunger of the timer and clutch trip unit, which is initially actuated through the treadle and is later operated under fluid pressure, has been displaced sufficiently to trip the one revolution clutch thus rendering the nail driver head active to drive the nails into the work. When the nail driver head reaches the upper end of its stroke the plunger of the treadle valve is released, said plunger returning to its rest position in the treadle valve and causing through the fluid pressure means and the piston the jack to be raised a predetermined distance controlled by a limit stop valve which in accordance with another feature of the invention is operated by said piston.

The maximum pressures, with which the shoe is forced against the heel and with which the attached heel of the shoe is forced against the top lift during successive operations of the machine, are effectively controlled and varied by the use of a pressure regulator which is associated with the fluid pressure means and in accordance with a further feature of the invention has a selector slide operated by the carrier in which the heel and top lift are positioned and secured.

In the attachment of rubber heels and their base lifts to shoes it is desirable, when nails are being driven through the heel, its base lift and the heel seat of the shoe, that the pressure against the work shall be little more than the weight of the jack and the piston upon which it is mounted. Accordingly the fluid pressure means of the illustrative machine has associated with it in accordance with another feature of the invention means for opening the pressure face of the jack operating piston to an exhaust line just prior to and during the driving of nails into the work.

In accordance with further features of the invention the illustrative machine comprises means hereinafter described in detail, for regulating the action of the loader block and the pressure regulator, and various safety devices for insuring against collisions of operating parts of the machine, as well as means for counterbalancing operating parts of the machine to insure against excessive vibration in and wear and tear on the machine. The present invention consists in the above and hereinafter disclosed features, reference being had to the accompanying drawings which illustrate one embodiment of the invention selected for purposes of illustration, said invention being fully disclosed in the following description and claims.

In the drawings,

Fig. 8 is a section showing portions of a main drive of the machine as viewed on line VIII—VIII of Fig. 5;

Fig. 9 is a side elevation of the portions of the main drive shown in Fig. 8;

Fig. 10 is a section on line X—X of Fig. 5;

Fig. 11 is a section on line XI—XI of Fig. 10;

Fig. 12 is a view on line XII—XII of Fig. 5 showing portions of the main drive and portions of treadle control mechanism;

Fig. 13 shows in plan a carrier for a heel and a top lift as viewed on line XIII—XIII of Fig. 3;

Fig. 13a shows in plan a modified carrier for accommodating rubber heels and their base lifts;

Fig. 14 is a section showing the carrier and biasing mechanism therefor as viewed on line XIV—XIV of Fig. 13;

Fig. 14a is a section of the modified carrier on line XIVa—XIVa of Fig. 13a;

Fig. 15 is a section on line XV—XV of Fig. 13 showing portions of the carrier biasing mechanism;

Fig. 19 is a section on line XIX—XIX of Fig. 1 showing portions of a jack and a nailing die, between which is clamped a shoe and a heel to be attached to the shoe, preparatory to driving nails for attaching the heel to the shoe;

Fig. 20 is a plan view on line XX—XX of Fig. 3 of a back gage or gaging mechanism for positioning the shoe which is mounted upon the jack;

Fig. 21 is a view partly in side elevation and partly in vertical section showing in detail portions of the jack;

Fig. 22 is a section on line XXII—XXII of Fig. 21;

Fig. 23 shows the lower end of the jack in vertical longitudinal section;

Fig. 24 is a vertical longitudinal section through a portion of mechanism for controlling the upward limit of movement of the jack;

Fig. 25 is a plan view of the mechanism illustrated in Fig. 24;

Fig. 26 shows in plan a loader block and a portion of operating mechanism therefor as well as portions of a unit for delivering nails to the loader block;

Fig. 27 shows the loader block in section on line XXVII—XXVII of Fig. 26;

Fig. 28 is a front view of the loader block and the nailing die at the time nails are being dumped from the loader block into passages of said die;

Fig. 29 is a plan view showing the nail delivering unit illustrated in Fig. 26 when the loader block has been swung into a dwell position beneath said unit and a nail retaining shutter of said unit has been swung aside to allow nails to drop from said unit into the loader block;

Fig. 30 shows in plan the loader block positioned over the nailing die, a shutter associated with the block being in a retracted position to enable nails in said block to drop into nail passages of the nailing die;

Fig. 31 is a section on line XXXI—XXXI of Fig. 30 showing the mounting of the shutter on an arm upon which the loader block is mounted;

Fig. 32 is a front view of the nail delivering unit, a shutter of the unit being arranged below a bottom of a holder of said unit to retain nails in passages of the holder;

Fig. 35 is an enlarged view of mechanism shown in Fig. 6 for controlling the operation of fluid pressure means which is shown in Figs. 26, 33 and 34 and operates the loader block arm;

Fig. 36 shows partly in section a portion of the drive illustrated in Fig. 35;

Fig. 37 is a section on line XXXVII—XXXVII of Fig. 35 showing a clutch which is tripped to effect through mechanism above referred to the operation of the loader block arm;

Fig. 38 is a section on line XXXVIII—XXXVIII of Fig. 37;

Fig. 39 shows in side elevation mechanism which may be actuated manually or in response to forward swinging movement of the jack for tripping the fluid pressure means shown in Figs. 37 and 38;

Fig. 40 is a view on line XL—XL of Fig. 39;

Figs. 41 and 42 are sectional views on lines XLI—XLI and XLII—XLII respectively of Fig. 35 showing valves and associated cams for operating pistons which control horizontal and vertical movement of the loader block arm;

Fig. 43 is a horizontal longitudinal section through the cylinder and piston shown in Fig. 26;

Fig. 44 is a section on line XLIV—XLIV of Fig. 35 showing in side elevation the cam illustrated in Fig. 41 and in section a valve for controlling fluid pressure means for operating the piston of the carrier biasing mechanism shown in Fig. 15;

Fig. 53 shows in side elevation portions of pressure regulating mechanism and heel carrier operated means for selectively varying the position of a piston of said mechanism in accordance with the position of the carrier;

Fig. 54 is a median longitudinal section through the pressure regulating mechanism shown in Fig. 53;

Fig. 55 is a front view of portions of mechanism for adjusting laterally and longitudinally the operating position of vertical guide bar to the lower end of which the back gage shown in Fig. 20 is adjustably secured;

Fig. 56 shows in side elevation a glue applicator which may be advantageously used with the above machine;

Fig. 57 is a side view of a spring drive portion of the applicator shown in Fig. 56;

Fig. 59 is a view similar to that show in Fig. 58 after the treadle has been depressed and a jack operating piston of the machine is at the lower end of its stroke;

Fig. 60 is a section showing a timer and clutch trip unit a piston of which is partially treadle operated and partially fluid pressure operated and through which the clutch shown in Figs. 45, 46 and 47 is tripped to operate the nail driver head;

Fig. 61 is a perspective view, partly in section, showing the rear portion of a shoe the heel of which has been attached by nails which extend beyond a top lift reeciving face of the heel and a top lift which is to be attached to the heel by pressing or "spanking" it onto said projecting nails; and Fig. 62 is a perspective view, partly in section, of the rear portion of a shoe to which has been attached by the use of the above machine a rubber heel and a base lift.

Figure 4:
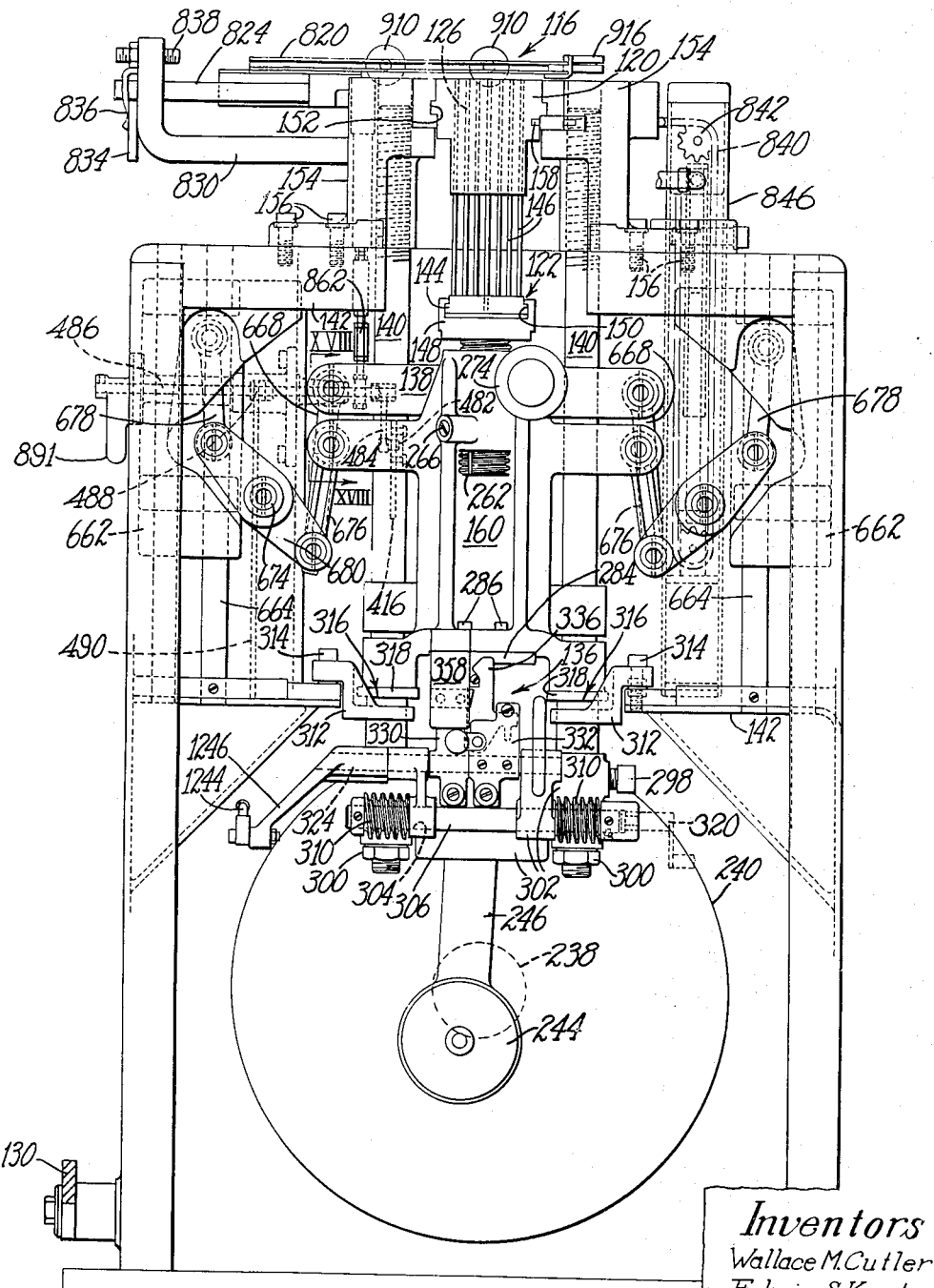
Fig. 4 is a front view of the lower half of the machine, showing on an enlarged scale and with a door of a casing of the machine removed the nail driving mechanism of the machine.
Figure 5:
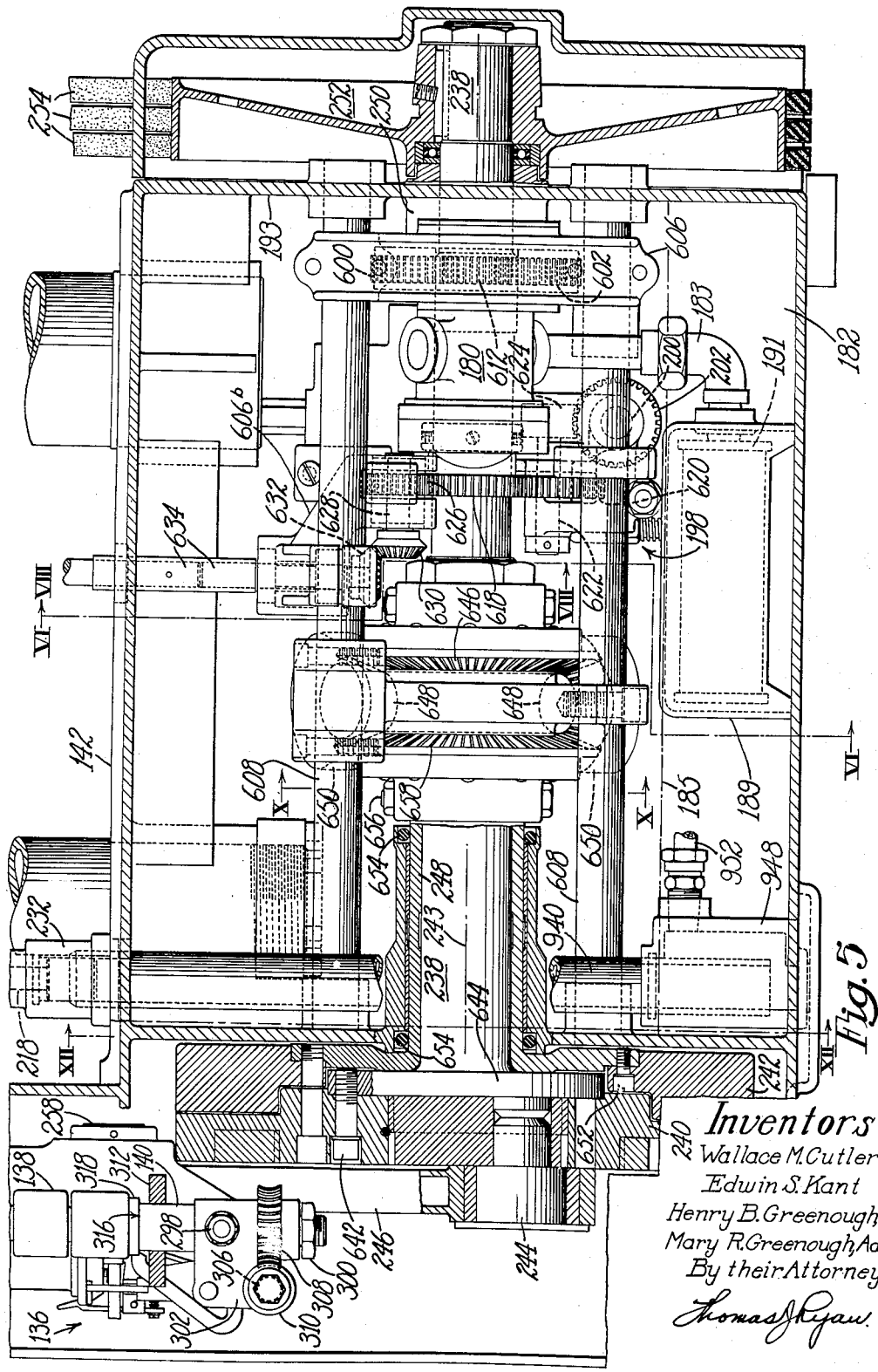
Fig. 5 is a right side elevation, partly in section, of the base portion of the illustrative machine the right side wall of a base housing of which has been broken away.

The illustrative machine is described with reference to attaching to shoes 100 (Figs. 19, 61 and 62) built-up leather or composition heels 102 and their top lifts 104 as well as rubber heels 106 (Figs. 13a, 14a and 62) and their bases or base lifts 108 and comprises a jack 110 on which the shoe upon a last 112 and arranged right side up is mounted and which relation to which the shoe is positioned by a back gage or gaging mechanism 114 best shown in Fig. 20. A heel and top lift carrier 116 (Fig. 13) or a rubber heel and base carrier 118 (Fig. 13a) is mounted for rectilinear movement transversely of the machine and is adapted successively to position the unattached heel and top lift or to position the rubber heel and base lift over a nailing die or abutment 120 against which the heel or the base lift is forced by the heel seat portion of the shoe mounted on and depressed by the jack preparatory to raising a driver head 122 (Figs. 1, 4, 19 and 48) to drive nails or fastenings 124 (Fig. 61) or 124a (Fig. 62) previously dropped into driver passages 126 (Figs. 4, 19 and 26) of the nailing die through the built-up heel 102 and the heel seat of the shoe or through the rubber heel 106, the base lift 108 and the heel seat of the shoe.

In attaching leather heels 102 and their top lifts 104 to shoes, the machine drives the nails 124 only during every other cycle. During the heel attaching operation the nails 124 are left projecting slightly beyond a top lift receiving face 128 of the heel 100 and at the end of the first power cycle of the machine the jack 110 is lifted slightly to enable the carrier 116 to be slid to the right, as viewed from the front of the machine, to a position in which the top lift 104 in the carrier underlies the attached heel 102 of the shoe upon the jack 110. During the next power cycle of the machine, effected by depressing a treadle 130, the driven nails 124 then projecting from the heel 102 are forced into the top lift 104 mounted in the carrier 116 and resting upon a plate 132 (Fig. 13) which constitutes part of the carrier and is supported by the nailing die 120. The top lift 104 is permanently secured to the heel 102 in a subsequent slugging operation which is performed by the use of a separate machine (not shown) and in which one or more rows of nails are driven through the peripheral portion of the top lift and into the heel.

The jack 110 is operated by hereinafter described fluid pressure means which comprises a piston actuator or plunger 134 (Figs. 1, 2, 3, 19, 21, 58 and 59) and is responsive to movement of the treadle 130, the driver head 122 being operated after being coupled, by a one-revolution clutch 136 (Figs. 4, 5, 45, 46 and 47) which is responsive to actuation of said fluid pressure means, to an impeller or driving slide 138 which when the machine is in use reciprocates continuously on vertical rods 140 secured to and initially adjustable vertically in a main frame 142 of the machine.

The driver head 122 comprises a holder 144 (Figs. 4 and 19) to which the lower ends of drivers 146 are secured and a holder housing 148 which has ways 150 adapted to receive holder holders provided with drivers arranged in different "designs" or "patterns." The nailing die 120 which may be referred to as an abutment has a pair of tongues fitting in grooves 152 (Fig. 4) of an upstanding bracket 154 which is secured by screws 156 to and may be considered part of the main frame 142, said nailing die being locked against movement in said bracket by a spring-pressed plunger 158. Nailing dies 120 of different patterns together with corresponding holders 122 and their drivers 146 are interchangeably incorporated in the machine as a unit by sliding the nailing dies 120 and the holders 144 into the grooves 152, 150 respectively of the bracket 154 and the housing 148. As will be hereinafter explained, the housing 148 is adjustably secured to a sliding beam or driven slide 160 and the holder 144 is adapted freely to slide in the grooves 150 to insure that the nail drivers 146 shall slide without binding in the passages 126 in the nailing die 120.

Figure 58:
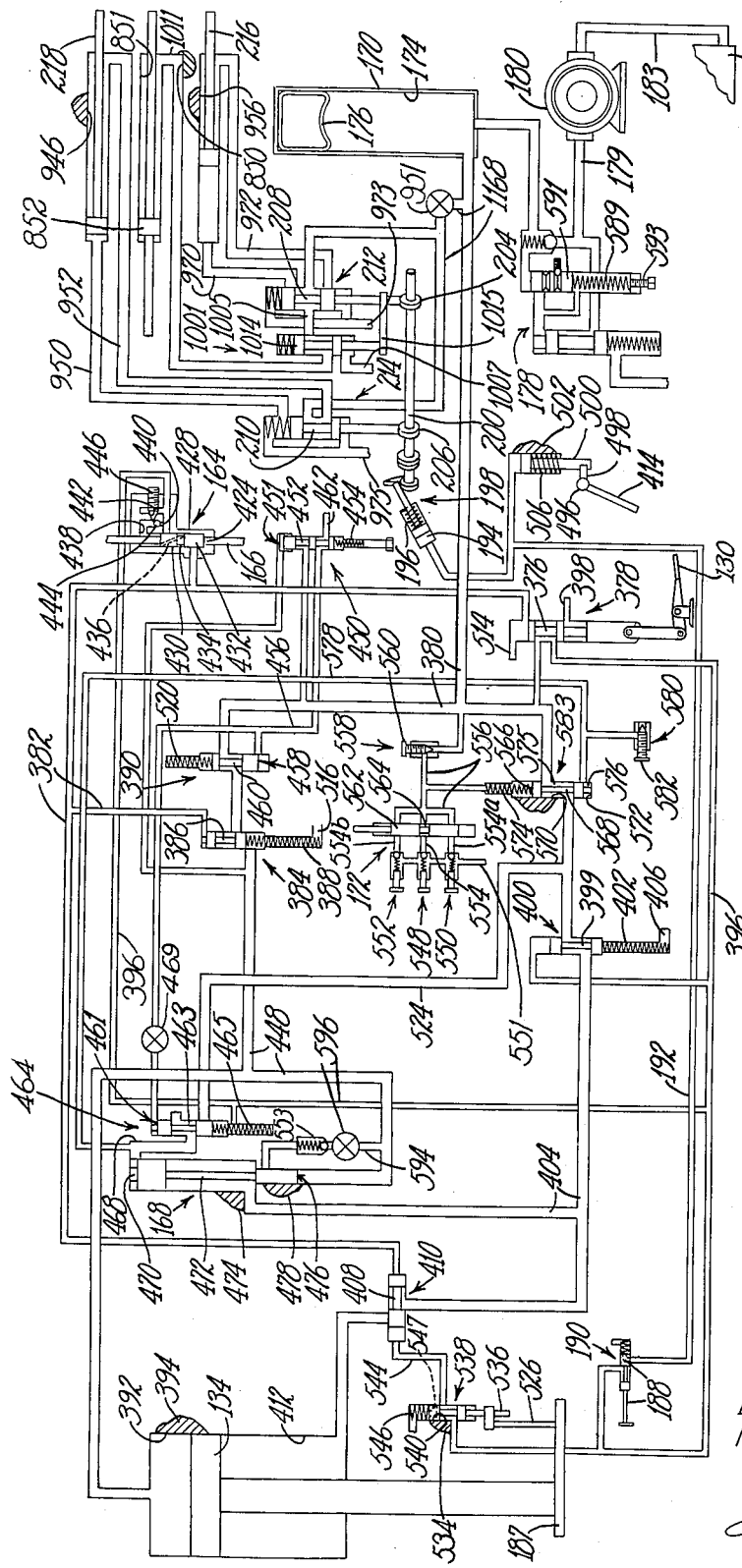
Fig. 58 shows diagrammatically fluid pressure means of the machine when the machine is idle.

The one-revolution clutch 136 (Figs. 4, 45, 46 and 47) for operatively connecting the sliding beam 160 to the actuator 138 is tripped by mechanism hereinafter described and comprising a timer and clutch trip unit 164 (Figs. 12, 51, 58, 59 and 60) initially rendered active in response to movement of a plunger 166 initially moved in response to partial depression of the treadle 130 and later by oil the pressure of which has been raised by a booster or booster unit 168 (Figs. 58 and 59). To insure against displacement of the work while the nails 124 are being driven into said work it is desirable to increase the downward pressure under which the shoe mounted upon the jack 110 is initially forced against the heel. Accordingly, the piston 134 has associated with it the booster unit 168 which is operative in response to pressure of oil from an accumulator 170 to increase pressure of the jack 110 against the work, maximum pressures exerted upon the work by the jack during the attachment of the heel 102 to the shoe 100 and the attachment of the top lift 104 to the heel respectively being limited by a pressure regulator 172 (Figs. 58, 59, 53 and 54).

The accumulator 170 (Figs. 58 and 59) has an oil chamber 174 in the upper end of which is secured an air bag 176 having commonly an internal pressure of approximately 175 lbs. per square inch, said accumulator having associated with it an unloader or unloader unit 178 which when pressure in the accumulator reaches the desired maximum, spills oil supplied by a line 179 from a gear pump 180 into a sump 182 consisting of the base housing of the main frame 142 (Fig. 5), the oil having a level indicated by reference numeral 185. Positioned in the base housing 193 is a hood 189 in which is positioned a filter 191 through which oil is supplied to the pump 180 by a line 183.

The jack 110 (Figs. 2 and 3) is journaled upon a slide 184, which is initially adjusted in a guideway 186 of a platform 187 secured to the lower end of the piston 134, for movement between a forward or loading and unloading position on the one hand and a rear, vertical or pressure applying position on the other hand.

Figure 30A:
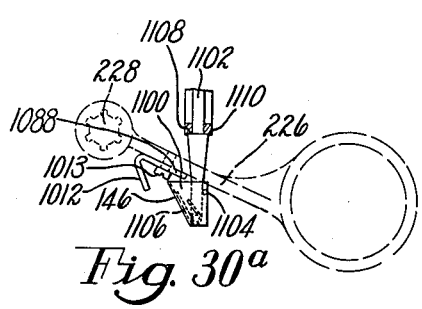
Fig. 30a is a plan view of the loader block in its rest position and mechanism, partly in section, actuated in response to swinging movement of the loader block from its rest position toward the nailing die, for tripping a one-revolution clutch of the nail distributor to cause a load of nails to be delivered to the nail delivering unit.
Figure 33:
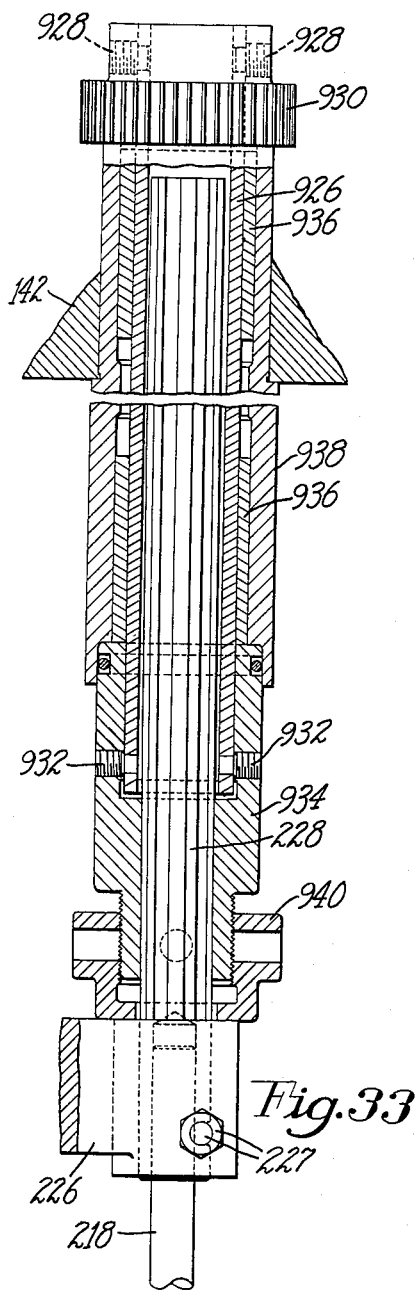
Figs. 33 and 34 show in vertical section portions of mechanism for supporting and actuating the arm of the loader block.
Figure 34:
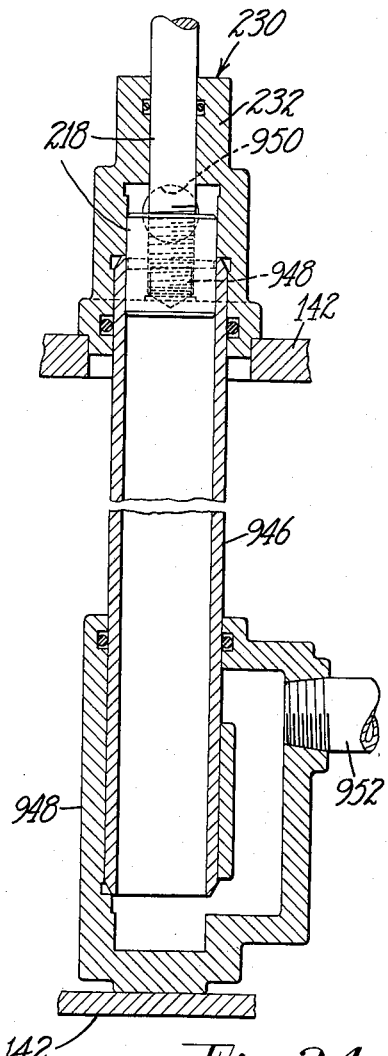
Figure 45:
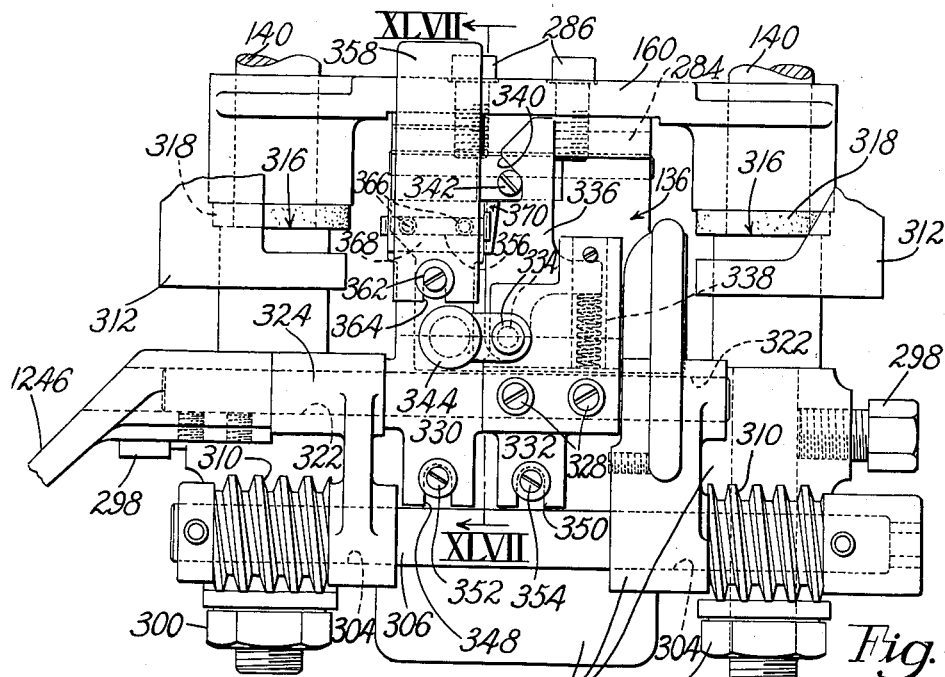
Figs. 45 and 46 are front and side views respectively of a one-revolution clutch for operatively connecting a sliding beam, which carries a nail driver head, with a constantly reciprocating actuator of the machine.

Nails 124 or 124a are supplied automatically to the passages 126 of the nailing die 120 in response to movement of a plunger 188 (Figs. 39, 58 and 59) of a valve 190, which supplies to a line 192 oil under accumulator pressure to effect sliding movemnet of a plunger 194 (Figs. 35, 37, 38, 58 and 59), against the action of a combined pressure and torque spring 196 to trip a one-revolution clutch 198. Secured to a shaft 200 fixed, when the clutch 198 has been tripped, to a driven gear 202 are a pair of cams 204, 206 which actuate plungers 208, 210 respectively of valves 212, 214 adapted to control movement of pistons 216, 218 which regulate respectively horizontal swinging and vertical movements of a loader block 220. When the machine is idle the loader block 220 is in its rest position shown in Figs. 1, 2 and 26 and has in a selected number of its passages 222 (Fig. 27), determined by a selector plate 224, which may be considered part of the loader block, a load of nails 124. Upon depression of the plunger 188 (Fig. 58) and the resulting movement of the piston 216 to the left, as viewed in Fig. 26, the loader block 220 and an arm 226 which carries it swing from their rest positions to position over the nailing die 120 (Fig. 30) in which positions there is a short dwell while the loader block dumps its load of nails into passage 126 of said die. The loader block arm 226 which is secured to a splined shaft 228 by a draw bolt 227 (Figs. 30 and 33) is then swung back to its rest position and is lowered together with the splined shaft until it engages a stop face 230 (Fig. 34) of a housing 232 secured by screws 233 (Fig. 12) to the main frame 142, said arm 226 then being swung into a position in which the loader block is positioned beneath a nail supplying unit 234 (Figs. 2, 29 and 32) to receive nails delivered from a nail distributor 236 (Figs. 1, 2, 3 and 7), said arm and the loader block thereafter retracing their movements until they arrive in their rest positions.

In order to insure against the machine, during the driving of nails into the work, pounding and thus shaking the floor and interfering with the operation of distributors (not shown) of the type now generally in use in heeling machines, a drive shaft 238 of the machine is provided with front and rear flywheels 240, 242 (Figs. 2 and 5) which rotate at the same angular velocities in opposite directions about a common axis 243 and overlap lengthwise of said axis.

The nail distributor 236 which may be advantageously used with the illustrative machine is described and claimed in said United States Letters Patent No. 2,604,624. The throw of a crank 244 which is carried by the flywheel 240 and has mounted upon it a connecting rod 246 may be varied, said flywheel 240, crank and connecting rod being automatically balanced dynamically with relation to the axis 243 for different throws of said crank by the use of mechanism such as is described and claimed in United States Letters Patent No. 2,561,344, granted July 24, 1951 on an application filed in our names.

The drive shaft 238 is journaled in a sleeve 248 (Figs. 5 and 12) and in a bearing 250 and has secured to its rear end a pulley 252 driven through belts 254 by a pulley 256 (Fig. 3) secured to a shaft 257 of an electric motor 259. The upper end of the connecting rod 246 is pivotally mounted upon a pin 258 (Fig. 1) secured to the actuator 138, said actuator when the machine is powered, constantly reciprocating vertically upon the guide rods 140.

In order initially to position the drivers 146 so that they shall drive nails 124 to predetermined depths into the work or flush with the work it is desirable that the driver holder housing 148 shall be vertically adjusted with relation to the sliding beam 160 upon which it is mounted. The drivers 146 are sometimes positioned to drive the nails 124 flush with the top lift receiving face 128 of the built-up leather heel 102 but are usually set to leave the nails projecting beyond said top lift receiving face so that top lifts 104 can be "spanked" onto the heels or the drivers are positioned to drive the nails 124a substantial distances into the rubber heels 108, heads of the nails stopping at metal washers 260 (Fig. 62).

Figure 49:
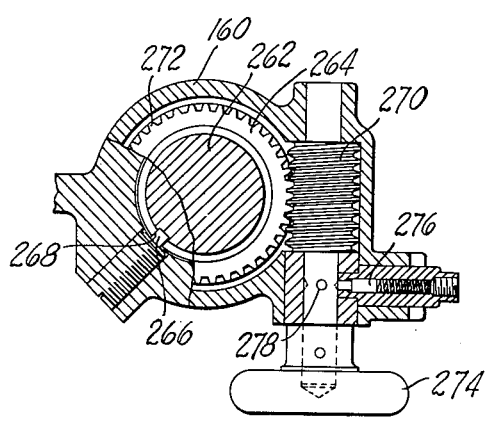
Fig. 49 is a view on line XLIX—XLIX of Fig. 48 showing mechanism by the use of which a driver head can be initially adjusted with relation to the sliding beam to vary the distance which nails are driven into the work.

With the foregoing in view, the housing 148 for the holder 144 of the driver head 122 has a threaded shank 262 (Figs. 4, 19, 48 and 49) on which is mounted an internally threaded nut 264 rotatable in a bore of a boss of the sliding beam 160. The threaded shank 262 of the holder housing 148 is constrained against rotation in the sliding beam 160 by a dog point set screw 266 threaded into said beam and fitting in a vertical slot 268 (Figs. 48 and 49) in said shank. The driver head 122 may be moved into different vertically adjusted positions upon the sliding beam 160 by the use of a worm 270 which is rotatably mounted in the beam and which meshes with a worm gear 272 of the nut 264 and has secured to it a hand wheel 274, said worm being held in different adjusted positions in the sliding beam by the engagement of a spring-pressed plunger 276 slidingly mounted in an insert secured to the beam with one of a plurality of circumferentially spaced recesses 278 in a shank portion of the worm.

As above explained, the sliding beam 160 is operatively connected for vertical reciprocation to the impeller 138 by the clutch 136 which comprises a locking lever 280 (Figs. 46 and 47) pivoted on a pin 282 secured to a lug 284 which is secured by screws 286 (Figs. 4, 45 and 48) to, and may be considered part of, the sliding beam 160, said lever having a flanged lower end movable, when the impeller 138 is at the bottom of its stroke, into a recess 288 of a wear plate 290 screwed to and forming part of the impeller. The locking lever 280 is constantly urged counterclockwise as viewed in Figs. 46 and 47 about the pivot pin 282 by a spring 292 opposite ends of which fit in recesses 294, 296 of the lug 284 of the sliding beam 160 and the lever 280 respectively.

Normally secured to the lower ends of the rods 140 by screws 298 and nuts 300 is a supporter yoke 302 having alined bores 304 (Figs. 4 and 45) in which is rotatably supported a shaft 306. As above stated the upper ends of the vertical rods 140 are threaded into the bracket 154 of the main frame 142, said rods having secured to their lower ends worm gears 308 which mesh with worms 310 secured to the shaft 306. The vertical guide rods 140 have enlarged portions which fit slidingly in bores of guide brackets 312 secured by screws 314 to the main frame 142 and have mounted upon them in engagement with their shoulders 316 fiber collars 318 for limiting downward movement of the sliding beam 160. As will be explained later, it is desirable that when the sliding beam 160 is in its lowered waiting position in engagement with the fiber collars 318 the locking lever 280 shall be positioned to swing into the recess 288 of the impeller 138 and in order to insure such action the shaft 306 may be initially rotated in the yoke 302 by the use of a hand crank 320 (Fig. 4), after releasing the screws 298, initially to raise or lower said rods the same distances to the desired positions.

Figures 46, 47:
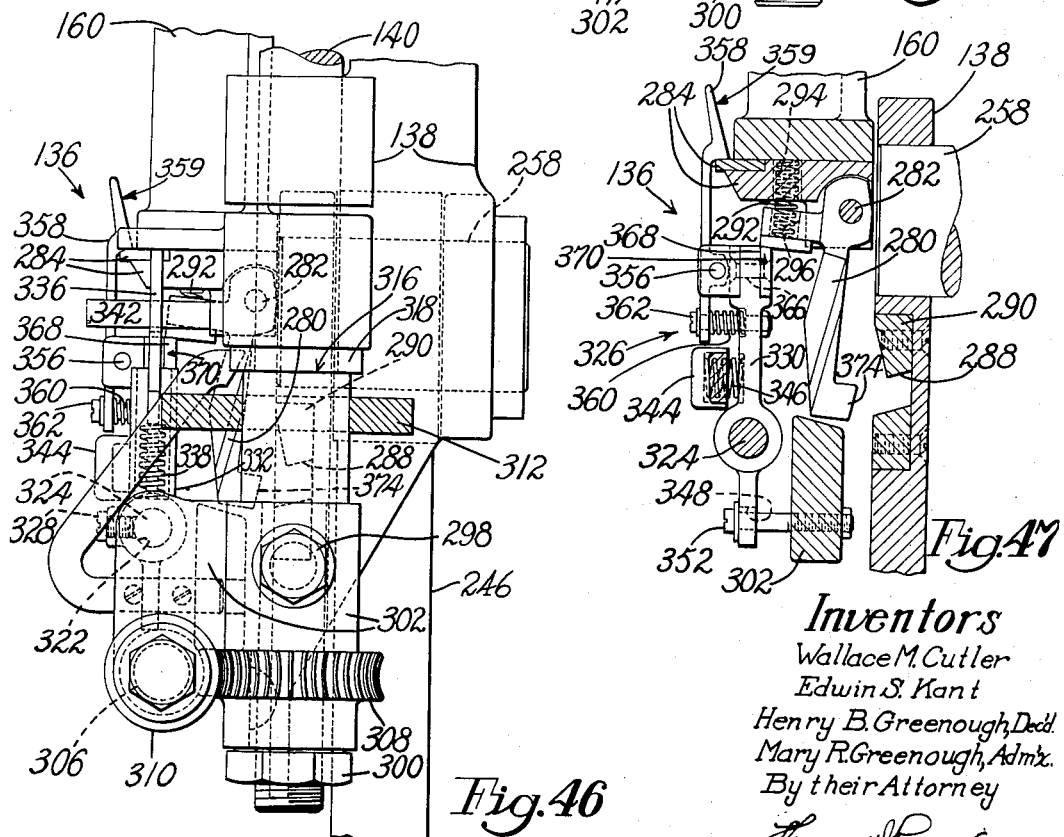
Fig. 47 is a section on line XLVII—XLVII of Fig. 45.
Figure 48:
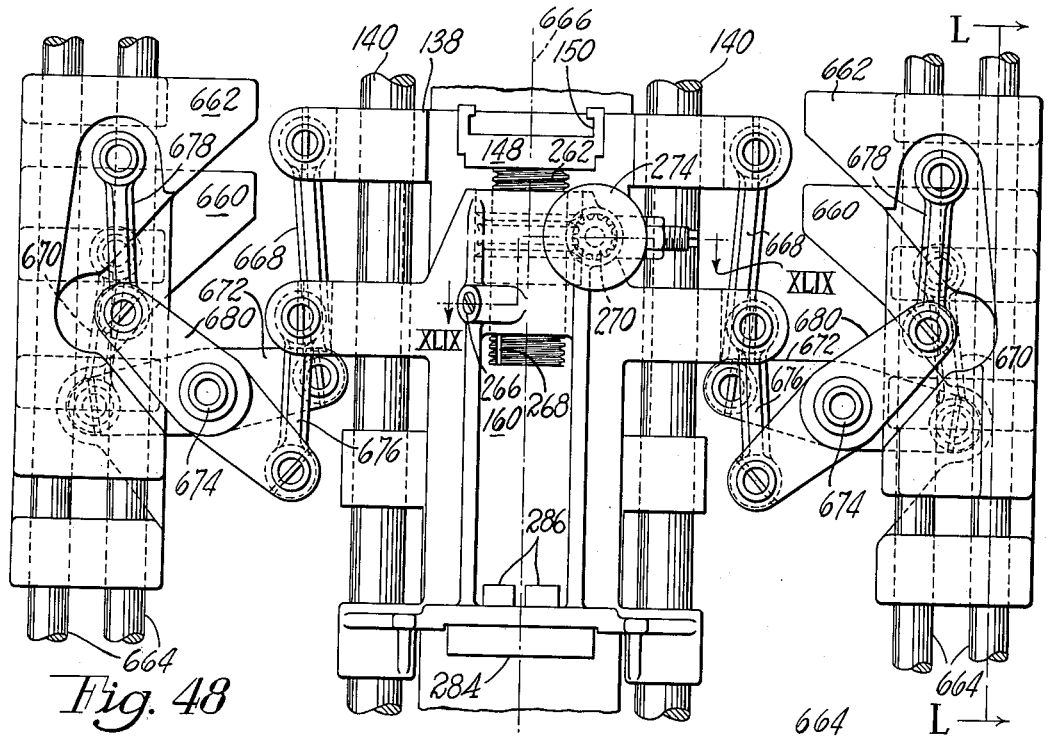
Fig. 48 shows in front elevation the sliding beam and the actuator together with balancing mechanism associated therewith.

Rotatably mounted in alined bores 322 (Figs. 45 and 46) of the supporting yoke 302 is a shaft 324 upon which, as will be explained later, is swiveled a clutch trip and latching unit 326 (Fig. 47). Fulcrumed upon and secured by screws 328 to the shaft 324 are levers 330, 332 respectively. The lever 332 carries a bearing stud 334 having pivoted on it a connector plate 336 which is constantly urged counterclockwise as viewed in Fig. 45 about said stud by a compression spring 338 upper and lower ends of which engage the plate and the lever respectively. When the sliding beam 160 is in its lowered or rest position shown in Figs. 45, 46, and 47 counterclockwise movement of the connector plate 336 is limited by the engagement of an inclined face 340 of the plate with a pin 342 fixed to the sliding beam 160.

Formed integral with the lever 332 is a spring retaining lug 344, front and rear ends of a coil spring 346 (Fig. 47) being seated in sockets of the lug and the lever 330 respectively. The levers 330, 332 have at their lower ends slots 348, 350 (Fig. 45), said levers respectively being rotatable about and together with the shaft 324 between limits determined by screws 352, 354 which are secured to the supporter yoke 302 and pass through said slots. Fulcrumed on a pin 356 carried by the lever 330 is a detent 358 which has a cam surface 359 and is constantly urged clockwise as viewed in Figs. 46 and 47 with relation to said lever by a spring 360 mounted on a screw 362 which is secured to said lever and passes through a slot 364 (Fig. 45) of the detent. Secured by screws 366 to the upper portion of the lever 330 is a latch plate 368 which has an inclined surface 370 and behind the right-hand end of which as viewed in Fig. 45 lies a portion of the connector plate 336, when the sliding beam 160 is in its lowered or rest position.

When the vertically reciprocated impeller 138 is in its lowermost position it is substantially at rest momentarily and has its recess 288 arranged in opposed relation to a flange 374 of the lever 280. Upon actuation of the timer and clutch trip unit 164 the shaft 324 is rotated counterclockwise as viewed in Fig. 46 by mechanism which will be hereinafter described, causing said lever 332 and accordingly the connector plate 336 to swing counterclockwise about the axis of said shaft 324 with the result that the lever 330, the latch plate 368 of which at that time is in front of the connector plate, is also rotated counterclockwise. Such movement of the lever 330 causes the detent 358 to be moved away from the lug 284 of the sliding beam 160 and permits the locking lever 280 to swing, under the action of the spring 292, into a position in which its flange 374 engages the front face of the impeller 138 and enters the recess 288 of the impeller 138 when said recess is in proper registry with the flange. When the one-revolution clutch 136 has been thus engaged the sliding beam 160 moves through a cycle with the impeller 138 causing upward movement of the driver head 122 and accordingly the driving of the nails 124 or 124a, which are in the passages 126 of the nailing die 120, into the work. As the sliding beam 160 is raised from its rest or waiting position the pin 342 cams the connector plate 336 about the bearing stud 334 and moves said plate from behind the latch plate 368 causing the lever 330 actuated by the spring 346 to swing back to its vertical position shown in Fig. 46 in which the connector plate 368 is in a position to be engaged by the locking lever 280 as the sliding beam moves to its lowered position in order to withdraw said locking lever 280 from the recess 288 of the impeller 138. As the shaft 324, in response to movement of the plunger 166 (Fig. 60), returns to a rest position the inclined surface 370 of the latch plate 368 cams the connector plate 336 clockwise, as viewed in Fig. 45, said connector plate then returning to its vertical rest position shown in Fig. 45 behind the latch plate and against the pin 342 ready to effect, through the above-disclosed mechanism, the tripping of the one-revolution clutch 136 when the shaft 324 is again actuated.

Referring to the hydraulic diagrams shown in Figs. 58, 59 and 60, when the operator depresses the treadle 130 a plunger 376 (Fig. 51) of a treadle, control or starter valve 378 is raised from its closed or rest position or setting shown in Fig. 58 a sufficient distance toward its displaced or open position or setting shown in Fig. 59 to make available oil in a line 380, which is connected to the accumulator 170, to a line 382 leading to an upper face of a plunger 386 of a main cylinder control valve 384 and thus causing said plunger to be moved from its raised or rest position shown in Fig. 58 to its lowered position shown in Fig. 59 against the action of a compression spring 388. When the plunger 386 has been thus displaced, oil under accumulator pressure passes through a back pressure locking or cut-off valve 390 and through the main cylinder control valve 384 into a chamber 392 formed by a main cylinder 394 and the piston 134 which, as above explained, is operatively connected to the jack 110. When the treadle valve 378 has been raised sufficiently to depress the main cylinder control valve 384 as above explained, a line 396 becomes accessible to an exhaust port 398 and this results in a plunger 399 of a main cylinder control valve 400 being raised by a spring 402 from its position shown in Fig. 58 to its position shown in Fig. 59 and in cutting off a line 404 from a source of oil under accumulator pressure and the rendering of said line accessible to an exhaust port 406. Simultaneous with oil under accumulator pressure becoming accessible to the line 382 a piston 408 of a lift cutoff valve 410 is caused to move to the left from its position shown in Fig. 58 to its position shown in Fig. 59 with the result that a lower chamber 412 formed by the cylinder 394 and the piston 134 is opened to the exhaust port 406. In view of the foregoing, it will be clear that when the plunger 376 has been raised a substantial distance from its full line position shown in Fig. 58, the shoe upon the jack 110 is forced with preliminary pressure against the heel 102 which is positioned in the carrier 116 supported by and above the nailing die 120.

Figure 18:
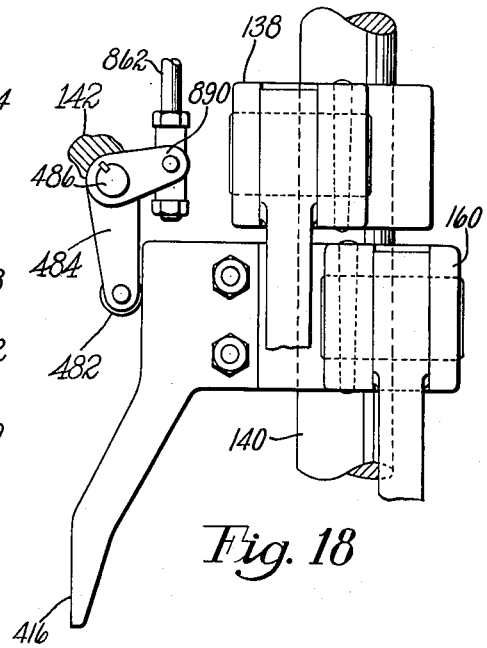
Fig. 18 shows in side elevation a cam, which is secured to a part of the nail driving mechanism of the machine, for actuating the detent mechanism shown in Figs. 16 and 17 and for releasing a latch which locks a plunger of a treadle valve of the machine in a raised position.

When the plunger 376 of the treadle valve 378 has been moved to its position shown in Fig. 59 it is locked thereby mechanism hereinafter described and comprising a spring actuated latch 414 (Figs. 12, 51, 52, 58 and 59), until being automatically released by mechanism which is hereinafter described and comprises a trip cam 416 (Figs. 18 and 51) carried by the sliding beam 160. As above explained, the loader block 220 is operated when the jack is in its rest position, the work usually having been removed from the machine. During a portion of the cycle of the loader block 220 it is desirable to insure against operating the jack 110, and accordingly the latch 414 operated by mechanism hereinafter described may be moved into a position over a portion of a block 418 to serve as a stop preventing the treadle 130 from raising the plunger 376 from its rest position shown in Fig. 58.

Before fully depressing the treadle 130 to effect through mechanism hereinafter described the driving of nails into the work, the operator, may release the treadle which, acted upon by a spring 420 (Figs. 12, 51 and 52), moves back to its raised rest position. Before the latch 414 becomes operative to retain the plunger 376 of the treadle valve 378 in its position shown in Fig. 59, the treadle has to be depressed approximately to the bottom of its stroke, limited by the engagement of a screw 421 (Fig. 51) threaded into the treadle with the machine frame 142, against the opposition of the spring 420 as well as against the action of the plunger 166 of the timer and clutch trip unit 164, the construction and arrangement being such that before tripping the one-revolution clutch 136, oil under booster pressure is available for the upper chamber 392 to force with secondary pressure the heel seat of the shoe 100 mounted upon the jack 110 against the heel 102 upon the nailing die 120. In the event that the treadle 130 has been only partially depressed and the operator is not satisfied that the shoe 100 and the heel 102 are correctly positioned in the machine the treadle may be released with the result that the plunger 376 is moved back to its rest position shown in Fig. 58 preparatory to correctly positioning the work in the machine. Movement of the treadle 130 to its raised position is limited, as will be hereinafter explained, by the engagement of a screw 422 with the main frame 124.

When the plunger 376 of the treadle valve 378 has been moved to its raised latched position shown in Fig. 59 the plunger 166 has been raised to a position in which the line 382 is accessible to a face 424 of the plunger 166, oil being admitted to a chamber 426 (Fig. 60) formed by said face and by a casing 428 in which the plunger slides. The plunger 166 comprises a spool 430 which forms with a spool 432 and the casing 428 an annular pocket 434, a diagonal bore 436 extending between said pocket and the upper end of the spool 430. A chamber 438 formed by the casing 428 and the spool 430 is accessible to the line 396 through passages 440 and 442, in the former of which is a one-way ball check 444, and in the latter of which is an adjustable conical throttle screw 446. When oil under high pressure acts against the face 424 of the plunger 166 it slowly forces the plunger upward, as viewed in Figs. 58, 59 and 60, pocketed oil in the chamber 438 being forced through the restricted passage 442 into the line 396 then connected to the exhaust port 398. When the plunger 166 has been raised by pressure of oil against its face 424 to a position in which the annular pocket 434 registers with the line 396, oil in the chamber 438 passes through the diagonal bore 436 and said pocket into the line 396, the plunger 166, because of the sudden releasing of the resistance to its upward movement as viewed in Figs. 58, 59, and 60 moving, through mechanism hereinafter described, the shaft 324 counterclockwise as viewed in Fig. 47 to trip the clutch 136 thereby coupling the sliding beam 160 to the impeller 138. The time required for pressure against the face 424 of the plunger 166 to overcome the resistance encountered by the plunger 166 may be varied by moving the throttle screw 446 into different adjusted positions in the casing 428.

When the work has been clamped under preliminary pressure in the machine, oil pressure builds up in lines having access to accumulator oil one of such lines being the line 382 which supplies pressure to the face of the plunger 166 when said face has been moved into communication with said line. At this time oil in a line 448 is in communication with a face 451 of a plunger 452 of a booster and back pressure pilot valve 450 causing said valve to slide against the action of an adjustable spring 454 from its position shown in Fig. 58 to its position shown in Fig. 59. Such action results in accumulator oil being available to raise the pressure of oil in a line 456 and to act upon a face 458 of a plunger 460 of the back pressure locking valve 390, said line 456 heretofore having been in communication with an exhaust port 462, and resulting in the plunger 460 being slid to its position shown in Fig. 59 to prevent, for reasons which will appear later, oil in the line 448 under booster or secondary pressure being pumped back into the accumulator 170. High pressure oil in the line 456 is also available at this time for a face 461 of a plunger 462 of a valve 464 which controls the booster unit 168 and may be defined as a booster or booster unit pilot or control valve, causing said plunger to be moved against the action of a spring 465 from its position shown in Fig. 58 to its position shown in Fig. 59 to admit oil through a line 468 to a relatively large face 470 of a plunger 472 of the booster unit 168, said plunger 472 being slidable in a cylinder 474 the lower end of which at that time is open through the line 404 to the exhaust port 406. The lower end of the plunger 472 has a relatively small face 476 which is slidable in a cylinder 478 shown continuous with the line 448, the construction and arrangement being such that the plunger 472 raises the pressure of the oil in the line 448 which is sealed by the back pressure locking valve 390 against flowback of oil to the accumulator 170, said oil entering the chamber 392 to depress the piston 134 and accordingly the jack 110 under secondary or augmented pressure. The line 456 preferably has incorporated in it a throttle valve 469 for varying the timing between the back pressure locking valve 390 and the booster control valve 464.

The adjustment of the screw 446, which together with the passage 442 into which it is inserted may be referred to as a throttle valve, is such that the plunger 166 of the timer and clutch trip unit 164 does not move into a position to cause the one-revolution clutch 136 to be tripped until oil operating under full secondary pressure has already forced the jack 110 against the work.

Upon actuation of the clutch 136 the driver head 122 and accordingly the drivers 146 are raised, as above explained, to drive nails 124, then in the nail passages 126 of the nailing die 120, through the heel 102 and the heel seat of the shoe 100, said nails being clinched as best shown in Fig. 61 against a heel-plate 480 of the last 112. As the driver head 122 is lowered the locking lever 280 carried by the sliding beam 160 is withdrawn from the recess 288 of the impeller 138 upon engagement with the plate 368 and simultaneously therewith the detent 358 moves to its active position over the lug 284 of the sliding beam 160 causing the beam to come to rest at the lower end of its stroke.

Figure 51:
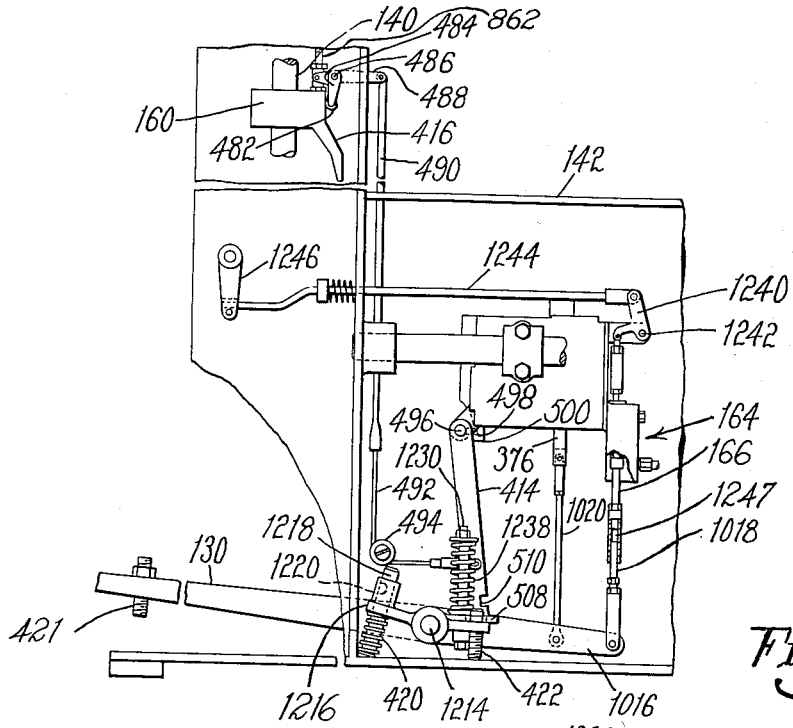
Fig. 51 is a schematic view showing in side elevation the treadle mechanism for operating fluid pressure means of the machine and for tripping the clutch illustrated in Figs. 45 to 47 and also showing latching mechanism whereby the operator loses control of the machine at the time the clutch is tripped.
Figure 52:
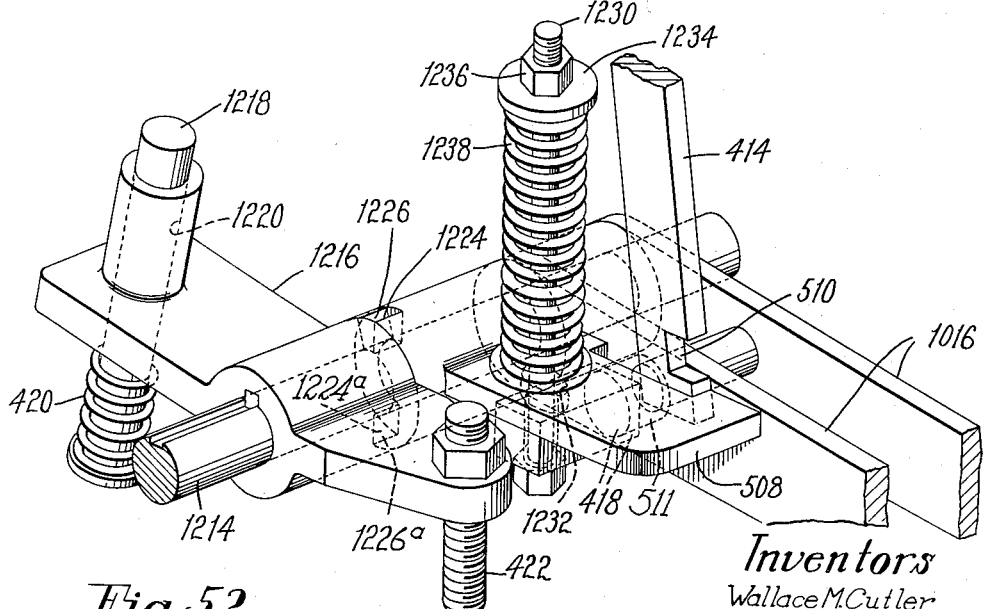
Fig. 52 is a perspective showing on an enlarged scale portions of the treadle valve mechanism illustrated in Fig. 51.

As the sliding beam 160 is raised the trip cam 416 secured to said beam engages a roll 482 (Figs. 4, 18 and 51) carried by the lower end of an arm 484 secured to a shaft 486 journaled in the main frame 142. Also secured to the shaft 486 is an arm 488 pivotally connected to a rod 490, the lower end of which has secured to it a cable 492 extending over a pulley 494 rotatable in the main frame 142 and secured to the latch 414 which is fixed to a shaft 496 also rotatable in the main frame. Secured to the shaft 496 is an arm 498 operatively connected to a plunger 500 (Figs. 51, 58 and 59) which is slidable in a bore of a cylinder 502 and is urged upward as viewed in Figs. 51, 58 and 59 by a spring 506. When the machine is at rest, as illustrated in Figs. 51 and 52, the latch 414 is biased counterclockwise against a plate 508, which forms part of the treadle operated mechanism, by the action of the spring 506. As will be explained later, when the plate 508 is raised, upon depression of the treadle 130, the latch 414 swings counterclockwise, as viewed in Figs. 51 and 52, under the action of the spring 506 causing upper and lower faces of a notch 510 formed in said latch to straddle the plate 508, which is operatively connected to the plunger 376 of the treadle valve 378, to retain said plunger in the position shown in Fig. 59 and to hold said plunger in such position irrespective of whether or not the operator releases the treadle. When the sliding beam 160 reaches the upper portion of its path of travel the trip cam 416 secured to said beam engages the roll 482 on the arm 484 causing, through the above-described mechanism, the latch 414 to be swung clockwise, as viewed in Figs. 51 and 52, to move said latch away from the plate 508, thereby enabling treadle mechanism, which includes the plate 508 and is hereinafter described in detail, to move the plunger 376 to its rest position shown in Fig. 58, the latch as soon as it is released by the cable 492, as the cam 416 moves away from the roll 482, being again biased against the plate 508 by the action of the spring 506.

As above explained, while the loader block 220 is in operation it is desirable to insure against the jack 110 being moved toward the nailing die 120 and accordingly, when the plunger 188 of the valve 190 is operated causing oil in the line 192 to be raised to accumulator pressure, the plunger 500 is depressed against the action of the spring 506 sufficiently to swing the latch 414 over a cylindrical portion 511 of the block 418, which forms part of the treadle mechanism, thereby preventing the plunger 376 of the treadle valve 378 from being raised.

Movement of the plunger 376 of the valve 378 to its rest position shown in Fig. 58 causes oil under accumulator pressure to be admitted to the line 396, shuts oil supplied by the accumulator from the line 382, and opens said line 382 to an exhaust port 514. High pressure oil in the line 396 depresses, against the action of the spring 402, the plunger 399 to its position shown in Fig. 58, thus allowing oil under accumulator pressure to enter the chamber 412 (the lift cut-off valve 410 at this time being open), and the opening of the line 382 to the exhaust port 514 causes the plunger 386 of the main cylinder pilot valve 384 to move under the action of the spring 388 to its rest position shown in Fig. 58 thereby opening the chamber 392 to an exhaust port 516 and closing the line 448 from the line 380. When the line 448 is open to the exhaust port 516 pressure against the face 451 of the plunger 452 of the booster and back pressure locking pilot valve 450 is released with the result that said plunger moves to its raised position shown in Fig. 58 thus opening the line 456 to the exhaust line 462 and causing the plungers 460, 463 of the back pressure locking valve 390 and the booster control valve 464 to move respectively under the action of their associated springs 520, 465 to their positions shown in Fig. 58, in which oil in the accumulator line 380 is cut off from line 448 by the main cylinder pilot valve 384 and in which the booster unit 168 is shut off by the control valve 464 from the oil then under accumulator pressure in a line 524. When the line 396 has accumulator oil available such oil is also available for the chamber 438 of the timer and clutch trip unit 164, and the line 382 communicating with the face 424 of the plunger 166 is open to the exhaust port 514 with the result that the plunger 166 is moved to its rest position shown in Fig. 58.

As oil under accumulator pressure is admitted to the chamber 412 of the cylinder 394, the chamber 392 at this time being connected to the exhaust port 516, the piston 134 and accordingly the jack 110 upon which the shoe is mounted are raised preparatory to attaching the top lift to the heel. During upward movement of the piston 134 the piston platform 187 engages a rod 526 (Figs. 1, 2, 3, 24, 58 and 59) fitting in a bore 528 (Fig. 24) of a sleeve 530 which is mounted for sliding movement in a guideway 532 formed in a housing 534 secured to the main frame 142 and which is pinned to the lower end of a plunger 536 of a pilot lift control or limit stop valve 538 slidable in a bore 540 of said housing. Threaded into the rod 526 is a thumb screw 541 which passes through an elongated slot 542 in the sleeve 530, the construction and arrangement being such that the rod 526 can be set in different adjusted positions with relation to the sleeve and accordingly the plunger 536 which is normally held in its lowered position shown in Figs. 24 and 59, in which the line 396 is closed from a line 544, by a spring 546, line 544 at this time being open to an exhaust port 547. Upward movement of the jack 110 causes the plunger 536 to move from its position shown in Fig. 59 to its position shown in Fig. 58, thus making oil under accumulator pressure available for the line 544, the line 382 at this time being open to the exhaust port 514, to move the piston 408 of the lift cutoff valve 410 to the right and accordingly cutting off accumulator oil from the chamber 412 and causing upward movement of the piston 134 to cease.

As above explained, it is desirable that the maximum pressure applied against the shoe by the jack 110 during the heel attaching operation shall be varied in accordance with the size and/or style of the shoe being operated upon and the resistance to the drive and accordingly there is provided the above-mentioned pressure regulator 172 (Figs. 3, 53, 54, 58 and 59) which comprises a plurality of pressure controlled valves or units 548, 550, 552. When men's shoes 100 are having their heels 102 attached and are having top lifts 104 spanked onto the heels the valves 548, 550 are commonly used, the valve 548 regulating the maximum pressure that can be applied to the jack when the built-up leather heel 102 is being attached to the shoe and the valve 550 regulating the maximum pressure that can be applied to the jack when a top lift is being spanked onto the heel. The valves 548, 550, 552 are connected to an exhaust line 551 and are selectively rendered accessible through ports or branch lines 554, 554a, 554b, respectively of the valves and a line 556 to the accumulator line 380, a bleeder valve 558 comprising an adjustable screw 560 being arranged between the lines 556 and 380. The valves 548, 550 and 552 are selectively rendered active by the use of a selector piston 562 which is operatively connected to the heel and top lift carrier 116 as will be hereinafter explained, the construction and arrangement being such that when the carrier is in a position in which the heel 102 is positioned over the nailing die 120 and accordingly beneath the jack 110 swung back to its vertical position, the piston 562 is in a position in which a recess 564 (Fig. 54) constantly in communication with the line 556 is in communication with the port 554 and when the top lift 104 is in a position ready to be spanked onto the heel said recess 564 is in communication with port 554a.

In communication with the line 556 is a face 566 of a plunger 568 which is slidable in a cylinder 570 and is normally held in its lowered position against a stop face 572 by a spring 574, an annular recess 575 of the plunger in said position affording access of oil in the line 380 to the line 524. Extending into a chamber 576 formed by the cylinder 570 and the plunger 568 in its lowered position is a line 578 which extends to an intake end of the booster unit 168 and has associated with it a bleeder valve 580 comprising a screw 582. A valve formed by the plunger 568 and the cylinder 570 may be described as a cut-off valve 583.

The pressure control valves 548, 550 and 552 comprise the ports 554, 554a and 554b (Fig. 54) which are normally closed by ball checks 586, 586a and 586b and any one of which may be selectively opened to the line 556 to spill at predetermined pressures through the exhaust line 551 oil delivered from said line 556 into the oil sump 182, the pressures at which the oil is spilled being dependent upon the loads applied by the use of hand screws 590, 590a, and 590b to springs 592, 592a and 592b which act against associated ball checks. The pressure control valves 548, 550 are used in the attachment of the built-up heel 102 to the shoe 100 and the spanking of the top lift 104 onto the heel, the springs 592, 592a respectively being so loaded that whenever pressure at the intake end of the booster unit 168 reaches a predetermined amount, oil delivered by the line 578 to the chamber 576, will cause the plunger 568 to move from its position shown in Fig. 58 to its position shown in Fig. 59 to stop delivery of oil to the line 524 and accordingly further downward movement of the plunger 472 of the booster unit 168. Should pressure of oil at the delivery end of the booster unit 168 drop below the desired maximum, the plunger 568 under the action of pressure in the line 556 and the action of the spring 574 will move the plunger back towards its normal position shown in Fig. 58 causing further downward movement of the plunger 472 thus insuring that a sustained maximum pressure shall be applied against the piston 134.

Extremely high leather heels are commonly attached to shoes in "decks," each constituting several lifts secured together. When such heels are attached to shoes three different operations are desirable, the base "deck," during the first cycle of the machine, being secured to the heel seat of the shoe by the use of a large number of nails clenched against the heel plate 480 (Figs. 61 and 62) of the last 112, the second "deck" being attached during a second cycle of the machine by a lesser number of nails to the first "deck" and to the heel seat of the shoe and during the third cycle of the machine the top lift being spanked onto the second "deck."

In the attachment of rubber heels 106 to shoes 100 pressure applied by the jack 110 against the work, if high, causes the rubber heel to be distorted, and since, in this type of work, only a small amount of pressure is necessary to hold the work against the driving force of the nails, the weight of the jack and the mechanism which carries it may be relied upon to hold the shoe in position while the nails are being driven. Accordingly, the machine is provided with a by-pass line 594 which extends between a portion of the cylinder 478 and the line 448 and has in it a ball check 553 and a throttle valve 596 which is fully or partially open when rubber heels are being attached to shoes and is closed when the machine is being used to attach built-up leather heels to shoes.

In attaching rubber heels 106 and their base lifts 108 to shoes 102 by the use of the above machine, the shoe mounted upon the jack 110 is positioned by the gaging mechanism 114 above the heel and its base lift in the carrier 118. After depressing the treadle 130 a short distance to cause the heel seat of the shoe 100 to be forced under preliminary pressure against the base lift 108 of the rubber heel 106 and insuring that the heel and the shoe are properly positioned with relation to each other, further depression of the treadle causes, after the plunger 472 of the booster unit 168 has been depressed slightly from its position shown in Fig. 58, the line 448 to be connected through the by-pass line 594 with the line 404 which is then open to exhaust line 406. Such action results in oil under pressure in the chamber 392 being opened up to exhaust pressure, the weight of the jack 110 and its operating parts then being the only forces acting against the jack to hold the work against the action of the nails being driven into said work. Before attaching rubber heels 106 to shoes 100 it is desirable so to regulate the pressure control valve 548 that the preliminary pressure of the jack 110 against the work is considerably lower than the preliminary pressure of the jack against the work when leather heels are being attached to the shoes. The pressure in the accumulator 170 may be varied by varying the effective strength of a spring 589, which acts upon a plunger 591 of the unloader unit 178, and is loaded and adjusted by the use of a hand screw 593.

Figure 6:
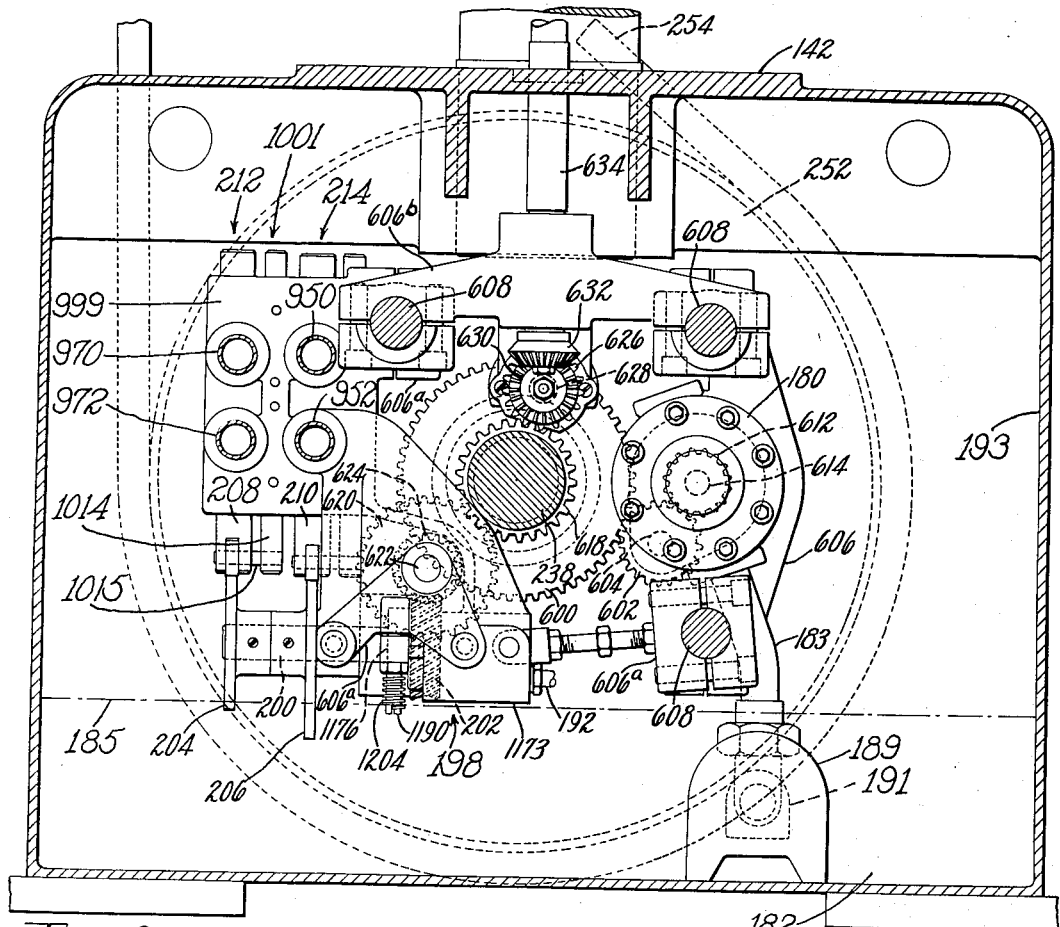
Fig. 6 is a view on line VI—VI of Fig. 5.
Figure 7:
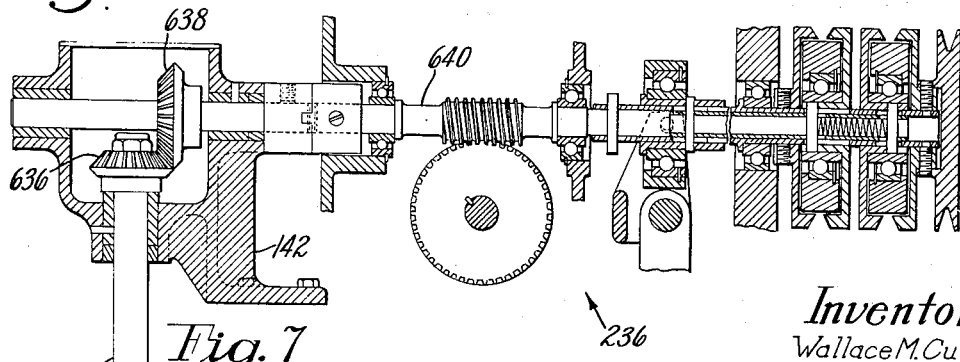
Fig. 7 shows a drive for a nail distributor used with the illustrative machine.

The main drive shaft 238, which is rotatably supported in bearings housed in a boss 250 and the sleeve 248, has secured to it a gear 600 (Figs. 5 and 6) meshing with a gear 602 rotatably mounted upon a shaft 604 journaled in a multipart bracket 606 which is bolted to tie rods 608 secured to the front and rear walls of the base housing 193, said bracket, rods and housing forming part of the main frame 142. Also meshing with the gear 602 is a gear 612 secured to a shaft 614 of the gear pump 180 which is connected by the line or pipe 183 with the oil sump 182 and which is connected through the unloader unit 178 (Figs. 58 and 59) to the accumulator 170.

Also secured to the main shaft 238 is a gear 618 meshing with a gear 620 secured to a shaft 622 which is rotatably mounted in a multipart bracket 606a and has secured to it a worm 624 forming part of the drive for the cam shaft 200 and operating, through mechanism hereinafter described, the loader block 220. The gear 618 also has meshing with it a gear 626 secured to a shaft 628 rotatably mounted in the multipart bracket 606b and fixed to the forward end of said shaft is a bevel gear 630 meshing with a bevel gear 632 secured to the lower end of a vertical shaft 634. Secured to the upper end of the vertical shaft 634 is a bevel gear 636 (Fig. 7) which meshes with a bevel gear 638 secured to a drive shaft 640 of the nail distributor 236 which, as above explained, is disclosed in detail in said Letters Patent No. 2,604,624.

Secured by bolts 642 (Fig. 5) to a flange 644 at the forward end of the drive shaft 238 is the front flywheel 240 to which the crank 244 is secured. As disclosed in detail in United States Letters Patent No. 2,561,344, granted July 24, 1951, on an application filed in our names, the crank 244 to which the nail driving head 122 is operatively connected may be adjusted in the front flywheel 240 with relation to the drive shaft 238 to vary the throw of said crank and accordingly the driving strokes of the nail drivers 146, the flywheel being dynamically balanced automatically about the axis 243 of said shaft for different adjusted positions of the crank upon the flywheel.

Considerable force is required to drive the nails 124 through the heel 102 and the heel seat of the shoe 112 and to clinch them against the heel plate 480 of the last 112. Accordingly, flywheels of heeling machines now in use have considerable mass and during the driving of said nails cause to be imparted to the machine a torque tending to turn the machine laterally. In order to eliminate jars which are caused by the sudden slowing down of the flywheel and which interfere with the feeding of nails in the distributor 236 as well as tire the operator and increase the wear and tear on the machine, the illustrative machine is provided with the rear flywheel 242 (Figs 2 and 5) which is concentric with and overlaps lengthwise of the axis of rotation 238, the front flywheel 240, the moments of inertia of the front flywheel 240 and the other driving masses operatively connected to and totating in the same direction about said axis as the front flywheel being equal to the moments of inertia of the rear flywheel 242 and the other driving masses operatively connected to and rotating in the same direction about said axis as the rear flywheel.

The shaft 238 has keyed to it as best shown in Figs. 10 and 11 a large bevel gear 646 which meshes with a pair of small bevel years 648 rotatably mounted in bearings 650 carried by the multipart bracket 606b. The rear flywheel 242 is secured by screws 652 (Fig. 5) to a flange of the sleeve 248 which is rotatbly mounted in bearings 654 supported by the main frame 142 and has secured to it by screws 656 a bevel gear 658 which meshes with the bevel gears 648. As the drive shaft 238 and accordingly the front flywheel 240 and other rotating parts secured to it rotate counterclockwise, as viewed in Fig. 1, the rear flywheel 242 and the other rotating parts secured to it rotate clockwise, and during the driving of the nails and accordingly slowing down of the shaft 238 the torque reactions about the axis 243 of the flywheels and the rotating parts which drive them respectively will be substantially equal and opposite and accordingly there is little if any tendency for the machine to vibrate laterally.

Figure 50:
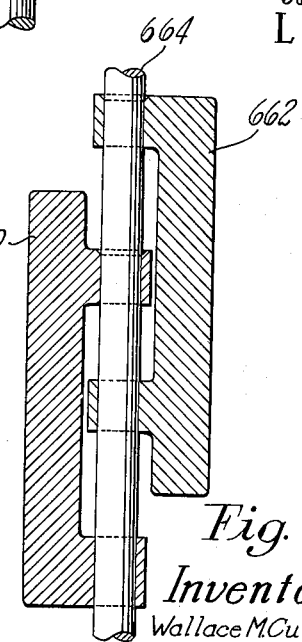
Fig. 50 is a section showing portions of balancing mechanism on line L—L of Fig. 48.

In order to insure against vertical vibration of the machine due to continued vertical reciprocation, when the machine is powered, by the impeller 138, and when the clutch 136 is engaged, by the actuator, the nail driving beam 160 and the nail driving mechanism carried by said beam, there are provided pairs of weights 660, 662 (Figs. 48 and 50) vertically slidable upon rods 664 which are fixed to and form part of the main frame 142 and are positioned equidistant from a vertical longitudinal plane 666 (Fig. 48) of the machine. The weights 660 are equal and their centers of mass are located equal distances at opposite sides of the axis 666, the combined mass of the weights 660 being equal to the mass of the actuator 138. The weights 662 are equal and have their centers of mass located equal distances at opposite sides of the axis 666, the combined mass of the weights 662 being equal to that of the sliding beam 160 and the nail driving mechanism carried by the beam links 668, 670 pivotally connected to the actuator 138 and to the weights 660 are pivotally connected to opposite ends of the levers 672 swiveled upon bearing rods 674 secured to the main frame 142, and links 676, 678 pivoted to the sliding beam 160 and to the weights 662 are pivotally connected to opposite ends of levers 680 which are also fulcrumed upon said rods 674. The arms of levers 672 and 680 respectively are of equal length. By providing the above described construction, the weights 660, 662 move substantially equal distances in directions opposite to the impeller 138 and to the sliding beam 160 respectively with which they are operatively connected and accordingly there is little if any tendency, due to vertical reciprocation of the actuator and the beam, for the machine to vibrate vertically.

The illustrative jack 110 comprises a post 682 the upper end of which is threaded into and secured to a header 684 supported upon a bearing sleeve 686 (Figs. 19 and 22) mounted upon a rod 688, opposite ends of said sleeve being supported by and secured to guide blocks 690 (Figs. 21 and 22) which are slidable along elongated guideways 692 formed in depending flanges of the slide 184 which is movable forward and rearward in the guideways 186 of the platform 187 of the piston 134.

Figure 1:
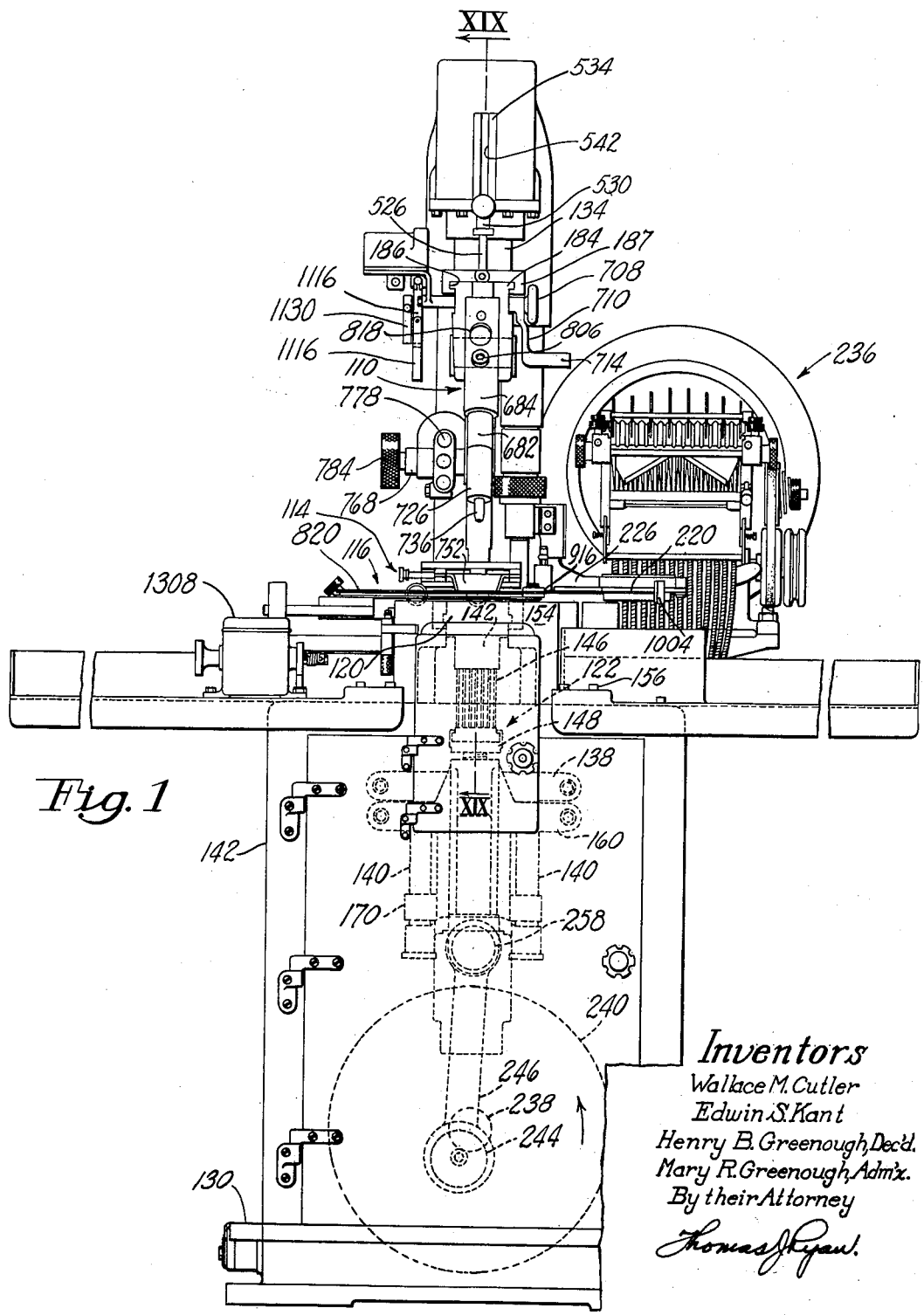
Fig. 1 is a front view of the illustrative machine.
Figure 2:
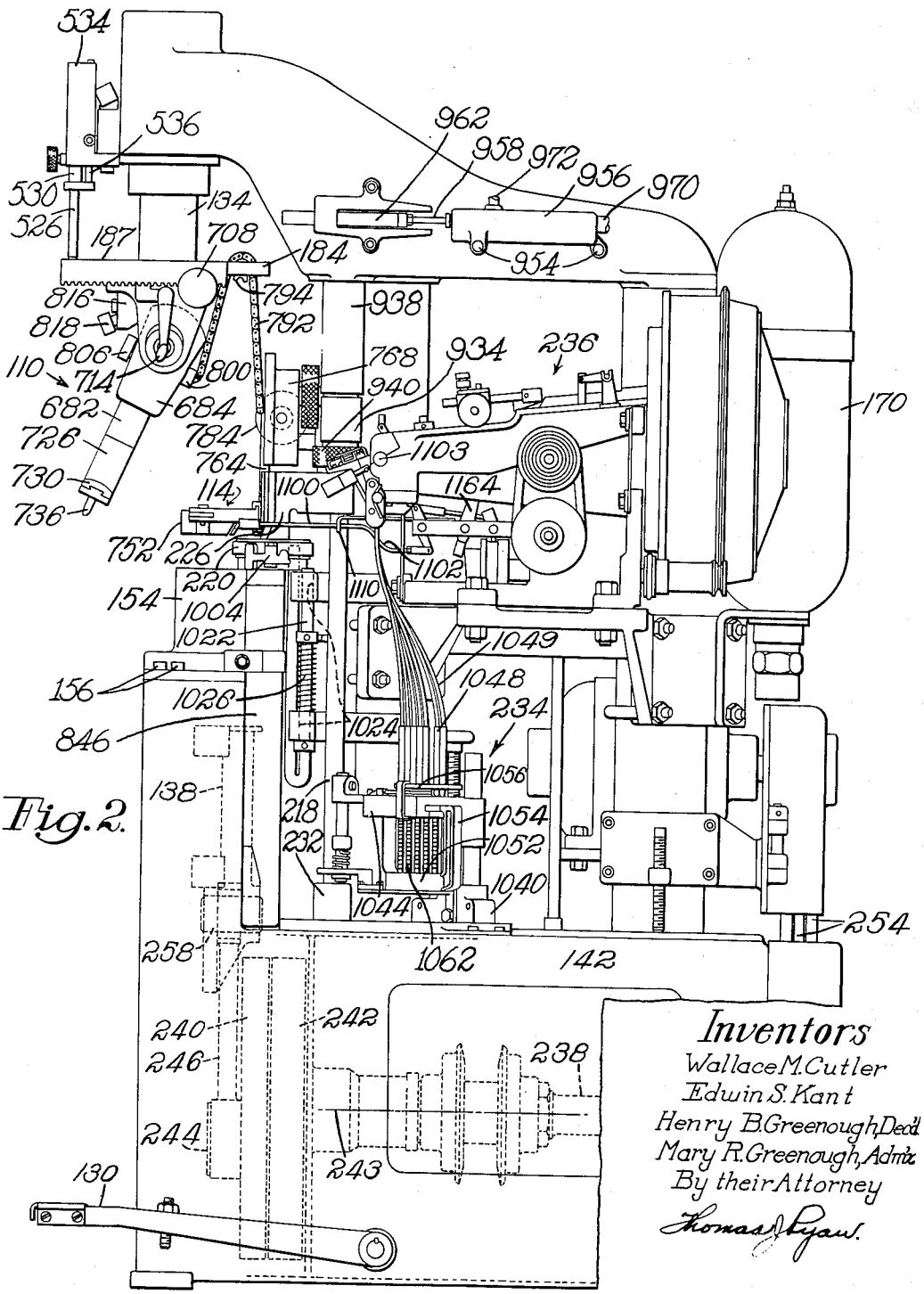
Figs. 2 and 3 are right and left side elevations of the machine.
Figure 3:
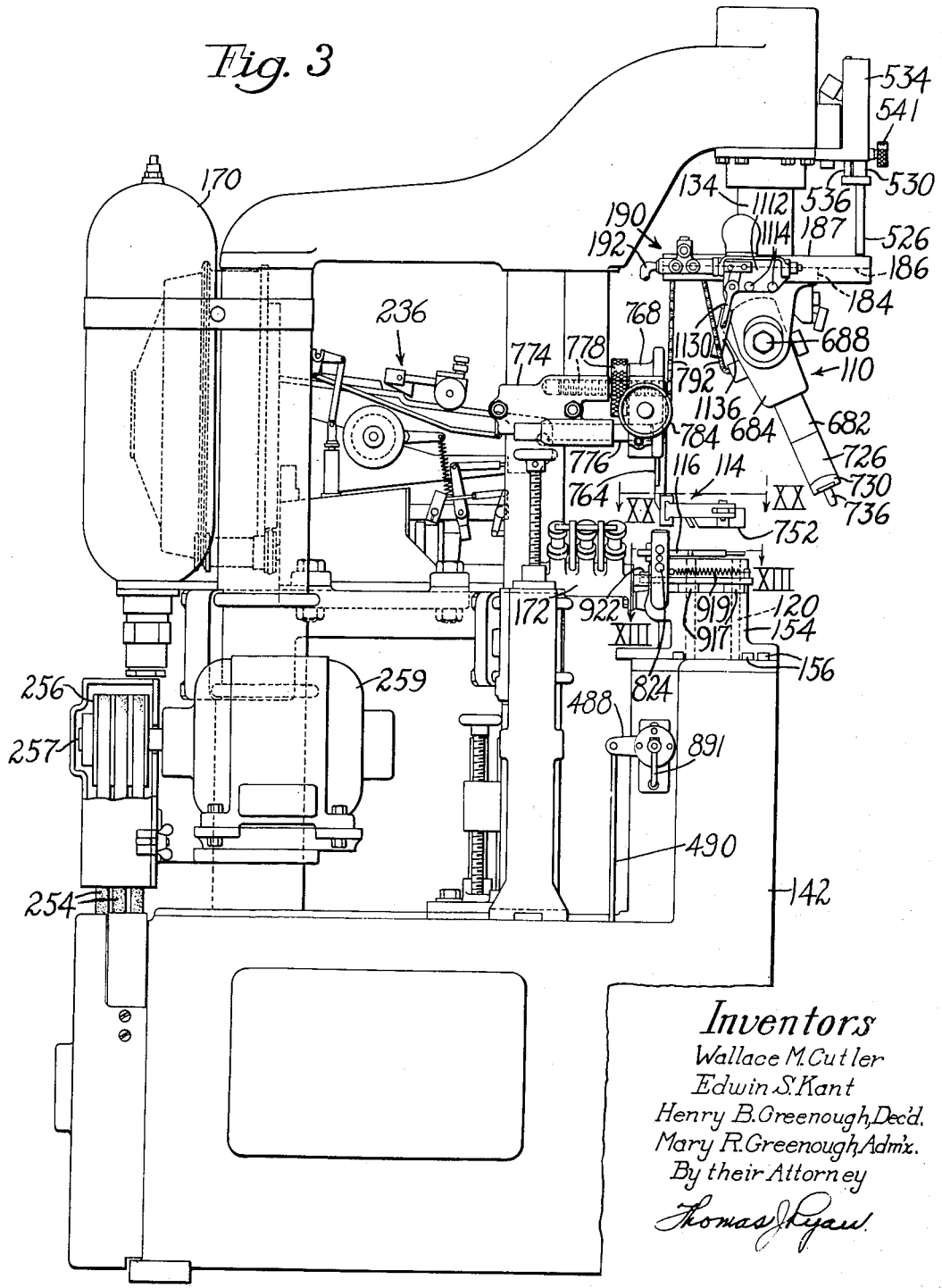

In order to insure against the tendency of the post 182 to swing forward about the bearing sleeve 686 when heavy pressure is applied against the work through the said post, the header 684 has at its upper end a wedge 694 which is arranged in opposed relation to a V-shaped notch 696 of a wedge block 698 secured by rods 700, 702 to the slide 184. The rod 702 has rotatably mounted upon it a pinion 704 (Fig. 21) which meshes with a rack 706 on the platform 187 and has secured to it a hand wheel 708 (Figs. 1, 2 and 21). Fulcrumed upon the right end of the pin 700, as viewed from the front of the machine, is an L-shaped latch 710 (Figs. 1 and 21) which has teeth 712 meshing with the rack 706 and which has secured to it a "slap" handle 714, said latch being constantly urged clockwise as viewed in Fig. 21 by a spring 716, which is housed partly in a bore of a lug 718 secured to the slide 184, to cause the teeth of the latch to engage teeth of the rack in order to secure said slide in its adjusted position in the guideway 186. After swinging the latch 710 counterclockwise, as viewed in Fig. 21, the hand wheel 708 is rotated to move the slide 184 to the desired adjusted position along the platform 187 of the piston 134 to insure that when the heel seat of the shoe, mounted upon the jack 110 and positioned in the machine by mechanism hereinafter described, is positioned above the heel, the jack is vertically arranged. It will be apparent that when the piston 134 is depressed to force the jack 110 against the work the slide 184 will also be depressed causing the wedge block 698 and the wedge 694 to be forced together to lock the post 682 of the jack against swinging movement upon the sleeve 686.

The jack post 682 at its lower end has formed in it a bore 720 (Fig. 23) for receiving a rod 722 secured by one or more dowels 724 to a foot post 726 (Fig. 19) having an arcuate guideway 728 in which fits slidingly an arcuate block 730. Slidable transversely of the machine in a dove-tail guideway 732 in the lower face of the block 730 is a holder 734 (Fig. 19) for a last pin 736. The rod 722 has formed in it a channel 738 (Fig. 23) with the upper and lower ends of which engage pins 740, 740a, which may be moved to their positions shown in Fig. 23 to retain the foot post 726 fixed to the jack post 682 or which may be retracted to enable the foot post to be removed from the jack post to equip the machine for a different style of work. The pins 740, 740a are held in their active and inactive positions in the jack post 682 by spring pressed balls 742 which fit in grooves of the associated pins.

Rotatably mounted in the foot post 726 is a screw 744 which meshes with a gear segment 746 of the block 730 to tilt the block in the vertical longitudinal plane 666 with relation to the foot post 726 in accordance with the pitch angle of the last upon which the shoe is mounted. In order to maintain the screw 744 in its proper adjusted position in the foot post 726 said post has slidingly mounted in it a spring pressed plunger 748 which engages one of a plurality of flat surfaces 750 of the screw.

The gaging mechanism 114 (Figs. 1, 2, 3, 19 and 20) comprises a flexible back gage or heel band 752 the lower edge of which receives the counter crease 754 (Figs. 61 and 62) of the shoe 102. The heel band 752 may be initially adjusted widthwise by rotating a left and right threaded screw 745 (Fig. 20) which is threaded into arms 747 operatively connected to opposite sides of the heel band and which is rotatably mounted in a guide block 749 having guideways 751 in which the arms are slidable and having a T-shaped guide bar 764. In initially adjusting the jack 110 for a particular style of work it is convenient to lower said jack and the shoe mounted on it without operating the machine under power and accordingly the operator moves the pin 740 out of the channel 738 thus enabling the foot post 726 and accordingly the shoe on it to be lowered and moved back into the proper position against the heel band 752. The T-shaped bar 764 (Figs. 2, 3, 20 and 55) of the guide block 749 is slidable in vertical ways 766 (Fig. 55) of a guide housing 768 (Figs. 1, 2, 3 and 55) which may be initially adjusted transversely and longitudinally of the machine through mechanism which will now be described. The guide housing 768 has an arm slidingly mounted in a guideway 770 of a carriage 772 which is movable into different forward and rearward adjusted positions with relation to a bracket 774 (Fig. 3) bolted to the main frame 142. The bracket 774 has secured to it a pin 776 slidingly fitting in a bore of the carriage 772 and has threaded into it a left-hand threaded portion of a screw 778 a right-hand threaded portion of which is threaded into the carriage. Upon rotating a hand wheel forming part of the screw 778 the carriage 772 is moved forward or rearward to move the back gage or heel band 752 to the desired position longitudinally of the machine. Secured to the carriage 772 is a pin 780 which passes through an elongated slot 782 in the arm of the guide housing 768 and has threaded into it a screw 784 rotatably mounted in said housing. Upon rotation of the screw 784 the housing 768 travels along the guideway 770 to the desired adjusted position to move said housing and accordingly the back gage 752 to the desired position transversely of the machine.

In order that the back gage or heel band 752 shall not be angaged by the loader block arm 226 during its nail delivering movement over the nailing die 120, there is secured by a screw 788 (Fig. 55) to the upper portion of the bar 764 of the guide block 749 a plate 790 coupled to a chain 792 (Figs. 2, 3, 21 and 55) which passes over a sprocket 794 pivoted upon a pin 796 (Fig. 21) secured to the slide 184 and which passes through a recess 798 in a tube 800 fixed to the header 684 and is secured to a pin 802 carried by a tube 804 slidable in a recess 805 and having threaded onto it a manually actuated sleeve 806. When the sleeve 806 is rotated by swinging movement of the jack 110 the chain 792 is moved forward or rearward in the recess 805 of the header 684 to vary the heightwise position of the back gage or heel band 752 in the vertical ways 766 said band being lowered into its operative position shown in Fig. 19 when the jack 110 is swung rearward and being moved to a raised inactive position shown in Figs. 1 and 3, when the jack is swung forward. The jack 110 is constantly urged to its forward or loading and unloading position by a pair of coil springs 808 (Figs. 21 and 22), rear and forward ends of which are attached to studs 810, 812 secured respectively by the slide 184 and the header 684. In order to limit rearward movement of the jack 110 when there is no work in the machine the slide 184 has secured to it by one or more screws 814 a lug 816 into which is threaded a screw 818 engaged by the forward face of the header 684.

The carrier 116, which includes heel and top lift receiving stations or units 821, 823 and is best illustrated in Figs. 13 and 14, comprises a fabricated plate 820 and blocks 822, said carrier being slidingly mounted upon a guide rod or guide 824 which passes through alined bores of said blocks. The guide rod 824 fits in a bore 826 of a boss of the fixed bracket 154 and also fits in a bore 828 in an L-shaped bar 830 which is secured by screws 832 (Figs. 14 and 19) to said bracket. The guide rod 824 has secured to it a pin 834 which may be swung into a rod-latching position between the bar 830 and a spring latch 836 secured to said bar. Also secured to the bar 830 is a stop 838 which limits sliding movement of the carrier 116 upon the rod 824 to the left, as viewed in Figs. 13 and 14, as said carrier is acted upon by the loader block arm 226 as will be explained later.

The carrier 116 is constantly urged to the right, as viewed in Figs. 13 and 14, to predetermined positions in which, during two successive operations of the machine, the heel 102 and the top lift 104 respectively are positioned above the nailing die 120, by a chain 840 (Figs. 4, 13, 14 and 15) the upper end of which is attached to one of the blocks 822 and which passes over a sprocket 842 rotatably mounted on a bearing pin 844 secured to a cylindrical housing 846 secured by one or more screws 848 (Fig. 13) to the bracket 154. Secured in the housing 846 is a cylinder 850 in a chamber 851 of which reciprocates a plunger 852 upon the lower end of which is rotatably mounted a sprocket 854 over which the chain 840 passes, said chain having its lower end fixed to the housing by a pin 856.

Figure 16:
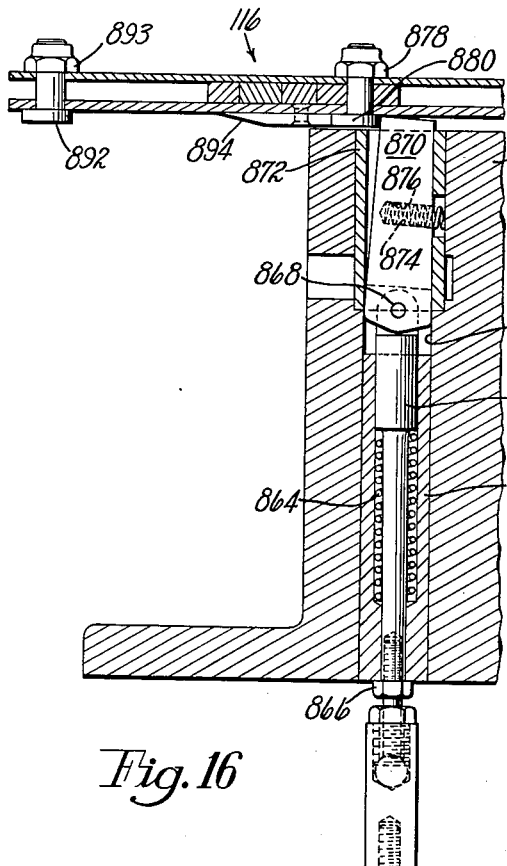
Figs. 16 and 17 are sections through the carrier and a nailing die supporting bracket of the machine showing (in two different operating positions) portions of detent mechanism for controlling the carrier.
Figure 17:
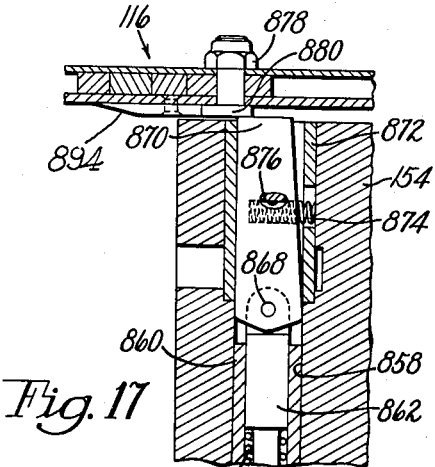

Secured in a vertical recess 858 in the die supporting bracket 154 is a bushing 860 (Figs. 16 and 17) provided with a recess in which is slidable a multipart rod 862 (Figs. 4, 16, 17 and 18) constantly urged toward a raised position shown in Fig. 17 by a coil spring 864, upward movement of the rod under the action of the spring being limited by the engagement of a nut 866 threaded onto the rod with the bottom of the bushing. Pivoted upon a pin 868 carried by the upper end of the rod 862 is a detent 870 included in a sleeve 872 fitting in a bore of the block and having a recess for receiving one end of a spring 874, the other end of which is positioned in a recess 876 in the detent which is biased counterclockwise as viewed in Figs. 16 and 17 by said spring.

Adjustably secured by a nut 878 to the fabricated plate 820 of the carrier 116 is an eccentric stop 880 which, when the carrier slides to the right (Figs. 16 and 17) over the bracket 154 and the nailing die 120, engages the then raised latch 870. When the carrier 116 is in a position in which the heel 102 positioned and secured in the heel receiving unit 821 of the carrier is located over the nailing die 120 and beneath the shoe mounted upon the jack 110 and swung back into engagement with the back gage or heel band 752, the stop 880 is in engagement with the latch 870.

In the attachment of leather heels 102 to shoes 100 the detent 870 is retracted at the upper end of the nail driving stroke of the driver head 122 which is operated by the sliding beam 160, said carrier 116 after pressure of the work against it has been released moving to the right, as viewed from the front of the machine, under the pull of the fluid pressure actuated chain 840. Retraction, withdrawal or lowering of the detent 870 is effected by an arm 890 (Figs. 4 and 18) which is pivotally connected to the lower end of the rod 862 and is secured to the shaft 486 which, as above explained, is actuated by upward movement of the cam trip 416 forming part of the sliding beam 160 and operative against the roll 482 on the arm 484 secured to said shaft 486. When the sliding beam 169 has been lowered a short distance from the upper end of its stroke and before the carrier 116 has been released by pressure of work against it, the rod 862 is released and acted on by the spring 864 is raised, said detent when the rod is released moving it to its position shown in Fig. 17 against the bottom of the stop 880. When pressure of the work against the carrier 116 is released and the carrier acted upon by the chain 840 moves to the right, the detent is raised by the spring 864 to its position shown in Fig. 16 and as a following stop 892, which is secured to the carrier by a nut 893, engages the detent 870, the carrier comes to rest with its top lift receiving station 823 positioned above the nailing die 120. The detent 870 may be described as being reestablished in its carrier detaining position by the spring 864. In order to enable the carrier 116 to be slid to the left, as viewed from the front of the machine, under the action of the loader block arm 226, there is riveted to the carrier plate 820 adjacent to the stop 880, a cam 894, for depressing the detent as the carrier is moved by said arm. The detent 870 may be manually released by the use of a lever 891 (Figs. 3 and 4) which is attached to the shaft 486.

The carrier 116 comprises a pair of V-shaped back gages 896, 896a which are constructed and arranged to be engaged respectively by the rear ends of the heel 102 and the top lift 104, and breast gages 898, 898a shaped and arranged to engage yieldingly the breasts or breast faces of the heel and the top lift. The breast gages 898, 898a are slidable in slots 900 of the carrier 116 and are constantly urged rearward by springs 902 front and rear ends of which bear respectively against blocks 904, which are adjustably secured to the fabricated plate 820, and shoulders 905 of the breast gages 898, 898a. The back gages 896, 896a have shanks which slide in guideways 908 in the carrier 116 and which have threaded portions onto which are threaded knurled nuts 910 positioned in slots 912 formed in the fabricated plate 820. Housed in recesses of the nuts 910 are springs 914 opposite ends of which are in engagement with the nuts and the plate 820 respectively and which serve to maintain the nuts in their adjusted positions on the carrier 116. The heel 102 rests directly on the upper face of the nailing die 120 so as to receive the nails 124 from the driver passages 126 but since it is customary to "spank" the top lift 104 onto the heel which has the driven nails projecting from it, as illustrated in Fig. 61, the top lift usually rests upon the plate 132 which is riveted to the fabricated plate 820.

To reduce to a minimum the wear on the loader block arm 226 and the carrier 116 as the carrier guided by the rod 824 is slid over and in engagement with the flat continuous upper faces of the nailing die 120 and the die supporting bracket 154, the fabricated plate 820 of the carrier has journaled on it a rubber or fibre roll 916 which is engaged by said loader block arm 226. The plate 820 may be described as being guided by the rod 824 and as being supported by the nailing die 120 and the brackets 154. Movement of the carrier 116 to the left (Figs. 13 and 14) under the action of the loader block arm 226 is limited by the engagement of a face 918 of the carrier with the adjustable stop screw 838 secured to the arm 830. The heel receiving station or unit 821 of the carrier 116 is never swung beyond the upper surface of the die supporting bracket 154 which is flush with the upper surface of the nailing die 120, and since nails are driven directly into the heel, the heel rests on the upper face of the die or bracket, the breast gage 898, after the heel has been placed in the heel receiving unit 821, sliding rearward under the action of its associated spring 902 to force the rear end of the heel against the associated back gage 896 thereby positioning the heel lengthwise and widthwise in said unit. The toplift 104 is placed on the plate 132, after forcing the breast of said lift against the breast gage 898a to move said gage forward against the action of an associated spring 902, the toplift then being released to cause the breast gage 898a to force said lift against the back gage 896a to position the lift lengthwise and widthwise in the toplift receiving unit 823.

Secured to the rear end of the carrier 116 is a cam 920 (Figs. 13 and 53) against which is forced a roll 922 carried by a bar 924 pivotally mounted upon a pair of parallel arms 917 fulcrumed upon the bracket 154. The bar 924 is constantly urged rearward toward the cam 920 by a spring 919 and has pinned to it the selector piston 562 which renders pressure control valves 548, 550 of the pressure regulator 172 effective in succession to regulate the maximum pressures that can be applied respectively to the work when the heel is being attached to the shoe and the top lift is being spanked onto the heel.

The splined shaft 228 (Figs. 30, 30a and 33) is vertically slidable in an internally splined coupling 934 secured by threaded studs 932 to a sleeve 926 to the upper end of which is secured by screws 928 a pinion 930 (Figs. 26 and 33) and to the lower end of which is secured by the draw bolt 227 the loader block arm 226. Surrounding the sleeve 926 are cylindrical bushings 936 fixed in a housing 938 press-fitted into the main frame 142. Threaded onto the lower end of the coupling 934 is a knurled nut 940 which, as will be explained, limits upward movement of the loader block arm 226 and may be moved into different heightwise positions on the coupling to vary the horizontal plane of swing of the loader block 220 toward and away from the nailing die 120. Also secured to the lower end of the splined shaft 228 by the draw bolt 227 is the piston 218 which is slidable in the housing 232 and in a cylinder 946 which is press-fitted into the housing 232 and into a housing 948 secured to the main frame 142. As will be explained later, oil which is supplied from the accumulator 170 and the pressure of which has been lowered by a reducing valve 951 (Figs. 58 and 59) is fed alternately to lines 950, 952 in communication with opposite ends of a head of the piston 218 to move said piston and accordingly the splined shaft 228 vertically, flow of oil to said lines being controlled by the valve 214 which comprises the plunger 210 actuated by the cam 206 in response to engagement of the one-revolution clutch 198 upon depression of the plunger 188 by the operator.

Secured by screws 954 (Figs. 2, 26 and 43) to the main frame 142 is a cylinder 956 having a bore in which reciprocates the piston 216 which comprises a rod 958 threaded into a rack 962 reciprocable along a guideway 964 of the main frame 142 and meshing with the pinion 930 (Figs. 26 and 33) which is secured to the upper end of the sleeve 926. The cylinder 956 has formed in it a pair of ports 966, 968 in which fit couplings secured to lines 970, 972 (Figs. 2, 41, 58 and 59) alternately connected to accumulator oil, the pressure of which has been reduced by the reducing valve 951, in order to swing the loader block 220 between its rest or waiting position shown in Fig. 26 and its nail delivering position as well as between a lowered position directly below its rest position and a nail receiving position below the nail delivering unit 234. Flow of oil under pressure and the opening of an exhaust pressure line 973 to the lines 970, 972 is controlled by the plunger 208 of the valve 212 and flow of oil under pressure and the opening of an exhaust pressure line 975 to the lines 950, 952 (Figs. 42, 58 and 59) is controlled by the plunger 210 of the valve 214, said valves being operated in timed relation in response to actuation of the one-revolution clutch 198 rendered active by depression of the plunger 188 of the valve 190.

The loader block arm 226 comprises a ring portion 974 in which the loader block 220 fits with a flange thereof overlying said ring as best shown in Fig. 27, the block being retained in the arm by a shutter 976 engaging in a slot 978 of the loader block, as will be explained later. Extending through the loader block 220 are the passages 222 and fitting in a recess 982, in the upper face of the block, is a selector plate 984 (Figs. 27 and 30) having passages 986 which are of a particular "nail pattern" and are in alinement with associated passages 222 of the loader block. The pattern of the passages 222 in the selector plate 984 corresponds to the pattern of the passages in a changeable unit, hereinafter described, of the nail delivering unit 234 and also corresponds with one of the patterns of the nailing die 120 and the loader block 220 which may be described as having multi-pattern passages. Since the selector plate 984 determines which passages 980 of the loader block 220 are to be used, said selector plate may be considered part of the loader block.

Mounted upon the loader block arm 226 is a boss 988 in which is swiveled a fulcrum pin 990 to the lower end of which is secured the nail shutter 976. A torsion spring 992 (Fig. 31) opposite ends of which are attached to the boss 988 and to the shutter 976 constantly urges the shutter counterclockwise with relation to the loader block arm 226 to a released or open position shown in Fig. 30, counterclockwise movement of the shutter with relation to the said arm being limited by the engagement of a shoulder 994 of the shutter 976 with a spring-pressed stop 996 which is carried by said arm and is slidable in a recess in said boss 988. Preparatory to changing the loader block 220 the operator raises a handle 998 secured to the stop 996 and thus raises the stop, against the action of its associated spring, above the shutter 976 so that the shutter can be moved out of the slot 978 and accordingly the loader block can be lifted out of the loader block arm 226.

When the loader block arm 226 is in its rest position the shutter 976 is in its active position beneath the loader block 220, a hook 1000 (Figs. 26 and 30) of the shutter being in engagement with a face 1002 of a latch 1004 fulcrumed on the ring portion 974 of the loader block arm 226 and constantly urged clockwise as viewed from above by a spring 1006. As the loader block arm 226 is swung from its idle or waiting position shown in Fig. 26 to its nail delivering position over the nailing die 120, the latch 1004 engages a front face 1008 of the nailing die causing said latch to swing counterclockwise as viewed from above on the arm thereby releasing the shutter 976 which then swings counterclockwise to its open position shown in Fig. 30 under the action of the torsion spring 992.

As above described, the heel and top lift carrier 116 is slid over the nailing die 120 away from the upper ends of the driver passages 126 under the action of the ring portion 974 of the loader block arm 226, the nail delivering dwell position of said arm being determined by the engagement of an angle lug 1012 (Figs. 26, 29, 30 and 30a) secured by screws 1013 (only one shown) to the loader block arm 226 with a screw 1010 (Fig. 30) adjustably secured to main frame 142.

The supply of oil to the chamber 851 of the cylinder 850 and accordingly the pull of the chain 840 on the heel and top lift carrier 116 or on the carrier 118 is controlled by a valve 1001 (Figs. 35, 44, 58 and 59) which comprises a plunger 1014 slidable in a bore 1003 of a housing 999 which also serves as the housing for the valves 212, 214 and which has an inlet port 1005, an exhaust port 1007, and an outlet port 1009 connected to a line 1011 leading to the chamber 851. The plunger 1014 is secured by a pin or bar 1015 to the plunger 208 of the control valve 212 and is actuated by the cam 204, the construction and arrangement being such that during most of the rotation of the cam shaft 200 and while the cam shaft is stationary oil is admitted to the chamber 851 of the cylinder 850 to work against the plunger 852, thus biasing the carrier to the right as viewed from the front of the machine. However, during the time that the loader block arm 226 swings to a nail delivering position over the nailing die 120 and forces ahead of it the carrier 116 or the carrier 118, the plunger 1014 of the valve 1001 is in such a position that the port 1009 and accordingly the line 1011 has access to the exhaust port 1007 and accordingly the carrier offers to the loader block arm little resistance except that necessary to displace oil in the chamber 851 during the swinging of the loader block toward the nailing die. If desirable the plunger 1014 may be so operated that oil pressure at all times operates against the plunger 852.

As heretofore explained, when the loader block 220 is in the vicinity of the nailing die 120 pressure against the plunger 188 of the valve 190 causes the latch 414 to be swung forward over the cylindrical portion 511 of the block 418, which forms part of the treadle actuated mechanism, so that an arm 1016 (Figs. 12, 51 and 52) which is operatively connected by links 1018, 1020 to the plungers 116, 376 respectively of the timer and clutch trip unit 164 and the treadle valve 378 cannot be raised from its rest position shown in Fig. 51.

After the loader block 220 has delivered its load of nails to the nailing die 120 it is swung automatically counterclockwise, as viewed from above, by the above described fluid pressure actuated mechanism, the shutter 976 after engaging a U-shaped stop rod 1022 (Figs. 2, 26 and 30) being held against further rotation as the loader block arm 226 swings into a position in which the face 1002 of the latch 1004 registers with and slides behind the hook 1000 of the shutter. The stop rod 1022 has one of its arms slidingly mounted in a bore 1024 of the machine frame, said rod being held in a rest position in which a collar secured to it engages the main frame, by a spring 1026, the lower end of which engages said frame and the upper end of which engages another collar secured to the rod.

When after delivering a load of nails 124 or 124a to the nailing die 120 the loader block arm 226 arrives at its rest position shown in Figs. 2 and 26 oil under pressure is admitted to the line 950 and the line 552 is open to the exhaust line 975 with the result that the splined shaft 228 together with the loader block 220 is lowered to a predetermined level determined by the engagement of the arm 226 with the stop face 230 of the housing 232 which is secured to the main frame 142. Oil under pressure is then admitted to the port 968 from the line 972 to slide the piston 216 to the right as viewed in Figs. 26 and 43 and accordingly to swing the loader block 220 beneath the nail delivering unit 234 (Figs. 2, 29 and 32). At the time the loader block 220 swings beneath the nail delivering unit 234 nails rest at the lower ends of passages 1036 (Fig. 32) of said unit, the head ends of the nails resting on a nail retaining shutter 1038 (Figs. 26, 29 and 32) then underlying said passages.

The nail delivering unit 234 comprises a multi-part bracket 1040 (Figs. 2 and 26) which is initially secured in a predetermined position to the main frame 142 by a plurality of screws 1042, and a foot plate 1044 (Figs. 2, 26, 29 and 32) which has formed in it a plurality of tapered passages 1046 for receiving tapered lower ends of nail tubes 1048 which house the lower ends of coil tubes 1049 operatively connected to the distributor 236. The foot plate 1044 has formed in it a T-shaped guideway 1050 for receiving the upper end portion of a nail tube holder 1052 (Figs. 2 and 32) which is commonly referred to as a "beer mug" and has a handle 1054. Secured to and spaced from the foot plate 1044 is a thin plate 1056 which has a plurality of bores 1058 which register with the tapered passages 1046 in the foot plate and serve to anchor the tubes 1046 in said passages. The nail tube holder 1052 has a plurality of upper passages 1060 which are in alinement with corresponding passages 1040 of the foot plate 1044 and receive the upper ends of nail tubes 1062 having their lower ends engaging in the passages 1036 which are of the same pattern as that of the passages 222 of the selector plate 984 of the loader block 220.

The nail tube holder 1052 (Fig. 32) has formed in its upper end a bore 1064 for receiving a pin 1066 carried by the foot plate 1044 and bored to receive a biased spring rod 1076 secured to the foot plate. The rod 1076 overlies wedge faces 1070 of a bifurcated portion of a slide rod 1072 which is guided by a slot and pin connection 1073 (Fig. 29) and is normally urged to the right as viewed in Fig. 32 by a spring 1074. Force applied against the rod 1072 to slide it to the left as viewed in Fig. 32 raises the pin 1066 in the bore 1064 against the action of a spring rod 1076 with the result that the holder 1052 can be drawn from the foot plate 1044 preparatory to inserting another holder having passages 1036 of a different pattern in said foot plate.

The shutter 1038 of the nail delivering unit 234 is pivoted upon a rod 1084 secured to the foot plate 1044 and is supported upon a collar 1086 (Fig. 32) mounted upon said rod the shutter being normally urged to an open position shown in Fig. 29, limited by the engagement of said shutter with a depending portion of the angle lug 1012 secured to the loader block arm 226, by a torsion spring 1090 upper and lower ends of which are attached respectively to a collar 1092 fixed to the rod and to the shutter. When the loader block arm 226 in engagement with the stop face 230 (Fig. 34) of the housing 232 and also in approximate engagement with the cylindrical housing 846 is swung counterclockwise as viewed from above, the depending portion of the lug 1012 of said arm clears the rear end of the shutter 1038 which at this time is held in a closed cocked position beneath the holder by a spring pressed latch 1094 which is in engagement with a shoulder 1096 (Fig. 26) of the shutter. As the loader block arm 226 swings counterclockwise as viewed from above to a position in which the loader block 220 is beneath the nail tube holder 1052 (Fig. 29) the ring portion 974 of said arm swings the latch 1094 away from the shoulder 1096 of the shutter with the result that the shutter 1082 swings clockwise to its position shown in Fig. 29 under the action of the torsion spring 1090 until its rear end engages the depending portion of the lug 1012 of the loader block arm 226, the nail receiving position of the loader block arm being determined by a stop 1097 (Fig. 29). As the shutter 1038 swings from beneath the nail tube holder 1052 nails drop into the passages 222 of the loader block 220 which at this time has a slight dwell beneath said holder. Upon retraction of the loader block arm 226 in a clockwise direction from its position shown in Fig. 29 the depending portion of the lug 1012 engages the shutter 1038 and swings it counterclockwise to its latched position beneath the nail tube holder 1052, the loader block arm after returning to an intermediate position in approximate engagement with the cylindrical housing 846 being raised by fluid pressure from the line 952, the pressure line 950 at this time being opened to exhaust pressure line 975, to its rest or waiting position shown in Fig. 26.

When the loader block arm 226 is in its rest or waiting position a latch 1100 (Figs. 2 and 30a) which is fulcrumed upon a slide 1102 and carries a stud 1104 normally has its stud forced against the slide by a spring 1106, a shoulder 1108 on said slide at this time being forced against a fixed base portion 1110 of the distributor 236 by a spring (not shown). As the loader block arm 226 moves clockwise from its waiting position shown in Fig. 30a to deliver nails to the nailing die 120 the depending portion of the lug 1012 thereon moves the slide 1102 against the action of a spring (not shown) along the base of the distributor 236 to actuate a nail roll (not shown) of said distributor thereby causing a set of nails to drop into the tubes 1048. During the nail delivering movement of the loader block arm 226 the lug 1012 swings away from the latch 1100 which moves back to its rest position shown in Fig. 30a. As the loader block arm 226 swings counterclockwise from its nail delivering position the lug 1012 swings the latch 1100 clockwise (Fig. 30a) upon the slide 1102 against the action of the spring 1106 thus enabling said lug to be moved to a position behind said latch the loader block continuing its above-described cycle to cause the loader block to receive another set of nails then in the nail delivering unit 234 and thereafter to move back to its rest or waiting position.

The above-described mechanism for actuating the distributor 236 is disclosed in detail in United States Letters Patent No. 2,575,336, granted November 20, 1951, on an application filed in the name of Edwin C. Eldred, Jr.

When the machine has completed its power cycle and the shoe 100 to which the heel 102 and its top lift 104 have been attached has been removed from the jack 110, then swung forward to its work receiving position, the plunger 188 of the valve 190, which is mounted upon a bracket 1112 (Figs. 3 and 39) secured by screws 1114 to the slide 184, may be manually actuated by swinging a lever 1116 clockwise as viewed in Fig. 39 or if desirable may be actuated in response to movement of the jack, through mechanism hereinafter described, as said jack is swung forward after the attachment of the heel to the shoe.

The plunger 188 has a forward extension 1118 (Fig. 39) which is slidable in a guideway 1120 of the bracket 1112, a spring 1122 being interposed between the bracket and a face of said extension in order constantly to urge the plunger rearward until a block 1124 screwed to the extension engages a face 1126 of the bracket. Swiveled in bores of the bracket 1112 and the slide 184 is a rod 1128 to which is secured an arm 1130 and a dog 1132, the manually operated lever 1116 being fulcrumed upon the rod 1128 and extending upward between studs 1134 projecting laterally from the extension 1118 of the plunger 188. When the operator manually swings the lever 1116 clockwise to its position shown in Fig. 39 the piston 188 is slid forward against the action of the spring 1122 causing, as above explained, the tripping of the one-revolution clutch 198 and accordingly actuation of the loader block arm 226 through its cycle above described, the plunger 188 when the lever 1116 is released moving back to its closed position shown in Fig. 3 under the action of the spring.

The lever 1116 comprises an arm 1136 which is pivoted upon a pin 1138 secured to the lever and may be swung clockwise as viewed in Fig. 40 into a dash-line position in which the arm 1130 is included in a slot 1140 of the arm 1136. When the plunger 188 of the valve 190 is in its rearward or rest position, the valve 190 being closed, the arm 1130 is held biased in alinement with the lever 1116 by the action of a torsion spring 1142 one end of which is attached to the bracket 1112 and the other end of which is attached to a collar 1144 secured to the rod 1128. When the lever 1116 is in interlocking engagement with the arm 1130 as shown in dash-lines (Fig. 40) and the jack is in its vertical operating position the dog 1132 secured to the rod 1128 is arranged in a notch 1146 formed in the wedge 694 of the jack post thus permitting the dog acted upon by the spring 1142 to assume a rest position. When, however, the operator swings the jack 110 forward preparatory to removing work from the jack the dog 1132 is swung clockwise as viewed in Fig. 39 by the wedge 694 thereby swinging with it, through mechanism above described, the lever 1116 and thus moving the plunger 188 forward to open the valve 190 and thus actuate the one-revolution clutch 198. When pressure against the lever 1116 is released the plunger 188 moves rearward under the action of the spring 1122 thus shutting the line 192 off from the line 396 and opening the line 192 to an exhaust line 1117. The exhaust line 1117 is connected to a chamber 1119 in the valve by a line 1121 having in it a throtle valve 1123 which may be regulated to vary the speed of return of the plunger 188 to its rearward position.

It is highly desirable that the force applied to the piston 216 shall be adjustably varied or dampened in order to insure against bending nails caught between the loader block 220 and the nail delivering unit 234 or caught between the loader block 220 and the nailing die 120, and also to insure against the loader block arm 226 being slammed against the stops 1097, 1010 as it arrives at its positions respectively beneath the nail supplying unit 234 and above the nailing die 120 and further to insure against slamming said loader block arm against the cylindrical housing 846 as said arm is swung away from the nail delivering unit.

With the above considerations in view the cylinder 956 (Fig. 43) has passages 1150, 1150a which are connected by ports 1152, 1152a, 1152b and ports 1154, 1154a respectively with a bore 1155 of the cylinder 956, throttling pins 1156, 1156a being arranged in the passages 1152b, 1154a respectively. When the loader block 220 is beneath the nail delivering unit 234 a face 1158 of the piston 216 lies approximately in a plane 1175 and is substantially in engagement with the right end of the bore 1155 as viewed in Fig. 43 and when oil under pressure is admitted to the line 970, the line 972 then being open to exhaust line 973, the piston moves to the left. Should a nail in one of the passages 1036 of the nail tube holder 1052 fail to drop properly into the loader block 220 and thus tend to hold the loader block arm 1026 from swinging, oil under pressure passes through the port 1152, the passage 1150 and the ports 1152a, 1152b into contact with a face 1160 of the piston and through the port 968 which at that time is connected to exhaust thereby materially reducing the pressure operating against the face 1158 of the piston 216, and causing said piston to come to rest before bending the nail. In like manner when the loader block 220 is over the nailing die 120 the face 1160 of the piston 216 lies approximately in a plane 1177 and is substantially in engagement with the left end of the bore 1155 as viewed in Fig. 43 and when high-pressure oil is admitted to said face through the line 972 the line 970 then being connected to exhaust line 673, said oil passes through the port 1154, the passage 1150a and the port 1154a to the face 1158 of the piston 216 and then through port 966 then connected to exhaust thereby materially reducing the pressure against face 1160 and the force tending to bend the nails and accordingly stalling the loader block arm. The passages 1150, 1150a are separated by one or more headless screws 1157.

When the above-mentioned stoppages of the piston 216 occur the clutch 198 and accordingly the cams 204, 206 continue to move through one revolution and then come to rest leaving the loader block arm in its stalled position. When the cams 204, 206 are in their rest positions the plunger 208 of the valve 212 is in the position shown in Fig. 41, sealed fluid being in engagement with opposite faces 1158, 1160 of the piston 958. In order to eliminate this trouble the operator manually jiggles the loader block arm 226, releases or removes the undelivered binding nails and after locking a nail roll 1162 of the distributor 236 by the use of mechanism which is actuated by a lever 1164 shown in detail in said Patent 2,575,336 depresses the plunger 188 thereby actuating the one-revolution clutch 198 and causing a single revolution of the cam shaft 200, the piston 958 being "picked up" by the oil pressure and moved through the remaining portion of its cycle back to its rest position.

It will be noted that when the movement of the loader block 220 is checked beneath the nail supplying unit 234 by a nail, the piston 218 is locked in its lowered position and will not be moved until the return cycle when the loader block rises to its waiting or rest position shown in Figs. 2 and 26. In order, however, to remove strain upon the loader block 220 and operating mechanism the cylinder 946 may have associated with it by-passes similar to those shown in cylinder 956. Moreover, in order to vary the pressure powering the pistons 216, 218 which swing and raise respectively the loader block arm 226 automatically the machine is provided with the above-mentioned reducing valve 951 which is inserted in a line 1168 connecting the valves 212, 214 with the accumulator line 380.

When the loader block 220 is in its rest position and when it is adjacent to the cylindrical housing 846 oil under pressure is cut off from the lines 970, 972, the piston 216 remaining at rest and the face 1160 of the piston being arranged approximately in a plane 1172. As the faces 1158, 1160 of the piston 216 arrive in the vicinity of the planes 1175, 1177 respectively the loader block 220 arrives at its nail receiving position under the nail delivering unit 234 and its nail discharging position above the nailing die 120, oil during these portions of the cycle being by-passed from one operating face 1158, 1160 to the other of the piston to insure that the loader block shall not bend nails, and shall accelerate and decelerate under controlled action from and to its terminal positions. In like manner when the loader block 220 moves from its nail receiving position into approximate engagement with the cylinder housing 846 the face 1160 of the piston approaches the plane 1172, oil being by-passed from the face 1158 to the face 1160 of the piston 216 to insure against the loader block being forced against the housing with substantial force.

The clutch 198 for operating the shaft 200 upon which the loader block actuating cams 204, 206 are mounted will now be described. As above explained, when the machine is powered but is in rest or waiting position the line 396 is accessible to oil from the accumulator 170 and movement of the plunger 188 of the valve 190 to the right (Fig. 58) causes high-pressure oil to enter the line 192 in communication with a cylinder 1173 (Figs. 6, 35 and 38) in which is mounted the plunger 194 for actuating the one-revolution clutch 198.

Secured to the cam shaft 200 (Figs. 37 and 38) by a screw 1174 is a drive housing 1176 in which is mounted a pin 1178 and mounted for constant rotation upon the cam shaft when the machine is powered is a gear 1180 which is formed integral with the worm gear 202 driven by the worm 624 (Fig. 35). Swiveled upon the pin 1178 is a pawl 1184 which is constantly urged counterclockwise, as viewed in Fig. 37, by a spring 1186 mounted in the drive housing 1176. When the machine is in waiting position a gate 1188 pivoted upon a bearing pin 1190 fixed to the main frame engages a face 1192 of the pawl 1184 and holds a detent portion of the pawl away from teeth of the pinion 1180. The plunger 194 has pinned to it an arm 1194 which is biased upward as viewed in Fig. 37 by the combined pressure and torque spring 196 opposite ends of which are attached to the cylinder 1173 and to a head of the plunger 194. Upward movement of the arm 1194 is limited by a pin 1202 secured to the gate 1188 which is constantly urged clockwise as viewed in Fig. 38 about the bearing pin 1190 by a coil spring 1204, clockwise movement of said gate about the bearing pin being limited by the engagement of the pin 1202 with the cylinder 1173. Forward movement of the plunger 188 causes high-pressure oil to move the plunger 194 to the left as viewed in Fig. 38 causing the gate 1188 to swing counterclockwise about the bearing stud 1190 and away from the pawl 1184 a detent portion of which moves into engagement with one of the teeth of the gear 1180 to cause the housing 1176 to rotate with said gear. As the housing 1176 rotates clockwise (Fig. 37) the pawl 1184 engages the arm 1194 and rotates it against the action of the spring 196 to its dash-line position thereby insuring that the detent portion of the pawl is forced effectively between teeth of the gear 1180. When the pawl 1184 has rotated together with the housing 1176 past the gate 1188, said gate swings back to its starting position shown in Fig. 38 to prevent a second revolution of the cam shaft 200, the arm 1194 after being released by the pawl 1184 swinging back against a bottom face of the gate and remaining there until the operator releasese the plunger 194 and thereby enables the plunger and accordingly said arm to move back to its starting position. With such an arrangement it will be clear that the arm 1194 must be moved back to its starting position before it can again swing the gate 1188 to cause the clutch 198 to be engaged.

As best shown in Fig. 36 the gear 620 through which the cam shaft 200 receives its power is so mounted upon the shaft 622 that should parts driven by shaft 622 meet unusual resistance the gear will be released from its driving connection with said shaft. The above safety connection between the shaft 622 and the gear 620 comprises a spring-pressed roll 1206 which normally occupies a recess 1208 in the periphery of the shaft. Should the gear 620 which is rotated clockwise, as viewed in Fig. 36, meet excessive resistance, the increased radial component of force on the roll 1206 will be increased sufficiently to cause it to move fully out of the recess 1208 into an opening 1210 of the gear against the action of a spring 1212 thereby permitting the shaft 622 to stop and removing the load from the gear.

The treadle 130 is fixed to a shaft 1214 (Figs. 12, 51 and 52) fulcrumed in the frame of the machine and having keyed to it a lever 1216 constantly urged clockwise as viewed in Figs. 51 and 52 by the treadle spring 420 which surrounds a rod 1218 slidingly mounted in a bore 1220 of the lever and is interposed between the lever and a flange which is formed on the rod 1218 and engages the main frame 142. Clockwise movement of the lever 1216 is limited by the engagement of the screw 422 which is threaded into the lever 1216 with the main frame 142.

Fulcrumed on the treadle rod 1214 is the arm 508 a boss portion of which has axially offset shoulders 1224, 1224a in opposing relation to axially offset shoulders 1226, 1226a, respectively, formed upon the boss of the lever 1216, the construction and arrangement being such that the arm 508 has lost motion with relation to the lever 1216 and accordingly the treadle 130. When the machine is in its rest position the shoulders 1226a, 1224a of the lever 1216 and the arm 508, respectively, are in engagement, and the shoulder 1224 of said arm is spaced slightly from the shoulder 1226 of the lever. The arm 1016 has secured to it the block 418 in abore of which is an upstanding rod 1230 which passes through an enlarged slot 1232 in the arm 508 and has mounted on it a washer 1234 backed up by a nut 1236 threaded onto the rod, a spring 1238 surrounding the bolt and having its lower and upper ends in engagement with the arm 508 and the washer.

When the operator depresses the treadle 130 the shaft 1214 and accordingly the lever 1216 are moved counterclockwise against the action of the spring 420 causing counterclockwise movement of the arm 508 and, through the above described mechanism, counterclockwise movement of the arm 1016. As above explained, the lever 1016 is operatively connected by the multipart rod 1020 to the plunger 376 of the treadle valve 378 and actuates with lost motion through the multipart rod 1018 the plunger of the timer and clutch trip valve 164. Operatively connected to the upper end of the plunger 166 is a bell crank lever 1240 which is fulcrumed upon a bearing pin 1242 carried by the main frame and is operatively connected through a rod 1244 to an arm 1246 (Figs. 4, 45 and 51) secured to the shaft 324 which is fulcrumed in the supporter yoke 302 and which trips, through the above described mechanism, the one-revolution clutch 136.

It will be noted that when the machine is in its rest position the plunger 166 of the timer and clutch trip valve or unit 164 is spaced a predetermined but initially adjustable distance from the rod 1018 to form a gap 1247 (Fig. 51), thereby insuring that the plunger shall not be acted upon by the treadle 130 until the latter portion of the downward movement of said treadle. When the treadle 130 has been depressed sufficiently to raise the plunger 376 and accordingly to cause the shoe on the jack to be forced with initial pressure against the heel, the rod 1018 has moved to a position in which the gap 1247 is closed, the upper end of the rod being in engagement with the plunger 116 and said rod meeting "recognizable" resistance offered by the plunger 166 (Figs. 51, 58, 59 and 60). After clamping the work in the machine but before actuating the plunger 166 the operator may remove his foot from the treadle 130 and the valve parts of the machine, above described, will return to their rest positions. However, after the plunger 166 has been raised sufficieintly to cause the face 424 of the plunger to be in communication with the line 382 (Fig. 60) high-pressure oil from the accumulator 170 continues to actuate the plunger 166 and the machine completes its driving cycle before coming to rest. As above explained, the lever 1016 is held in its raised position, until the driver head 122 has reached the upper end of its stroke, by the latch 414 the lower side of a notch 510 of which swings under the arm 508 as the treatdle 130 reaches the lower end of its downward travel.

When rubber heels 106 and their base lifts 108 are to be attached to shoes 100 the carrier 116 is replaced by the carrier 118 (Figs. 13a and 14a) which comprises a frame or housing 1248 slidingly mounted upon the guide rod 824 and having secured to it the fluid pressure actuated chain 840. Removably mounted in guideways 1250 of the housing 1248 is a plate 1252 having a recess 1254 in which the rubber heel 106 is inserted, said plate being held in position in said frame by a spring-pressed plunger 1256.

Threaded into the housing 1248 is a screw 1249 having a flange 1258 and mounted upon the screw is a spring-pressed collar 1260 said flange and said collar including between them a flange of a plate 1262 which is movable along a guideway 1264 of the housing and has upstanding lugs 1266. Mounted upon a pin 1268 secured to the lugs 1266 is a block 1270 which is constantly urged clockwise as viewed in Fig. 14a until limited by a stop screw 1272 threaded into said block, by a compression spring 1274. Fulcrumed upon shoulder screws 1276 secured to the block 1270 and slidable in horizontal slots of said block are a pair of centralizing fingers 1278 having portions which are engaged by the upper breast corners of the base lifts 108, the rear ends of said lifts being in engagement with a back gage 1280 a shank portion of which is slidingly mounted in a guideway 1281 of the block. The centralizing fingers 1278 have interengaging teeth 1282 and pivotally connected to one of said fingers and passing through a hole in an extension of the housing 1248 is a rod 1284 having threaded onto it a wing nut 1286. A compression spring 1288 is interposed between a flange of the rod 1284 and the extension of the housing 1248, the construction and arrangement being such that the fingers 1278 may be separated equal distances in opposite directions about their pivot pins 1276 against the action of the spring. The closed positions of the fingers 1278 when there is no work in the carrier 118 are determined by the engagement of the wing nut 1286 with the extension of the housing 1248. Swiveled in bores 1290 of upstanding bosses of the housing 1248 are pins 1292 to which is pinned a holder 1294 provided with a threaded bore in which is threaded a bearing sleeve 1296 having a bore for slidingly receiving a shank portion of the back gage 1280, said shank portion having pinned to it a collar 1298 which is normally held against a head of the bearing sleeve by a spring 1300. The back gage 1280 is constantly urged against the bottom of the guideway 1281 of the block 1270 by a torsion spring 1302 one end of which is attached to one of the pins 1292 and the other end of which bears against an upstanding boss portion of the housing 1248. Clockwise movement of the back gage 1280 about the axis of the pivot pins 1292, as viewed in Fig. 14a, is limited by the engagement of faces 1303 of the back gage 1280 with transversely arranged screws 1304 threaded into upstanding portions of the housing 1248.

Preparatory to placing the rubber heel and its base lift in the machine the fingers 1278 are swung apart and the back gage 1280 is slid rearward, the rubber heel being placed in the recess in which it fits. After placing the base lift, between the back gage 1280 and the fingers 1278, upon the rubber heel said back gage and fingers are released so as to enable them to move back to their gaging positions with relation to the base lift as shown in Figs. 13a and 14a. During the attachment of the heel 106 and its base lift 108 to the shoe during which the heel and the base lift are compressed to a considerable extent the back gage 1280 is depressed in the guideway 1281 of the block against the action of the torsion spring 1302 about the axis of the pins 1292 and the fingers are swung counterclockwise as viewed in Fig. 14a about the axis of the pin 1268.

As the loader block 220 is swung into a position to deliver nails to the nailing die 120 the ring portion 974 (Fig. 26) of the loader block arm 226 engages a face 1306 of the carrier 118 and slides the carrier to the left as viewed in Fig. 13a along the guide rod 824 as above explained in describing the operation of the carrier 116. The operative position of the carrier 118 over the nailing die 120 is determined by the engagement of a screw 1307 (Fig. 13a) carried by the frame 1248 with the bracket 154.

In order quickly and effectively to apply glue to the attaching faces of the heels 102 and the base lifts 108 there is secured to the main frame 142 of the machine a glue pot 1308 (Figs. 1 and 56) having a chamber 1310 partially filled with glue 1312. Rotatably mounted in the glue pot is a shaft 1314 having secured to it a bristled roll 1316 the lower portion of which is immersed in the glue 1312 and against the upper portion of which the lift or base lift is wiped. Secured to an outer end of the shaft 1314 is a screw 1318 and mounted upon the shaft is a sleeve 1320 which comprises a ratchet 1322 and to which is secured a screw 1324, opposite ends of a coil spring 1326 embracing respectively the screws.

Pivotally mounted upon the glue pot 1308 is a pawl 1328 which is constantly urged against the ratchet by a spring 1330. Vertically reciprocable in a guideway 1332 of a bracket 1334 secured to the main frame 142 is a plunger 1336 which is constantly urged downward by a spring 1338, downward movement of the plunger when the machine is at rest being limited by the engagement of a head 1340 of the plunger with a fiber disk 1342 supported by the bracket. Pivotally mounted upon a pin 1343 secured to the head 1340 of the plunger 1336 is a latch 1344 which is constantly biased clockwise as viewed in Fig. 56 by a spring 1346, clockwise movement of the latch being limited by the engagement of the latch with a face 1348 of the head of the plunger.

When the machine is at rest the latch 1344 is substantially in the position illustrated in Fig. 56, the latch being in engagement with one of the flat faces 1350 of the teeth of the ratchet 1322. During the cycle of the machine one of the counterweights 662 engages the bottom of the plunger 1336 thus raising the plunger and rotating the ratchet 1322 clockwise until an associated tooth of the ratchet moves away from the latch, thus rotating the roll 1318 through the spring 1326 which, especially when the glue is stiff, is energized, said spring being held energized by the retaining action of the latch 1328 upon the ratchet. As the counterweight 662 is moved to its lowered rest position the plunger follows it under the action of the spring 1338, the latch swinging counterclockwise as it passes the ratchet and thus moving back to its position shown in Fig. 56.

By providing the above construction the upper portion of the roll 1316 during the operation of the machine has at all times a fresh coating of glue, the roll being moved through the spring 1326 and thus insuring against its being moved too fast and also insuring against parts of the pot being strained when the glue is stiff.

In the attachment of the leather heel 102 to the shoe 100 and the attachment of the top lift 104 to the attached heel of the shoe by the use of the above described machine, the operator, in the event that the lever 1116 has not been automatically actuated, as above explained, by the forward swinging movement of the jack 110 at the time the work last operated upon was removed from the machine, manually swings said lever rearward causing the opening of the valve 188, engagement of the clutch 198, and operation of the valve plunger 208 and the piston 216 to cause the loader block 220 then in its rest position to deliver a load of nails 124 to the nailing die 120, the loader block during its movement toward said die actuating, through mechanism described in detail in said Patent No. 2,604,624, the nail distributor 236 with the result that a load of nails is supplied to the nail delivering unit 234. After dumping its load of nails into the driver passages 126 of the nailing die 120, the loader block 220 is moved by the piston 216 and the piston 218, which is operated in timed relation with the piston 216, to its dwell position beneath the nail delivering unit 234 and after receiving a load of nails from said unit completes its cycle to its rest position where it stops ready to be actuated through its cycle when the lever 1116 is again actuated.

As above explained, the carrier 116 is normally urged to the right, as viewed from the front of the machine, by fluid pressure means comprising the plunger 852 and the chain 840. As the loader block 220 is moved over the nailing die 120 preparatory to transferring nails to said die the block forces the carrier from its rest or starting position over the nailing die, fluid pressure against the plunger 852 being temporarily released. As the loader block 220 is swung away from the nailing die 120 the carrier 116 acted on by the chain 840 slides to the right, as viewed from the front of the machine, and stops when the heel receiving unit 821 is positioned over the nailing die 120, the stop 880 of the carrier at that time being in engagement with the detent 870.

The operator then positions in the heel and top lift receiving stations or units 821, 823 of the carrier 116 the heel 102 and the top lift 104, the heel receiving unit then being positioned over the nailing die 120. The shoe 100 on the last 112 is next mounted upon the jack 110 at that time in its forward or loading and unloading position, said jack together with the shoe mounted on it thereafter being swung rearward to move the shoe against the back gage 114 which has been initially set to accommodate the particular work being operated upon.

The operator thereafter depresses the treadle 130 causing through mechanism illustrated in Figs. 51 and 52 the plunger 376 of the treadle valve 378 to be raised from its position shown in Fig. 58 to its position shown in Fig. 59. The raising of the plunger 376 causes high pressure fluid to open the main cylinder control valve 384 and to slide the piston 408 of the lift cut-off valve 410 to the left as viewed in Figs. 58 and 59 thereby effecting through the fluid pressure means above described, downward movement of the piston 134 to cause the heel seat portion of the shoe to be forced against the heel in the carrier 116. When the treadle 130 has been partially depressed and the operator is not fully satisfied with the relative position of the heel and the shoe he commonly releases the treadle with the result that the piston 134 and accordingly the jack 110 are raised to a position determined by the displacement, by the platform 187, of the plunger 536 of the limit stop valve 538 to its open position shown in Fig. 58. When the limit stop valve 538 is opened the lift cut-off valve 410 is closed. After properly rearranging the work the treadle 130 is fully depressed causing the shoe to be forced against the heel, first under preliminary and then under secondary pressure, the timer and clutch trip unit 164 being actuated as secondary pressure is applied against the work thereby causing the clutch 136 to be engaged and the driver head 122 raised to drive the nails 124 then in the passages 126 of the nailing die 120 into the work to attach the heel to the shoe, the head ends of the nails projecting beyond the heel as shown in Fig. 61. As explained in detail, the booster 168 is rendered active after pressure in the line 448 has been built up to a point to actuate the booster and back pressure pilot valve 450 which controls the operation of the back pressure locking valve 390 and the booster pilot valve 464. Timing of the clutch trip unit 164 may be readily varied by the adjustment of the throttle screw 446. After depressing the treadle 130 fully to raise the plunger 376 of the treadle valve 378, the operator as accumulator pressure fluid enters the chamber 426 loses control of the machine and commonly releases the treadle the plunger being held in its raised position by the latch 414. As the driver head 122 reaches the upper end of its stroke the plunger 376 of the treadle valve 378 is released by the action of the cable 492 on the latch 414 and returns to its rest position under force of gravity and if desirable under the action of a spring, thus causing the piston 134 and accordingly the jack to be raised to a position determined by the limit stop valve 538 and its associated mechanism the operator holding the shoe upon the jack. Simultaneous with the release of the plunger 376 the detent 870 which is associated with the carrier 116 is lowered thus releasing said carrier which, when pressure of the work against it has been released, slides to the right, as viewed from the front of the machine, under the action of the fluid pressure biased chain 840 to a position in which the top lift receiving station 823 of the carrier is arranged over the nailing die 120, the shoe in the meantime being held on the jack by the operator.

The operator then partially depresses the treadle 130 to cause the attached heel of the shoe carried by the jack 110 to be forced against the top lift 104 in the carrier, the projecting nails 124 extending beyond the heel being forced into the top lift to spank said lift onto the heel, the operator then raising the treadle without tripping the one-revolution clutch 136 and thereby causing the jack against to be raised to its starting position. The jack 110 is then swung forward and the work is removed from the jack.

Preparatory to attaching rubber heels 106 and their associated base lifts 108 to shoes the operator opens the valve 596 so as to cause the line 448, after the plunger 472 of the booster unit 168 has started downward, to be connected to the line 404. Before operating on a run of rubber heel work the pressure in the accumulator may also be lowered by adjusting the screw 593. Moreover the nails 124a will be substituted for the nails 124 and the necessary changes will be made to handle the nails 124a. After swinging the lever 1136 rearward to cause a load of nails to be delivered to the passages 126 of the nailing die 120 and positioning the heel 106 and the base lift 108 in the carrier 598 the shoe 100 mounted upon the last 112 is placed upon the jack 110 and swung into its position against the back gage 114. The operator then depresses the treadle 130 causing the shoe to be forced under preliminary pressure against the base lift 108 and accordingly forcing the base lift against the rubber heel 106 beneath said lift in the carrier 598. As the treadle 130 is further depressed and the one-revolution clutch 136 is engaged the plunger 472 of the booster unit 168 will have opened the line 448 to the line 404, with the result that pressure in the chamber 392 of the main cylinder 394 is opened to the exhaust port 406. Accordingly the pressure applied by the jack 110 against the work during the driving of the nails 124a into the work is that due only to the mass of the piston 134 and the various parts supported thereby. As above explained, the throttle valve 596 may be so adjusted that some residual pressure remains in the upper chamber 392 to act against the piston during the rubber heel attaching operation. As the machine completes its cycle, as above described in connection with the attachment of leather heels to shoes, the jack rises to a predetermined position controlled by the limit stop valve 538 and its associated mechanism and comes to rest, said jack then being swung forward and the work being removed from the jack. It will be noted that orifices for balancing leaks and certain oil vents have been omitted together with other such details not affecting the theory of operation of the machine.

In order to insure that nails resting in the passages 222 of the loader block 220 arranged over the nailing die 120 shall properly drop into passages 126 of said die, the carrier stop 838 is so regulated that when the loader block arm 226 is stopped by the screw 1010, said carrier moves slightly away from the ring portion 974 of the loader block arm and then bounces back against said portion. Moreover, in order to insure that the nails shall be properly delivered from the passages 222 of the loader block 220 to the passages 126 of the nailing die 120, the cam 204 is preferably provided with a recess 1352 which causes slight vibration of the loader block while said block is positioned over said nailing die.

Although the illustrative machine has been described with reference to the attachment of heels to shoes, it will be understood that the machine may be used for driving nails into the heel seats of shoes in a manner similar to that disclosed in United States Letters Patent No. 2,480,905, granted September 6, 1949 in the name of Thomas B. Clarke et al. Preparatory to equipping the illustrative machine for this operation the heel and top lift carrier 116 is removed from the machine and the holder housing 148 is so adjusted that the nail drivers 146 drive nails a desired distance into the heel seats of the shoes leaving portions of the nails projecting from said heel seats. Leather heels may be subsequently attached to the shoes, beyond the heel seats of which the nails project, by the use of the machine disclosed in said Patent 2,480,905 or by the use of an improved machine such as disclosed in United States Letters Patent No. 2,524,120, granted October 3, 1950 on an application filed in the name of Thomas B. Clarke.

Having thus described our invention, what we claim as new and desire to secure by Letters Patent of the United States is:

1. In a heel attaching machine, a pair of supports, an actuator which is operatively connected to one of said supports, fluid pressure means including a valve, manually actuated means for moving the valve toward one setting to cause fluid which is included in said means and is under pressure to be forced in one direction against said actuator to move the actuator and accordingly said one support toward the other support thereby forcing together a heel and a heel seat of a shoe mounted upon said supports, fastening inserting mechanism, mechanism comprising a unit responsive to the fluid of said means as a result of movement of said valve toward said one setting for rendering said fastening inserting mechanism active to insert fastenings into the heel and the heel seat of the shoe, and means for moving said valve away from said one setting to cause said fluid to be forced in an opposite direction against the actuator to move the actuator and accordingly said one support away from the other support.

2. In a heel attaching machine, a nailing die, fluid pressure means comprising a jack which is movable toward and away from the nailing die, nail driving means, a clutch engagement of which renders said nail driving means active, manually controlled means movable a predetermined distance for rendering said fluid pressure means active to move the jack toward the nailing die for clamping together under substantial pressure a heel and the heel seat portion of a shoe, a timer and clutch trip unit having a plunger which is operatively connected to said cluch and is initially moved in response to movement of said manually controlled means and which is thereafter moved in response to fluid under pressure of said fluid pressure means and is adapted to trip said clutch and accordingly operate said nail driving means to drive nails into the heel and the heel seat portion of the shoe, and means for varying resistance offered to said plunger to vary the time of engagement of the clutch with relation to the forcing together of the shoe and the heel.

3. In a heel attaching machine, a jack for supporting a shoe, a nailing die, a carrier which is constructed and arranged to position and to carry with it a heel to be attached to the shoe and a top lift to be attached to the heel, a detent, stops mounted on the carrier, fluid pressure means for urging the carrier in one direction to move said carrier successively into positions which are determined by the engagement of said stops with the detent and in which the heel to be attached to the shoe and the top lift to be attached to the heel are positioned successively over the nailing die, and fluid pressure means for effecting relative movement of the jack and the nailing die to press between them during successive operations respectively of the machine the heel seat of the shoe and the heel and the attached heel of the shoe and the top lift.

4. In a heel attaching machine, a fluid pressure operated plunger, a pair of work-engaging members one of which is operatively connected to the plunger, means comprising an accumulator for supplying fluid under working pressure to the plunger to force together with preliminary pressure a heel and a heel seat of a shoe, a pressure booster operative in response to fluid supplied by said means for supplying fluid under augmented pressure to the plunger to clamp together under secondary pressure the heel and the heel seat portion of the shoe, a valve operative in response to said fluid under working pressure for insuring that fluid under augmented pressure shall not flow back to said accumulator, fastening inserting mechanism, and mechanism comprising a unit responsive to pressure of fluid of said means for rendering said fastening inserting mechanism active to attach the heel thus clamped to the shoe.

5. In a heel attaching machine, a pair of supports, an actuator which is operatively connected to one of said supports, fluid pressure means including a valve, manually actuated means for moving the valve from a closed to an open setting to cause fluid which is included in said means and is under pressure to be forced in one direction against said actuator to move the actuator and accordingly said one support toward the other support thereby forcing together a heel mounted upon one of the supports and a heel seat of a shoe mounted upon the other of the supports, fastening inserting means, mechanism comprising a clutch for operating said fastening inserting means, and a timer and clutch trip unit operated by fluid of said fluid pressure means in response to movement of the valve to said open setting for operating said mechanism to render said fastening inserting means active to drive fastenings into the heel and the heel seat of the shoe, said unit having a throttle valve for varying the timing of said unit, and means for moving said first-named valve back to its closed setting to cause said fluid to be forced in an opposite direction against the actuator to move said actuator and accordingly said one support away from the other support to effect relative retraction of said supports.

6. In a heel attaching machine, a jack, a nailing die, fluid pressure means comprising a control valve, an accumulator, and a piston which carries the jack, means for moving said valve to open a face of said piston to said accumulator to cause work to be clamped under primary pressure between the nailing die and the jack, a booster, which is operated by fluid of said fluid-pressure means under accumulator pressure and which is rendered active when the pressure of fluid acting against said piston is approximately equal to the fluid pressure of the accumulator, for clamping under secondary pressure said work between the die and the jack, said fluid pressure means comprising a cut-off valve positioned between the piston and the accumulator, means for driving nails, means comprising a unit operative partly in response to movement of said control valve and partly to oil under accumulator pressure for rendering said nail driving means active to drive nails into the work clamped under secondary pressure, and a pilot valve, which forms part of said fluid pressure means and is responsive to fluid open to accumulator pressure, for rendering said booster active and for operating said cut-off valve to prevent fluid under secondary pressure flowing back into the accumulator.

7. In a heel attaching machine, a pair of supports, an actuator which has a pair of faces and is operatively connected to one of the supports, fluid pressure means comprising fluid and a treadle valve having a plunger which is movable in one direction to cause said fluid to be forced under pressure against one face of the actuator to move the actuator and accordingly said one support in one direction thereby forcing together a heel mounted upon one of the supports and a heel seat of a shoe mounted upon the other of the supports, fastening inserting means, mechanism comprising a clutch for rendering active said fastening inserting means, manually actuated mechanism for operating the plunger of said treadle valve in said one direction, a timer and clutch trip unit which is initially moved in response to movement of said manually actuated mechanism and is subsequently moved by said fluid under pressure to cause said first-named mechanism to trip the clutch thereby causing said fastening inserting means to be rendered active to drive fastenings into the heel and the heel seat portion of the shoe, and means rendered active in response to movement of the fastening inserting means for moving the plunger of the treadle valve in a direction opposite to said one direction to cause said fluid to be forced against said other face of the actuator thus causing movement of the actuator and accordingly said one support in an opposite direction and thereby effecting relative retraction of said supports.

8. In a heel attaching machine, fluid pressure means including fluid, a pair of supports, an actuator which is operatively connected to one of the supports and has faces against which substantial pressure is alternately applied by the fluid of said fluid pressure means to move said actuator first in one direction and then in an opposite direction, said fluid pressure means comprising a treadle valve having an element, manually actuated means for moving said element from a rest position to a displaced position to cause said fluid under pressure to act upon one of said faces of the actuator to effect movement of the actuator in said one direction thereby forcing together a heel mounted upon one of the supports and a heel seat of a shoe mounted upon the other of the supports, means for moving said element of the treadle valve back to said rest position to cause fluid under pressure to act upon the other of said faces of the actuator to effect movement of the actuator in said opposite direction thereby causing relative retraction of the supports, fastening inserting mechanism, and mechanism comprising a member initially displaced in timed relation with said element of the treadle valve and subsequently displaced in response to fluid under pressure in said fluid pressure means for rendering said fastening inserting means active to drive fastenings into the heel and the heel seat of the shoe to attach the heel to the shoe.

9. In a heel attaching machine, a jack, a nailing die, fluid pressure means comprising a control valve, manually actuated means for operating said valve, an accumulator for fluid under pressure, and a piston which carries the jack and has a pair of faces, means for operating said valve to cause fluid in said accumulator to be available for one face of the piston to cause work to be clamped under primary pressure between the nailing die and the jack, a fluid pressure booster, which is operated by fluid from the accumulator and is rendered active when fluid pressure acting against said one face of the piston is approximately equal to the fluid pressure in the accumulator, for clamping said work between the die and the jack under secondary pressure, means for driving nails, a unit responsive partly to said manually actuated means and partly to fluid under accumulator pressure for rendering said nail driving means active to drive nails into the work clamped under secondary pressure, and a pressure regulator comprising a cut-off valve one face of which has access to fluid at the entry portion of the booster unit and another face of which has access to fluid in a line connected to the accumulator, said cut-off valve being constructed and arranged to prevent flow of accumulator oil to said booster when resistance of the piston to oil supplied by the booster reaches a predetermined maximum controlled by said regulator.

10. In a heel attaching machine, a plunger, a pair of members one of which is operatively connected to the plunger, means comprising an accumulator for supplying fluid under pressure to the plunger to clamp together with preliminary pressure a heel and a heel seat of a shoe supported respectively by said members, a pressure booster which is operated by fluid supplied by the accumulator and which imparts augmented fluid pressure to the plunger to clamp together under secondary pressure the heel and the heel seat of the shoe, and a booster pilot valve which is operative in response to fluid pressure supplied by the accumulator and acting upon the plunger and which renders the booster active when a preliminary pressure greater than a predetermined minimum acts upon the plunger.

11. In a heel attaching machine, fluid pressure means, a pair of supports, an actuator having faces against which pressure is applied alternately by said fluid pressure means to move said actuator first in one direction and then in an opposite direction, said fluid pressure means comprising a starter valve having an element, mechanism which is adapted to move said element from a rest position to a displaced position to cause movement of the actuator in said one direction thereby forcing together a heel mounted upon one of the supports and a heel seat of a shoe mounted upon the other of the supports and which is adapted to move said element back to said rest position to effect movement of the actuator in said opposite direction thereby causing relative retraction of the supports, a pressure booster unit, means responsive to fluid pressure applied against one of the faces of the actuator during its movement in said one direction for rendering the booster unit active to apply augmented pressure to said one face to force together under secondary pressure said heel and heel seat of the shoe, mechanism for inserting fastenings into the heel and the heel seat of the shoe, and mechanism movable in response to movement of said element of said valve for rendering said fastening inserting mechanism active to attach the heel to the shoe.

12. In a heel attaching machine, fluid pressure means, a pair of supports, an actuator operatively connected to one of the supports and having faces against which pressure is applied alternately by said fluid pressure means to move the actuator and accordingly said one support first in one direction and then in an opposite direction, said fluid-pressure means comprising a starter valve having an element, manually actuated mechanism for moving said element from a rest position to a displaced position to cause movement of the actuator in said one direction whereby to force together a heel mounted on one of the supports and a heel seat of a shoe mounted upon the other of the supports, a pressure booster unit, means responsive to fluid pressure built up against one of the faces of the actuator when the heel and the heel seat of the shoe are forced together for rendering the booster unit active to supply augmented pressure to said one face to force together under secondary pressure said heel and heel seat of the shoe, mechanism for driving nails through the heel and the heel seat of the shoe, mechanism movable in response to movement of said element of the starter valve to its displaced position for rendering said nail driving mechanism active to attach the heel to the shoe held together under secondary pressure, means adapted to move said element back to said rest position to effect movement of the actuator and accordingly said one support in said opposite direction to release the shoe and its attached heel, and a pressure regulator, said fluid pressure means also comprising a cut-off valve having a plunger provided with faces which are in communication respectively with the pressure regulator and the booster unit, said plunger when the fluid pressure in said unit exceeds a figure determined by the setting of said regulator being operated to a position to cut off the booster unit from the accumulator.

13. In a heel attaching machine, a jack, a nailing die, and fluid pressure means for effecting relative approaching movement and movement of separation of the die and the jack, said fluid pressure means comprising a cutoff valve and a limit stop valve which is operative in response to movement of separation of the nailing die and the jack to cause said fluid pressure means to close said cutoff valve and thus to render said means ineffective to cause further movement of separation between the jack and the nailing die.

14. In a heel attaching machine, a pair of supports, a piston operatively connected to one of the supports, fluid pressure means comprising a pair of chambers which are formed partly by said piston and into which high pressure fluid of said means is introduced in succession to move said piston and accordingly one support first in one direction and then in an opposite direction, a cut-off valve for shutting off high-pressure fluid from one of said chambers to limit movement of the piston in said opposite direction, and a pilot valve which is operated in response to movement of the piston in said opposite direction for operating said cut-off valve.

15. In a heel attaching machine, a jack for supporting a shoe, a nailing die for supporting a heel, fluid pressure means comprising high and low pressure lines, a treadle valve having an element, and an actuator which carries the jack and has a pair of faces, manually actuated means for moving said element of the treadle valve from a rest position to a displaced position to cause one of said faces of the actuator to be connected to said high-pressure line and to cause the other face of said actuator to be connected to the low-pressure line thereby moving the actuator and accordingly moving the jack toward the nailing die to clamp the heel seat of the shoe against the heel, means for moving said element of the treadle valve back to its rest position from its displaced position to cause said one face of the actuator to be connected to the low-pressure line and to cause said other face to be connected to the high-pressure line whereby to move the jack away from the nailing die, and means comprising a limit stop valve which is movable in response to movement of the actuator for stopping movement of the actuator and accordingly the jack away from the nailing die.

16. In a heel attaching machine, a pair of members, nail driving means, fluid pressure means operatively connected to one of said members and comprising an accumulator, control means comprising a plunger, manually actuated means for moving the plunger in one direction to cause fluid from the accumulator and acting through said fluid pressure means to move said one member in one direction to cause a heel and a heel seat of a shoe mounted respectively upon said members to be clamped together, and means movable in response to movement of said plunger for rendering said nail driving means active to attach the heel to the shoe, means for moving said plunger of the control means in an opposite direction to cause fluid from the accumulator and acting through said fluid pressure means to move said one member in a direction opposite to said one direction preparatory to removing the shoe and its attached heel from the machine, said fluid pressure means also comprising a limit stop valve responsive to movement of said one member and a cut-off valve which is responsive to movement of the limit stop valve for rendering the fluid of said fluid pressure means ineffective in moving said one member in said opposite direction.

17. In a heel attaching machine, a jack, an abutment, fluid pressure means comprising a plunger which is operatively connected to the jack and has a pair of faces, an accumulator for fluid under pressure, a low-pressure line, a valve having an element, manually actuated means for moving said element of the valve from a rest to a displaced position thereby causing one and the other of said faces of the plunger to be available respectively to fluid in the accumulator and in said low-pressure line and thus moving the plunger in one direction to clamp together a heel seat of a shoe and a heel mounted respectively upon the jack and the abutment, means for moving said element of the valve back to its rest position thereby causing said other and said one of the faces of the plunger to be available respectively to fluid in the accumulator and in the low-pressure line and thus moving the plunger in an opposite direction, a cut-off valve for shutting off the supply of fluid from the accumulator from said other face of the plunger during movement of said plunger in said opposite direction, a limit stop valve, and means responsive to movement of the plunger in said opposite direction for operating said limit stop valve after said plunger has moved a predetermined distance in said opposite direction to operate said cut off valve and accordingly to stop movement of and to establish the starting position of the plunger.

18. In a heel attaching machine, a jack and a nailing die for supporting respectively a shoe and a heel to be attached to the shoe, fluid pressure means for moving said jack toward and away from said die, an accumulator for retaining under pressure a portion of fluid of said means, a low-pressure line, said fluid pressure means comprising a plunger which is operatively connected to the jack and a control valve for making fluid in the accumulator and the low-pressure line available alternately to operating faces respectively of the plunger to move the plunger first in one direction to cause the heel seat of the shoe mounted upon the jack to be forced under preliminary pressure against the heel supported upon said nailing die and then in an opposite direction, a cutoff valve forming part of said fluid pressure means and arranged between one of the faces of the plunger and the control valve and being adapted to stop flow of fluid from said control valve to said one face of the plunger, a limit stop valve which is moved in response to movement of said plunger in said opposite direction for causing said cutoff valve to close thereby limiting movement of the plunger in said opposite direction and establishing the starting position of the jack, a fluid booster and pilot valves therefor operative in response to pressure from the accumulator for causing the plunger to be forced under secondary pressure in said one direction to cause through the jack said shoe to apply secondary pressure against the heel supported by the nailing die, and a valve controlled by one of said pilot valves and operated by pressure from the accumulator for preventing oil which is under pressure from the booster flowing back into the accumulator.

19. In a heel attaching machine, a jack and a fixed abutment constructed and arranged to support respectively a shoe and a heel to be attached to the shoe, fluid pressure means for moving the jack toward and away from the abutment, said fluid pressure means comprising fluid and a plunger which is operatively connected to the jack and has a pair of operating faces, nail driving means, an accumulator for retaining under pressure a part of said fluid of said means, a manually actuated control valve which forms part of said fluid pressure means and operation of which causes oil in the accumulator to be available alternately first to one and then the other of said faces of the plunger to move said plunger and accordingly the jack first in one direction to force the shoe against the heel and then in an opposite direction to enable the shoe and its attached heel to be moved away from said abutment, and means for operating the said nail driving means to attach the heel against which the shoe has been forced to the shoe, said fluid pressure means also comprising a cut-off valve interposed between said other face of the plunger and the control valve for limiting flow of fluid from the accumulator to said other face of the plunger, and a limit stop valve which is responsive to movement by said plunger and causes the closing of said cut-off valve thereby limiting movement of the plunger and establishing an idle position of the jack.

20. In a machine for securing two shoe parts together, members for supporting said parts respectively, fluid pressure means for effecting relative movement of said members, said fluid pressure means comprising an actuator which has a pair of faces and is operatively connected to one of said members, an accumulator for fluid under pressure, a control valve having a movable element, means for moving said element of the control valve between projected and retracted positions to render said faces of the actuator available alternately to oil in the accumulator and thus to move the plunger first in one direction to cause the shoe parts to be clamped together and then in an opposite direction, means for driving nails into said shoe parts when they are clamped together to secure said shoe parts to one another, mechanism actuated in timed relation with said control valve for rendering said nail driving means active to drive said nails, a cut-off valve positioned between one of said faces of the actuator and the control valve for limiting flow of fluid from the accumulator to said one face of the actuator, and a limit stop valve responsive to movement of said actuator for causing said cut-off valve to stop flow of oil under pressure to said one face of the actuator to limit movement of said actuator in said opposite direction.

21. In a heel attaching machine, a nailing die, a jack, an actuator which is operatively connected to the jack, fluid pressure means which is operatively associated with the actuator and which comprises an accumulator for fluid under pressure and a control valve, and manually actuated means for operating said valve to cause said fluid pressure means to render said fluid from the accumulator available for said actuator to move the jack toward the nailing die whereby to force together under preliminary pressure a heel seat of a shoe mounted on the jack and a heel which is mounted on the die and is to be attached to the shoe, said fluid pressure means also including a booster unit which is operated in response to fluid under accumulator pressure and which is adapted to cause said heel and heel seat of the shoe to be forced together under secondary pressure by the jack acted upon by the actuator.

22. In a heel attaching machine, a nailing die, a jack, an actuator which is operatively connected to the jack, fluid pressure means which is operatively associated with the actuator and which comprises an accumulator for fluid under pressure and a control valve, and manually actuated means for operating said valve to cause said fluid pressure means to render said fluid from the accumulator available for said actuator to move the jack toward the nailing die whereby to force together under preliminary pressure a heel seat of a shoe mounted on the jack and a heel which is mounted on the die and is to be attached to the shoe, said fluid pressure means comprising a booster unit which is operated in response to fluid under accumulator pressure and which is adapted to cause said heel and heel seat of the shoe to be forced together under secondary pressure by the jack acted upon by the actuator, said fluid pressure means also including a valve which is open to render accumulator fluid available for the actuator to exert preliminary pressure on said actuator but which is closed when the booster unit is operated to insure against fluid under booster pressure being available for the accumulator.

23. In a heel attaching machine, a nailing die, a jack, an actuator which is operatively connected to the jack, fluid pressure means which is operatively associated with the actuator and comprises an accumulator for fluid under pressure and a control valve, manually actuated means for operating said valve to cause said fluid pressure means to render said fluid from the accumulator available for said actuator to move the jack toward the nailing die whereby to force together a heel seat of a shoe and a heel to be attached to the shoe under preliminary pressure, said fluid pressure means comprising a booster unit which is operated in response to said fluid under accumulator pressure and which is adapted to cause said heel and heel seat of the shoe to be forced together under scondary pressure by the jack acted upon by the actuator, and a pressure regulator connected to the booster unit for limiting maximum pressure that can be applied against the actuator.

24. In a heel attaching machine, a pair of supports adapted to receive respectively a shoe and a heel, an actuator operatively connected to one of said supports, fluid pressure means for operating said actuator, said fluid pressure means comprising an accumulator and a control valve having a plunger movable from a starting position to one position in which fluid under pressure from the accumulator is caused to move the actuator and accordingly said one support in one direction to force with preliminary pressure said shoe and heel together and then back to said starting position in which fluid under pressure from the accumulator causes the actuator and accordingly said one support to move in an opposite direction, a fluid pressure booster actuated by fluid under pressure from the accumulator for augmenting the pressure applied to said actuator as said actuator and said one support is forced in said one direction to force with secondary pressure the shoe parts together, and a pressure regulator for cutting off fluid under accumulator pressure from the booster when pressure at the booster reaches a predetermined maximum.

25. In a heel attaching machine, a jack for supporting a shoe, a nailing die, a carrier which is movable along the nailing die and is adapted to position and to carry with it a heel which is to be attached to the shoe and a top lift which is to be attached to the heel, fluid pressure means for urging the carrier in one direction over the nailing die, stops mounted upon the carrier, a detent which is successively engaged by said stops to locate the carrier in two different operating positions in which the heel and the top lift are arranged respectively over the nailing die during two successive cycles of the machine, means for retracting the detent during each cycle of the machine to allow the carrier to be moved during said two successive cycles by the action of said fluid pressure means into said two different operating positions respectively with relation to the nailing die, fluid pressure means for effecting relative movement of the jack and nailing die to clamp between them during said successive cycles respectively of the machine the heel seat of the shoe and the heel on the one hand and the attached heel of the shoe and the top lift on the other hand, a pressure regulator which comprises a plurality of pressure regulating units and a slide for selectively rendering any one of said units active, and means comprising a cam responsive to movement of the carrier and adapted to move the slide into one of a plurality of positions in accordance with the position of the carrier upon the nailing die.

26. In a heel attaching machine, a nailing die having passages, a unit having passages, tubes through which nails are delivered by gravity to the passages of said unit, said unit being offset horizontally from and being positioned a considerable distance below the nailing die, a loader block having passages, means for moving in succession the loader block in horizontal and vertical paths respectively from a position beneath said unit to a position above the nailing die and for reversing said movement of the loader block back to a position beneath said unit, a shutter for retaining nails in the passages of the loader block, a shutter for retaining nails in the passages of said unit, means for releasing the shutter of the loader block when the block is over the nailing die to allow said nails in the passages of said block to drop into the passages of the nailing die, and means for releasing the shutter of said unit when the loader block is beneath said unit to allow nails in the passages of the unit to drop into the passages of the loader block.

27. In a heel attaching machine, a nailing die having passages, a unit having passages, tubes through which nails are delivered by gravity to the passages of said unit, said unit being offset horizontally from and being positioned a considerable distance below the nailing die, a loader block having passages, fluid-pressure means for moving the loader block in a rectilinear vertical path and for swinging at the upper and lower ends of said vertical path said block in horizontally arranged paths from a position beneath said unit to a position above the nailing die and for reversing said movement of the loader block back to a position beneath said unit, a shutter for retaining nails in the passages of the loader block, a shutter for retaining nails in the passages of said unit, means for releasing the shutter of the loader block when the block is over the nailing die to allow said nails in the passages of said block to drop into the passages of the nailing die, and means for releasing the shutter of said unit when the loader block is beneath said unit to allow nails in the passages of the unit to drop into the passages of the loader block.

28. In a heel attaching machine, a nailing die having passages, means for forcing a heel seat of a shoe against a heel supported by said die, a nail delivering unit, a loader block movable in a cycle including dwells over the nailing die and under the nail delivering unit, a valve comprising a plunger, fluid pressure means operative in response to movement of said plunger for moving the loader block through its cycle to deliver nails to the passage of the nailing die and to receive nails from the nail delivering unit, treadle actuated means for rendering said first-named means active, and means movable in response to movement of said plunger for preventing during the delivery of nails to the nailing die said treadle actuated means from rendering said first-named means active.

29. In a heel attaching machine, a nailing die having passages, drivers movable in said passages, means for clamping work against the nailing die, a nail delivering unit, a loader block, a manually actuated member, and fluid pressure means operative in response to movement of said member for moving said loader block through a cycle including dwells over the nailing die and under the nail delivering unit, said fluid pressure means comprising fluid bypasses for causing said loader block during portions of its cycle to come to rest in the event that substantial resistance is encountered by said block and also to insure that the loader block shall not stop abruptly as it approaches its dwell positions.

30. In a heel attaching machine, a nailing die having passages, means for clamping work against the nailing die, a nail delivering unit, a loader block, a manually actuated member, an accumulator, fluid pressure means connected to the accumulator and comprising a pair of valves, a pair of associated units responsive to operation of said valves upon actuation of said members for transferring respectively said loader block horizontally and vertically in timed relation in a cycle including dwells over the nailing die and under the nail delivering unit, and means associated with one of the valves and having bypasses for causing said loader block to stop in case any substantial resistance is encountered and to dampen movement of said block as it approaches its dwell positions.

31. In a heel attaching machine, a jack and a nailing die for supporting respectively a shoe and a heel which is to be attached to the shoe, a plunger operatively connected to the jack, fluid pressure means comprising an accumulator for supplying fluid under pressure to the plunger to cause said jack to move toward the nailing die and accordingly to cause the heel and the heel seat of the shoe to be clamped together under preliminary pressure, a manually actuated control valve for said fluid pressure means, a pair of pilot valves one of which is opened in response to fluid pressure applied against the plunger and the other of which is opened in response to said fluid pressure after said one pilot valve has been opened, a fluid pressure booster which is operative, after said pilot valves have been opened, in response to fluid under accumulator pressure and which supplies fluid under augmented pressure to the plunger to cause said jack to clamp together under secondary pressure the heel and the heel seat portion of the shoe, a cut-off valve which is rendered active in response to the opening of said one pilot valve for insuring that fluid under booster pressure shall not flow back into the accumulator, mechanism for driving nails, means operative in response to movement of said control valve for rendering said mechanism active to drive nails into the heel and the heel seat of the shoe, a nail delivering unit, a loader block, fluid pressure means which is open to the accumulator and is adapted to move the loader block between the nail delivering unit and the nailing die to deliver nails to said die, and means movable in response to said last named fluid pressure means for preventing movement of the control valve thereby preventing movement of the plunger during movement of the loader block.

32. In a heel attaching machine, a nailing die having passages, a nail delivering unit, a loader block, an accumulator, fluid pressure means connected to the accumulator and comprising a pair of valves, means comprising a manually actuated member for operating said valves, a pair of fluid pressure operated units which are operatively connected to said valves and are moved in timed relation for transferring respectively said loader block horizontally and vertically in a cycle including dwells over the nailing die and under the nail delivering unit, one of the valves comprising fluid bypasses for causing said loader block to stop in case any substantial resistance is encountered and to dampen movement of said block as it approaches its dwell positions, and a pressure regulating valve which is positioned between the accumulator and said valves for governing the speed of the loader block during its cycle.

33. In a heel attaching machine, a jack for supporting a shoe, a nailing die, a guide, a carrier slidable with relation to the nailing die along said guide and comprising units for positioning on and securing to the carrier a heel which is to be attached to a shoe and a top lift which is to be attached to the heel respectively, means for urging said carrier in one direction along said guide, fluid pressure means for moving the jack toward the nailing die to force in two successive operations of the machine between the die and the jack, said heel seat of the shoe and the heel on the one hand and the attached heel and the top lift on the other hand, a pressure regulator comprising a pair of units for limiting maximum pressures that can be applied against the work and comprising a selector slide, and means for moving said selector slide in timed relation with the carrier as it slides relatively to the nailing die to render active in succession said units of the pressure regulator during the heel and top lift attaching operations of the machine.

34. In a heel attaching machine, a jack for supporting a shoe, a nailing die, a carrier which is constructed and arranged to position and to carry with it a heel to be attached to the shoe and a top lift to be attached to the heel and which is movable into two positions to move during two successive cycles respectively of the machine the heel and the top lift into positions to be operated upon over the nailing die, means for moving the carrier, fluid pressure means for effecting relative movement of the jack and the nailing die to press between them during successive cycles respectively of the machine the heel and the heel seat of the shoe and the attached heel of the shoe and the top lift, manually actuated means for rendering said fluid pressure means active to operate the machine through each of its cycles, a pressure regulator comprising a plurality of units, and means operatively connecting the carrier and the pressure regulator for selectively utilizing different units of the pressure regulator for controlling maximum pressures between the shoe and the heel and between the attached heel of the shoe and the top lift during two successive cycles of the machine.

35. In a heel attaching machine, a jack for supporting a shoe, a nailing die, a carrier which is movable along the nailing die and is constructed and arranged to position and to carry with it a heel which is to be attached to the shoe and a top lift which is to be attached to the heel, means for moving the carrier, fluid pressure means for effecting relative movement of the jack and the nailing die to press between them during successive operations respectively of the machine the heel seat of the shoe and the heel and the attached heel of the shoe and the top lift, a pressure regulator comprising a selector slide for controlling maximum pressures to be exerted between the shoe and the heel and between the attached heel and the top lift during said successive operations of the machine, and means comprising a cam secured to the carrier and adapted to move the selector slide into predetermined positions in said regulator in accordance with the position of the carrier upon the nailing die.

36. In a heel attaching machine, a jack for supporting a shoe, a nailing die, a carrier which is constructed and arranged to position and to carry with it a heel which is to be attached to the shoe and a top lift which is to be attached to the heel and which is movable into two positions to move in succession the heel and the top lift into positions to be operated upon over the nailing die, means for moving the carrier, fluid pressure means for effecting relative movement of the jack and the nailing die to press between them during successive operations respectively of the machine the heel seat of the shoe and the heel and the attached heel of the shoe and the top lift, and means responsive to movement of the carrier for regulating maximum pressures between the heel and the shoe and between the attached heel and the top lift during successive operations of the machine.

37. In a heel attaching machine, a nailing die having passages, a jack, a plurality of drivers movable in said passages, means for forcing a heel seat of a shoe mounted upon the jack against a heel supported by the nailing die, a nail delivering unit, a loader block, and fluid pressure means operative in response to movement of the jack for automatically moving said loader block through a cycle including dwells at a nail delivering position over a nailing die and at a nail receiving position beneath the nail delivering unit.

38. In a heel attaching machine, a jack and a nailing die for supporting respectively a shoe and a heel to be attached to the shoe, a plunger operatively connected to the jack, means comprising an accumulator for supplying fluid under pressure to the plunger to move the jack toward the nailing die to clamp together the heel and the heel seat of the shoe, a loader block, fluid pressure means connected to the accumulator for operating said loader block through a cycle to supply nails to the nailing die, means for driving nails through the heel and the heel seat of the shoe, mechanism rendered active in response to said first named means for causing said nail driving means in turn to be rendered active to attach the heel to the shoe, and fluid pressure actuated means for preventing movement of the plunger during operation of the loader block.

39. In a heel attaching machine, fluid pressure means comprising a jack, a nailing die, fastening inserting means operable through said die, mechanism for operating said fastening inserting means, manually actuated means for rendering said fluid pressure means active to move the jack toward the nailing die for forcing together a heel and a heel seat of a shoe, and a valve operation of which is initiated in response to movement of said manually operated means and is continued in response to said fluid pressure means to render said mechanism active to cause said fastening inserting means to drive fastenings through said die and into the heel and the heel seat of the shoe.

40. In a heel attaching machine, a pair of supports, fluid pressure means, said means comprising a treadle valve and a plunger which is operatively connected to one of the supports, manually actuated mechanism for operating the treadle valve to cause said means to move the plunger and said one support toward the other support thereby clamping together a heel and a heel seat of a shoe supported respectively upon the supports, mechanism for driving nails into the heel and the heel seat of the shoe, a mechanical drive, a clutch for connecting said nail driving mechanism to said drive and for disconnecting said nail driving mechanism from said drive, clutch tripping means responsive to pressure exerted against the plunger for tripping the clutch to effect movement of the nail driving means, and means to disengage the clutch for disconnecting the nail driving mechanism from the drive.

41. In a heel attaching machine, a nailing die, a jack, a carrier for a heel, nail driving means associated with said die, fluid pressure means, treadle actuated means for rendering said fluid pressure means active to force the heel seat of a shoe mounted upon the jack with preliminary pressure against the heel positioned in the carrier and supported by the die, means comprising valves operative to predetermined positions in response to operation of said fluid pressure means against the shoe, a booster which, after said valves have been operated to said predetermined positions, is responsive to said fluid pressure means for forcing the jack against the shoe with secondary pressure, means for rendering said nail driving means active to drive nails into the heel and the heel seat of the shoe, and a pressure regulator for limiting maximum pressure that can be applied to the jack against the shoe during the attachment of the heel to the shoe.

42. In a heel attaching machine, a nailing die, a jack, a carrier for a heel, nail driving means operable through said die, fluid pressure means, a treadle operated valve for rendering said fluid pressure means active to cause said jack to force the heel seat of a shoe mounted on it against a heel positioned in the carrier and supported by the die, means responsive to said fluid pressure means for rendering said nail driving means active to drive nails into the heel and the heel seat of the shoe to attach the heel to the shoe, and a pressure regulator responsive to said fluid pressure means for limiting the maximum allowable pressure that can be exerted by the jack against the shoe.

43. In a heel attaching machine, a pair of supports for receiving respectively a shoe and a heel which is to be attached to the shoe, an actuator operatively connected to one of the supports, fluid pressure means comprising an accumulator for fluid under pressure, a treadle valve, nail driving means, mechanically powered means, a clutch for operatively connecting said powered means to said nail driving means and for disconnecting said nail driving means from said powered means, mechanism for operating the clutch, and treadle operated mechanism for operating said treadle valve to render available for said actuator, fluid pressure in the accumulator thereby moving the actuator in one direction to force together the heel and the heel seat of the shoe upon said supports and for thereafter operating said clutch operating mechanism to cause the clutch to be engaged and the nail driving means rendered active to drive nails into the heel and the heel seat of the shoe.

44. In a heel attaching machine, a plunger, fluid pressure means for operating the plunger, a pair of members for supporting respectively a shoe and a heel to be attached to the shoe, one of said members being operatively connected to the plunger, said fluid pressure means comprising an accumulator for supplying fluid under pressure to the plunger to cause the heel and the heel seat of the shoe to be clamped together with preliminary pressure, a booster operative in response to fluid supplied by the accumulator for supplying fluid under increased pressure to the plunger to clamp together the heel seat of the shoe and the heel with secondary pressure, a valve for insuring against oil which is under said increased pressure and is made available to the plunger by the booster being available for the accumulator, mechanism which comprises a clutch and is constructed and arranged to drive nails, treadle actuated mechanism for rendering said fluid pressure means active to operate said plunger, and means comprising a timing and clutch trip unit operated initially by said treadle actuated mechanism and thereafter by fluid of said fluid pressure means for rendering said nail driving means active to drive nails through the heel and the heel seat of the shoe.

45. In a heel attaching machine, fluid pressure means comprising a jack for supporting a shoe, a nailing die for supporting a heel, fastening inserting means associated with the die, mechanism for operating said fastening inserting means, said mechanism comprising a plunger and a clutch, and manually actuated means for rendering a portion of said fluid pressure means active to move the jack toward the nailing die for forcing together the heel and the heel seat of the shoe, said plunger being initially moved in response to movement of said manually actuated means and being further moved in response to another portion of said fluid pressure means to effect engagement of said clutch and accordingly to render said mechanism active to cause said fastening inserting means to drive fastenings through the heel and the heel seat of the shoe.

46. In a heel attaching machine, fluid pressure means, a plunger operated by said means, a pair of work engaging members one of which is operatively connected to the plunger, an accumulator for supplying relatively low-pressure oil to said fluid pressure means, a treadle valve for controlling said fluid pressure means to cause a heel and a heel seat portion of a shoe supported respectively by said members to be clamped together under preliminary pressure, a fluid pressure booster operative in response to fluid pressure from the accumulator for supplying relatively high-pressure oil to portions of said fluid pressure means and to actuate the plunger thereby forcing together under secondary pressure the heel and the heel seat of the shoe, a fluid pressure operated valve for insuring against high-pressure fluid which is supplied by the booster and is available for the plunger being available for the accumulator, mechanism for driving nails into the heel and the heel seat of the shoe, and mechanism which is operated initially in timed relation with the treadle valve and is thereafter actuated by fluid from the accumulator for effecting operation of said nail driving mechanism.

47. In a heel attaching machine, a jack for supporting a shoe, a carrier for a heel, a nailing die having passages, nail driving mechanism mounted for movement in said passages, fluid pressure means comprising a control valve for operating the jack to force under preliminary pressure the heel seat of the shoe upon the jack against a heel positioned upon the carrier and supported by the nailing die, a fluid pressure booster which is operatively connected to said fluid pressure means, a mechanical drive, treadle mechanism for operating said control valve, a clutch, and a clutch trip unit comprising a member which is actuated initially by said treadle mechanism and thereafter by said fluid pressure means and which is operatively connected to said clutch to trip the same thereby coupling said mechanical drive to the nail driving mechanism to drive nails then in said passages into the heel and the heel seat of the shoe.

48. In a machine for attaching heels to shoes, members for supporting respectively a shoe and a rubber heel to be attached to the shoe, fluid pressure means, mechanical connections between said fluid pressure means and one of said members, said one member being movable toward the other in response to said fluid pressure means and in response to the weight of said one member and said connections to cause said members to clamp the shoe and the heel between them, means for driving nails into the heel and the heel seat of the shoe to attach the heel to the shoe, and means for rendering the said fluid pressure means ineffective just prior to and during the time that the nails are being driven the weight of said one element and said connections being relied upon to retain the work in position against the action of the nail driving means.

49. In a machine for attaching heels to shoes, a nailing die, a carrier for a rubber heel, a jack, fluid pressure means for forcing the jack toward the nailing die under substantial pressure initially to clamp a shoe mounted upon the jack against the heel positioned in the carrier and supported by the nailing die, means associated with the nailing die for driving nails into the heel and the heel seat of the shoe, and means comprising a throttle valve for causing said initial clamping pressure imparted to the work by said fluid pressure means to be reduced just prior to and during the driving of said nails.

50. In a heel attaching machine, a nailing die, fluid pressure means comprising mechanism including a jack which is movable toward and away from the nailing die, nail driving means, a clutch engagement of which renders said nail driving means active, manually actuated means movable a predetermined distance for rendering said fluid pressure means active to move the jack toward the nailing die for clamping together under substantial pressure supplied by said fluid pressure means and the weight of said mechanism a rubber heel, a base lift and the heel seat portion of a shoe, a timer and clutch trip unit having a plunger which is initially moved in response to movement of said manually actuated means and is thereafter moved in response to fluid of said fluid pressure means and which is adapted to operate said clutch to render said nail driving means active to cause nails to be driven into the heel, the base lift and heel seat of the shoe, means for varying resistance offered to said plunger to vary the time of engagement of the clutch with relation to the forcing together of the shoe and the heel, and means for rendering said fluid pressure means ineffective to impart any substantial fluid pressure to the jack when the heels are being driven into the rubber heel, the base lift and the heel seat of the shoe thereby relying substantially upon the weight of said mechanism to retain the work in position against the action of said nail driving means.

51. In a heel attaching machine, fluid pressure means comprising mechanism including a jack operatively connected to said fluid pressure means, a nailing die, nail driving means, mechanism for operating said nail driving means, manually actuated means for rendering said fluid pressure means active to move the jack toward the nailing die for initially forcing together under pressure supplied partly by said fluid pressure means and partly by the weight of said first named mechanism a rubber heel and a shoe preparatory to operating said nail driving means, a timer and clutch trip unit having a plunger which is first moved in response to movement of said manually actuated means and movement of which is continued in response to said fluid pressure means to operate with delayed action said second-named mechanism to drive nails into the heel and the heel seat of the shoe, and means for rendering said fluid pressure means inactive to cause pressure applied against the work through said fluid pressure means to be released just prior to operating said nail driving means thereby relying upon the weight of said mechanism to force together the heel and the shoe while the nails are being driven.

52. In a heel attaching machine, a pair of supports, fluid pressure means comprising a treadle valve and a plunger which is operatively connected to one of the supports, manually actuated mechanism for operating the treadle valve to cause one of said supports to be moved toward the other to force together under primary pressure a rubber heel and the heel seat of a shoe mounted respectively upon said supports, mechanism for driving nails into the heel and the heel seat of the shoe, a mechanical drive, a clutch for operatively connecting said nail driving mechanism to said drive and for disconnecting said mechanism from said drive, means responsive to pressure exerted against the plunger for causing the clutch to be engaged to effect movement of the nail driving means, means for disengaging the clutch, a booster having a piston for applying increased pressure to the plunger to force together said heel and heel seat of the shoe under secondary pressure, an exhaust pressure line, and a line which in response to movement of the piston of the booster is connected to said exhaust line and to said plunger just prior to and during operation of said nail driving means to release pressure against the plunger.

53. In a heeling machine, a nailing die, a detent, a carrier mounted for sliding movement over and supported by the nailing die, means for withdrawing the detent from and reestablishing it in a carrier detaining position, means for securing and positioning a heel and a top lift in the carrier, a pair of stops mounted upon the carrier, and fluid pressure means for urging the carrier supported by the nailing die in one direction to positions determined by the engagement of said stops with said detent in its carrier detaining position for successively positioning the heel and the top lift in said carrier over the nailing die.

54. In a heeling machine, a nailing die, a detent, a carrier, means for withdrawing the detent from and reestablishing it in a carrier detaining position, means for positioning and holding a heel and a top lift in the carrier, fluid pressure means for urging under pressure the carrier in one direction over the nailing die to positions determined by the engagement of the carrier with said detent in its carrier detaining position whereby successively to locate the heel and the top lift in said carrier with relation to the nailing die, a movable loader block, mechanism associated with said loader block for moving the carrier in a direction opposite to said one direction, and means operated in timed relation with said loader block for rendering said fluid pressure means ineffective in applying pressure against the carrier when said mechanism is operating upon the carrier.

55. In a heeling machine, a jack for receiving a shoe, a support, a carrier which is adapted to hold a heel to be attached to the shoe and to hold a top lift to be attached to the heel and which is supported by and is movable into two positions over the support for locating the heel and the top lift successively with relation to the jack and to support the heel and the top lift to receive the action of the shoe mounted upon the jack, means for effecting relative approaching movements of the jack on the one hand and the support and the carrier on the other hand successively to force together during successive operations of the machine, the shoe and the positioned heel and the heel attached to the shoe and the top lift, a detent responsive to operations of the machine for locating the carrier in said two positions upon the support, and fluid pressure actuated means for moving the carrier over the support in one direction successively into said two positions in response to withdrawal and reestablishing of the detent.

56. In a heeling machine, a jack for receiving a shoe, a nailing die, a carrier which is supported by the nailing die and is constructed and arranged to hold a heel which is to be attached to the shoe and a top lift which is to be attached to the heel, said carrier being movable into two positions for locating the heel and the top lift successively with relation to the jack and to the nailing die to receive the action of a shoe mounted upon the jack and the action of a heel which has been attached to the shoe, means for effecting relative approaching movements of the jack on the one hand and the nailing die and the carrier on the other hand successively to force together during successive operations of the machine the shoe and the positioned heel and the heel attached to the shoe and the positioned top lift, a detent responsive to each operation of the machine for locating the carrier in said two positions upon the nailing die during successive operations of the machine, and fluid pressure means for moving the carrier over the nailing die in one direction successively into said two positions in response to withdrawal and reestablishing of said detent.

57. In a heeling machine, a nailing die having passages, mechanism comprising drivers which are movable in the passages of said die, two concentrically arranged drive shafts, means for rotating said shafts degree for degree in opposite directions, flywheels which are secured to the shafts respectively for rotation therewith, a crank connected to one of the flywheels, and a rod operatively connected to said crank and to said mechanism.

58. In a heeling machine, a powered impeller mounted for continuous reciprocation in a predetermined path, a nailing die having passages, drivers movable in said passages, a reciprocable slide operatively connected to said drivers, means for adjusting the drivers lengthwise of said passages with relation to said slide, a clutch associated with the impeller and the slide, means for effecting engagement of the clutch for operatively connecting the slide to the impeller, means for effecting disengagement of the clutch to release the slide from the impeller, and counterweights which are operatively connected to said impeller and to the slide respectively and are mounted for reciprocation in directions opposite to the directions of movement respectively of the impeller and the slide.

59. In a machine for use in the attachment of heels to shoes, means for clamping a heel against the heel seat of a shoe, drivers for driving nails into the heel and the heel seat of the shoe, means comprising an impeller for operating the drivers, and mechanism comprising a drive shaft rotatable about an axis, a flywheel which has a crank and is secured to said shaft, a connecting rod operatively connecting said crank to the impeller, a second flywheel which is positioned adjacent to the first-named flywheel, and means for rotating said second flywheel about an axis of the drive shaft at the same speed as and in a direction opposite to the direction of movement of the first-named flywheel.

60. In a machine for use in the attachment of heels to shoes, means for clamping a heel against the heel seat of a shoe, drivers for driving nails into the heel and the heel seat of the shoe, and mechanism for operating said drivers, said mechanism comprising an impeller, a pair of flywheels which are rotatable in opposite directions about a common axis, and a connecting rod opposite ends respectively of which are connected to the impeller and to one of the flywheels.

61. In a heeling machine, a nailing die having passages, mechanism comprising drivers which are movable in said passages, two concentrically arranged drive shafts, means for rotating said shafts degree for degree in opposite directions, driving means comprising a flywheel secured to each of the shafts for rotation therewith, a crank connected to one of the flywheels, and a rod operatively connected to said crank and to said mechanism, each of said driving means having a moment of inertia equal to the other with relation to a common axis of said shafts.

62. In a heel attaching machine, a plunger, a pair of members one of which is operatively connected to the plunger, means comprising an accumulator for supplying fluid under pressure to the plunger to clamp together with preliminary pressure a heel and a heel seat of a shoe supported respectively by said members, a pressure booster which is operated by fluid supplied by the accumulator and which imparts augmented fluid pressure to the plunger to clamp together under secondary pressure the heel and the heel seat of the shoe, a booster control valve, a valve for cutting-off the accumulator from the booster, a pilot valve which is operative in response to fluid pressure from the accumulator and controls the action of said pilot valve and the booster control valve as well as the activation of the booster, and a throttle valve for varying timing between the cut-off valve and the booster control valve.

63. In a heel attaching machine, a nailing die, means for positioning a heel on the nailing die, a jack post comprising an upper portion which has a cylindrical bore and a lower portion which comprises a rod constructed and arranged to fit in said bore, said rod having formed in it a channel extending lengthwise of said rod, and a pair of pins which are carried slidably by said jack, are spaced lengthwise of the bore, are constructed and arranged, normally to engage opposite ends of said channel and are both movable independently out of the channel preparatory to disengaging said lower portion of the jack from the upper portion of said jack, the upper pin has been moved out of the channel and the lower pin engages in said channel being slidable heightwise of the jack to enable the lower portion of the jack and a shoe mounted on it to be lowered to test the position of said shoe with relation to the heel on the nailing die.

64. In a heel attaching machine, a jack for supporting a shoe, a nailing die which has passages and is adapted to support a heel, fluid pressure means for moving the jack under primary pressure in one direction toward the nailing die, fluid pressure means for moving the jack with augmented pressure in said one direction toward the nailing die, drivers movable in the passages of the die, mechanism for operating said drivers, manually actuated means, and means responsive to movement of said manually actuated means to one recognizable position for rendering said first-named fluid pressure means active to cause the jack to be moved in said one direction whereby to clamp the heel and the heel seat of the shoe together under primary pressure, said last-named means being responsive to movement of said manually actuated means to a second recognizable position for rendering said second-named fluid pressure means active to cause the jack to be moved in said one direction to clamp together under augmented pressure the heel and the heel seat of the shoe and to cause said mechanism to be operated to move the drivers in the driver passages in directions opposite to the said one direction of movement of the jack whereby to drive nails in said passages into the heel and the heel seat of the shoe.

65. In a heel attaching machine, a jack for supporting a shoe, a nailing die which is adapted to support a heel and has driver passages, an actuator which is operatively connected for positive movement to the jack, fluid pressure means for applying a relatively light force against the actuator to cause the jack to be moved positively in one direction toward the nailing die, fluid pressure means for applying a relatively heavy force against the actuator to cause the jack to be forced positively in said one direction toward the nailing die, nail drivers movable in the passages of the nailing die, mechanism for operating the drivers, manually actuated means, means responsive to movement of said manually actuated means to one recognizable position for rendering said first-named fluid pressure means active to cause said relatively light force to be applied against the actuator whereby to cause positive movement of the jack in said one direction and accordingly the clamping together of the heel and the heel seat of the shoe with primary pressure between the jack and the nailing die, and means responsive to movement of said manually actuated means to a second recognizable position for rendering said second-named fluid pressure means active to cause said relatively heavy force to be applied against the actuator whereby to cause positive pressure of the jack in said one direction and accordingly the clamping together of the heel and the heel seat of the shoe with augmented pressure between the jack and the nailing die and also to cause said mechanism to be rendered active to move said drivers in directions opposite to said one direction in the passages of the nailing die to drive nails into the heel and the heel seat of the shoe.

66. In a heel attaching machine, a nailing die, a jack movable between idle and operating positions respectively away from and over the nailing die, a loader block, nail supplying means, means for moving the loader block through a cycle between a nail receiving station adjacent to said nail supplying means and a nail delivering station over the nailing die, and means responsive to movement of the jack from its operating to its idle position for rendering said means active to operate the loader block through its cycle.

67. In a heel attaching machine, a nailing die, a jack movable between idle and operating positions respectively away from and over the nailing die, a loader block, nail supplying means, fluid pressure means for moving the loader block through a cycle between a nail receiving station adjacent to said nail supplying means and a nail delivering station over the nailing die, and means responsive to movement of the jack from its operating to its idle position for rendering said fluid pressure means active to operate the loader block through its cycle.

68. In a heel attaching machine, a nailing die, a carrier mounted for sliding movement in opposite directions over the nailing die, means for moving the carrier in one of said directions over the nailing die, means comprising a loader block for moving the carrier in the other of said directions over the nailing die, means for causing said carrier operated upon by said first-named means to stop in at least two positions upon the nailing die for successively positioning a heel and a top lift in said carrier over the nailing die, and mechanism for rendering said first-named means ineffective when the carrier is moved by said loader block in said other of said directions.

69. In a heel attaching machine, a jack for supporting a shoe, a nailing die for supporting a heel, fluid pressure means comprising high and low pressure lines, a treadle valve, and an actuator which carries the jack and has a pair of faces, said treadle valve being movable from a rest position to a displaced position to cause one of the faces of the actuator to be connected to said high pressure line and to cause the other face of said actuator to be connected to the low pressure line thereby moving the actuator and accordingly the jack toward the nailing die to clamp the heel seat of the shoe against the heel, said valve being movable back to its rest position from its displaced position to cause said one face of the actuator to be connected to the low pressure line thereby causing said other face to be connected to said high pressure line to move the jack away from the nailing die, and means adjustable lengthwise of the path of movement of the jack and adapted to be engaged by the jack for limiting movement of the jack away from the die and accordingly controlling the starting position of the actuator and the jack.

70. In a heel attaching machine, a pair of members, nail driving means, fluid pressure means operatively connected to one of said members, control means comprising a plunger movable in one direction to cause fluid acting through said fluid pressure means to move said one member in one direction to cause a heel and a heel seat of a shoe mounted respectively upon said members to be clamped together, and means movable in response to movement of said plunger for rendering said nail driving means active to attach the heel to the shoe, said plunger of the control being movable in an opposite direction to cause fluid acting through said fluid pressure means to move said one member in a direction opposite to said one direction preparatory to removing the shoe and its attached heel from the machine, and means comprising a feeler which may be initially set in different adjusted positions and is responsive to movement of said one member in said opposite direction for causing said fluid pressure means to stop said one member in different positions depending upon the position of the feeler.

71. In a heel attaching machine, a nailing die, fluid pressure means comprising a jack which is movable toward and away from the die, nail driving means, an impeller which reciprocates continuously when the machine is powered, a one-revolution clutch operatively connecting the impeller to the nail driving means, a treadle valve having a movable element, manually actuated means for displacing said movable element of the treadle valve a predetermined distance for rendering said fluid pressure means active to effect movement of the jack for forcing together under substantial pressure a heel and the heel seat of a shoe positioned between the jack and the nailing die, and a timer and clutch trip unit comprising a plunger which is operatively connected to the clutch, a fluid chamber which offers resistance to said plunger, and a throttle valve, said plunger being displaceable against the action of said resistance first by manually actuated means and thereafter by said fluid pressure means to cause said clutch to be engaged thereby causing nails to be driven into the heel and the heel seat of the shoe, said throttle valve being adjustable to vary the resistance offered said plunger by said fluid chamber to vary the time between the application of pressure between the heel and the heel seat of the shoe and the driving of nails.

72. In a heel attaching machine, supports for a shoe and a heel to be attached to the shoe, fluid pressure means for moving one of the supports toward the other to clamp together a heel seat of the shoe and the heel, means for driving fastenings into the heel and the heel seat of the shoe to attach the heel to the shoe, manually actuated mechanism for controlling the operation of said fluid pressure means and said fastening inserting means, and means operated in timed relation with said fastening inserting means for materially reducing pressure applied by said fluid pressure means against the said one support during the driving of nails into the heel and the heel seat of the shoe.

73. In a machine for use in the manufacture of shoes, an abutment, a jack movable between idle and operative positions respectively away from and toward the abutment, a loader block, nail supplying means, means for moving the loader block through a cycle between a nail receiving station adjacent to said nail supplying means and a nail delivering station adjacent to the abutment, and control means movable in timed relation with the jack from its operating to its idle position for rendering said loader block moving means active to operate the loader block through its cycle.

74. In a machine for use in the manufacture of shoes, an abutment, a jack movable between idle and operative positions respectively away from and toward the abutment, a loader block, nail supply means, fluid pressure means for moving the loader block through a cycle between a nail receiving station adjacent to said nail supplying means and a nail delivering station adjacent to the abutment, and control means movable in timed relation with the jack from its operating to its idle position for rendering said fluid pressure means active to operate the loader block through its cycle.

75. In a machine for use in the manufacture of shoes, an abutment having passages, means for forcing a heel seat of a shoe against the abutment, a nail delivering unit, a loader block movable in a cycle including dwells over the abutment and under the nail delivering unit, a valve comprising a plunger, fluid pressure means operative in response to movement of the plunger for moving the loader block through its cycle to deliver nails in the vicinity of the abutment and to receive nails from the nail delivering unit, treadle actuated means for rendering the first-named means active, and means movable in response to movement of the plunger for preventing, during movement of the loader block, said treadle actuated means for rendering said first-named means active.

76. In a machine for use in the manufacture of shoes, a fluid operated plunger, an abutment, a jack which is operatively connected to the plunger, means comprising an accumulator for supplying fluid under working pressure to the plunger to force a shoe mounted upon the jack against the abutment, a pressure booster operative in response to fluid supplied by said means for supplying fluid under augmented pressure to the plunger to cause the jack to force the shoe under secondary pressure against the abutment, a valve operative in response to said fluid under working pressure for insuring that fluid under augmented pressure shall not flow back to the accumulator, fastening inserting mechanism, and mechanism comprising a unit responsive to pressure of fluid of said means for rendering said fastening inserting mechanism active to drive fastenings into the heel seat of the shoe.

77. In a machine for use in the manufacture of shoes, a plunger, an abutment, a jack which is operatively connected to the plunger, means comprising an accumulator for supplying fluid under pressure to the plunger to force a shoe mounted upon the jack against the abutment, a pressure booster which is operated by fluid supplied by the accumulator and which imparts augmented fluid pressure to the plunger to force the shoe upon the jack under secondary pressure against the abutment, and a booster pilot valve which is operative in response to fluid pressure supplied by the accumulator and acting upon the plunger and which renders the booster active when a preliminary pressure greater than a predetermined minimum acts upon the plunger.

78. In a machine for operating upon shoes, a jack, an abutment and fluid pressure means for effecting relative approaching movement and movement of separation between the jack and the abutment, said fluid pressure means comprising a cutoff valve and a limit stop valve which is operative in response to movement of separation of the jack and the abutment to cause said fluid pressure means to close said cutoff valve and thus to render said means ineffective to cause further movement of separation between the jack and the abutment.

79. In a machine for use in the manufacture of shoes, a jack, an abutment, a piston operatively connected to the jack, fluid pressure means comprising a pair of chambers which are formed partly by said piston and into which high pressure fluid of said means is introduced in succession to move said piston and accordingly the jack first in one direction and then in an opposite direction, a cutoff valve for shutting off high pressure fluid from one of said chambers to limit movement of the piston in said opposite direction, and a pilot valve which is operated in response to movement of the piston in said opposite direction for operating said cutoff valve.

80. In a machine for operating upon shoes, an abutment, a jack, fluid pressure means comprising an accumulator for fluid under pressure, a control valve and an actuator which carries the jack, and manually actuated means for operating the valve to cause fluid from the accumulator to move said actuator and accordingly the jack toward the abutment to force under preliminary pressure a shoe mounted upon the jack against the abutment, said fluid pressure means also including a booster unit which is open to said actuator and is operated in response to fluid under accumulator pressure for forcing the shoe under secondary pressure against the abutment.

81. In a machine for use in the manufacture of shoes, a jack for supporting a shoe, an abutment which has passages and is adapted to support a heel, a plunger operatively connected to the jack, means comprising an accumulator for supplying fluid under pressure to the plunger to move the jack toward the abutment thereby clamping a heel seat of the shoe mounted upon the jack against the heel supported by the abutment, a loader block, fluid pressure means connected to the accumulator for operating the loader block through a cycle to supply nails to the passages of the abutment, means for driving nails through the passages of the abutment and into the heel seat of the shoe, and fluid actuated means for rendering said second-named means active and for preventing movement of the plunger during operation of the loader block.

82. In a machine for use in the manufacture of shoes, fluid pressure means comprising a jack, an abutment having passages, fastening inserting means operable in the passages of the abutment, mechanism for operating said fastening inserting means, manually actuated means for rendering said fluid pressure means active to move the jack toward the abutment for forcing a shoe mounted upon said jack against said abutment, and a valve operation of which is initiated in response to movement of said manually operated means and is continued in response to said fluid pressure means to render said mechanism active to cause said fastening inserting means to drive fastenings through the passages of the abutment and into the heel seat of the shoe.

83. In a machine for use in the manufacture of shoes, fluid pressure means comprising a jack for supporting a shoe, an abutment having passages, fastening inserting means associated with the abutment, mechanism for operating said fastening inserting means, said mechanism comprising a plunger and a clutch, and manually actuated means for rendering said fluid pressure means active to move the jack toward the abutment for forcing the heel seat of a shoe against said abutment, said plunger being initially moved in response to movement of said manually actuated means and being further moved in response to said fluid pressure means to effect engagement of said clutch and accordingly to render said mechanism active to cause said fastening inserting means to drive fastenings into the heel seat of the shoe.

References Cited in the file of this patent

UNITED STATES PATENTS

| | | |
|---|---|---|
| 876,626 | Elliott | Jan. 14, 1908 |
| 1,002,836 | Gouldbourn | Sept. 12, 1911 |
| 1,122,346 | Wolfe | Dec. 29, 1914 |
| 1,157,688 | Glidden | Oct. 26, 1915 |
| 1,240,279 | Wilson | Sept. 18, 1917 |
| 1,477,247 | Corporon | Dec. 11, 1923 |
| 1,800,094 | Muhlenbruck | Apr. 7, 1931 |
| 2,027,122 | Sandt | Jan. 8, 1936 |
| 2,136,480 | Trout | Nov. 15, 1938 |
| 2,178,615 | Standish | Nov. 7, 1939 |
| 2,344,107 | Rober et al. | Mar. 14, 1944 |
| 2,497,319 | Mott | Feb. 14, 1950 |

FOREIGN PATENTS

| | | |
|---|---|---|
| 814,335 | France | Mar. 15, 1937 |